US011445559B2

(12) United States Patent
Yu

(10) Patent No.: US 11,445,559 B2
(45) Date of Patent: Sep. 13, 2022

(54) COMMUNICATION METHOD AND COMMUNICATIONS APPARATUS

(71) Applicant: Huawei Technologies Co., Ltd., Shenzhen (CN)

(72) Inventor: Youyang Yu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 96 days.

(21) Appl. No.: 17/020,004

(22) Filed: Sep. 14, 2020

(65) Prior Publication Data
US 2020/0413466 A1 Dec. 31, 2020

Related U.S. Application Data

(63) Continuation of application No. PCT/CN2019/081733, filed on Apr. 8, 2019.

(30) Foreign Application Priority Data

Apr. 10, 2018 (CN) .......................... 201810317721.3
May 21, 2018 (CN) .......................... 201810487920.9

(51) Int. Cl.
*H04W 76/16* (2018.01)
*H04W 88/06* (2009.01)

(52) U.S. Cl.
CPC ............ *H04W 76/16* (2018.02); *H04W 88/06* (2013.01)

(58) Field of Classification Search
CPC ..... H04W 76/16; H04W 88/06; H04W 48/18; H04W 76/11; H04W 28/0268; H04W 80/10
See application file for complete search history.

(56) References Cited

U.S. PATENT DOCUMENTS 8,908,517 B2 * 12/2014 Filsfils .................... H04L 45/38
370/386
10,856,173 B2 * 12/2020 Youn ................. H04W 36/0044
10,938,583 B2 * 3/2021 Qiao ....................... H04L 47/24
(Continued)

FOREIGN PATENT DOCUMENTS

CN           101312586 A      11/2008
CN           101478743 A       7/2009
(Continued)

OTHER PUBLICATIONS

S2-175787, LG Electronics, et al., "TS 23.502: Applicability of handover between 3GPP and N3GPP," SA WG2 Meeting #122bis, Aug. 21-25, 2017, Sophia Antipolis, France, 13 pages.
(Continued)

*Primary Examiner* — Julio R Perez
(74) *Attorney, Agent, or Firm* — Conley Rose, P.C.

(57) ABSTRACT

A communication method and a communications apparatus include sending, by a terminal device, a request message to a first core network element using a first access technology, where the request message requests to newly add or update a service flow, receiving, by the terminal device using the first access technology or a second access technology, a response message from the first core network element, and transmitting, by the terminal device, the service flow based on the response message using the second access technology or both the first access technology and the second access technology.

20 Claims, 15 Drawing Sheets

(56) References Cited

U.S. PATENT DOCUMENTS

| | | | | |
|---|---|---|---|---|
| 11,044,773 | B2* | 6/2021 | Shaw | H04W 76/16 |
| 11,178,194 | B2* | 11/2021 | Kim | H04W 76/16 |
| 2011/0164527 | A1* | 7/2011 | Mishra | H04L 45/308 |
| | | | | 370/252 |
| 2012/0213069 | A1 | 8/2012 | Oguchi | |
| 2012/0327807 | A1 | 12/2012 | Eric | |
| 2014/0369198 | A1 | 12/2014 | Rinne et al. | |
| 2015/0351079 | A1 | 12/2015 | Himayat et al. | |
| 2017/0118706 | A1* | 4/2017 | Wang | H04W 48/20 |
| 2017/0311198 | A1 | 10/2017 | Monjas Llorente et al. | |
| 2017/0332282 | A1* | 11/2017 | Dao | H04L 1/0026 |
| 2018/0227837 | A1 | 8/2018 | Starsinic et al. | |
| 2019/0373441 | A1* | 12/2019 | Ryu | H04W 24/02 |
| 2020/0170071 | A1* | 5/2020 | Mildh | H04W 76/11 |
| 2020/0236727 | A1* | 7/2020 | Salkintzis | H04W 48/18 |
| 2020/0413466 | A1* | 12/2020 | Yu | H04W 76/16 |
| 2021/0014742 | A1* | 1/2021 | Wang | H04W 36/0027 |
| 2022/0116327 | A1* | 4/2022 | Salkintzis | H04W 40/28 |

FOREIGN PATENT DOCUMENTS

| | | | | |
|---|---|---|---|---|
| CN | 104054375 | A | | 9/2014 |
| CN | 106465178 | A | | 2/2017 |
| CN | 113905427 | A * | | 1/2022 ............ H04W 48/18 |
| EP | 1229751 | A1 | | 8/2002 |
| EP | 2429240 | A1 | | 3/2012 |
| KR | 20180034635 | A | | 4/2018 |
| RU | 2553075 | C2 | | 6/2015 |
| WO | 2013068787 | A1 | | 5/2013 |
| WO | 2014089874 | A1 | | 6/2014 |
| WO | 2015188856 | A1 | | 12/2015 |

OTHER PUBLICATIONS

CP-180101, 3GPP TSG CT WG1, "Presentation of Specification to TSG:3GPP TS 24.501 v1.0.0 on Non-Access-Stratum (NAS) protocol for 5G System (5GS); Stage 3," 3GPP TSG CT Meeting #79,Chenai, India; Mar. 19-20, ,total 2 pages.

3GPP TS 24.501 V1.0.0, (Mar. 2018), "3rd Generation Partnership Project; Technical Specification Group Core Network and Terminals; Non-Access-Stratum (NAS) protocol for 5G System (5GS); Stage 3 (Release 15)," Mar. 2018, 253 pages.

3GPP TS 23.503 V15.1.0, "3rd Generation Partnership Project; Technical Specification Group Services and System Aspects; Policy and Charging Control Framework for the 5G System; Stage 2 (Release 15)," Mar. 2018, 65 pages.

3GPP TS 23.502 V15.1.0, "3rd Generation Partnership Project; Technical Specification Group Services and System Aspects; Procedures for the 5G System; Stage 2 (Release 15)," Mar. 2018, 285 pages.

3GPP TS 23.501 V15.1.0, "3rd Generation Partnership Project;Technical Specification Group Services and System Aspects;System Architecture for the 5G System;Stage 2 (Release 15)," Mar. 2018, 201 pages.

3GPP TR 23.793 V0.3.0 "3rd Generation Partnership Project; Technical Specification Group Services and System Aspects; Study on Access Traffic Steering, Switching andSplitting support in the 5G system architecture (Release 16)," Mar. 2018, 24 pages.

Huawei, et al., "ATSSS Rule definition and update of TFCP," 3GPP TSG SA WG2 #127 S2-183361, Apr. 16-20, 13 pages.

LG Electronics, "ATSSS Solution—Multi-Access PDU Session Establishment," 3GPP TSG SA WG2 #126, S2-182043, Feb. 22-Mar. 2, 2018, 10 pages.

Huawei, et al., "ATSSS Rule definition and update of TFCP," SA WG2 Meeting #127, Apr. 16-20, 2018, Sanya, China, S2-183361, 13 pages.

Huawei et al., "Solution 3: Multi-access PDU Session Establishment with NCP," SA WG2 Meeting #126, S2-182507—revision of S2-181928, Feb. 26-Mar. 2, 2018, Montreal, Canada, 6 pages.

* cited by examiner

COMMUNICATION METHOD AND COMMUNICATIONS APPARATUS

CROSS-REFERENCE TO RELATED APPLICATIONS

This application is a continuation of International Patent Application No. PCT/CN2019/081733 filed on Apr. 8, 2019, which claims priority to Chinese Patent Application No. 201810487920.9 filed on May 21, 2018 and Chinese Patent Application No. 201810317721.3 filed on Apr. 10, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

To face challenges from wireless broadband technologies and keep leading advantages of a 3rd Generation Partnership Project (3GPP) network, the 3GPP standard organization formulated a next generation mobile communications system network architecture at the end of 2016, which is referred to as a $5^{th}$ generation (5G) network architecture.

The 5G network architecture supports to use a wireless technology defined by the 3GPP standard organization to access a core network (CN), for example, to use a Long-Term Evolution (LTE) technology or a radio access network (RAN) technology to access the core network. In addition, the 5G network architecture further supports to use a non-3GPP access technology to access the core network using a non-3GPP interworking function (N3IWF) or a next generation access gateway (next generation Packet Data Gateway (NGPDG)).

Based on a multi-access technology supported by the 5G network architecture, a multi-access protocol data unit (PDU) session (which may also be referred to as a packet data unit (PDU) session) is introduced. However, an update procedure of the multi-access PDU session is not involved in the other approaches.

SUMMARY

This application provides a communication method and a communications apparatus, to implement an update procedure of a multi-access PDU session.

According to a first aspect, a communication method is provided, and includes sending, by a terminal device, a request message to a first core network element using a first access technology, where the request message requests to newly add or update a service flow, receiving, by the terminal device using the first access technology and/or a second access technology, a response message of the request message from the first core network element, and transmitting, by the terminal device, the service flow based on the response message using the second access technology or the first access technology and the second access technology.

According to the communication method in this embodiment of this application, the terminal device sends the request message using the first access technology in a multi-access PDU session, to request to newly add or update the service flow, to be specific, to request the first core network element to allocate a transmission resource to the service flow using the access technology in the multi-access PDU session. The terminal device obtains the response message indicating that the service flow is allowed to be transmitted using the second access technology or the first access technology and the second access technology in the multi-access PDU session. In the communication method, the terminal device can update, based on the multi-access PDU session, a quality of service (QoS) profile of the second access technology that is in a plurality of access technologies in the multi-access PDU session and that is not used to send the request message such that the service flow can be transmitted using the second access technology.

In some embodiments, the service flow may be a newly added service flow, that is, a service flow that is not included in an original multi-access PDU session.

In some embodiments, the service flow may be an updated service flow. To be specific, an original multi-access PDU session includes the service flow, but transmission of the service flow changes. For example, a requirement for a QoS parameter of an access technology changes.

In some embodiments, the multi-access PDU session includes the first access technology (for example, a 3GPP technology) and the second access technology (for example, a non-3GPP technology). In this embodiment of this application, the terminal device can send the request message using the 3GPP technology or the non-3GPP technology.

The first core network element may be a session management function (SMF) network element.

With reference to the first aspect, in an implementation of the first aspect, the request message includes first identification information and indication information of the second access technology, and the first identification information is usable for determining the service flow. The response message includes the first identification information and the indication information of the second access technology, or the response message includes the first identification information, indication information of the first access technology, and the indication information of the second access technology.

With reference to the first aspect, in an implementation of the first aspect, the request message includes first identification information, indication information of the first access technology, and indication information of the second access technology, and the first identification information is usable for determining the service flow. The response message includes the first identification information and the indication information of the second access technology, or the response message includes the first identification information, the indication information of the first access technology, and the indication information of the second access technology.

With reference to the first aspect, in an implementation of the first aspect, the request message includes first identification information and indication information of the first access technology, and the first identification information is usable for determining the service flow. The response message includes the first identification information and indication information of the second access technology, or the response message includes the first identification information, indication information of the second access technology, and indication information of the second access technology.

According to the communication method in this embodiment of this application, the request message sent by the terminal device includes the first identification information and the indication information of the first access technology and/or the indication information of the second access technology, and requests to transmit the service flow using the first access technology and/or the second access technology.

The first identification information is usable for determining the service flow. When the response message includes the first identification information and the indication information of the second access technology, the terminal device transmits the service flow using the second access technology. When the response message includes the first identification information, the indication information of the first access technology, and the indication information of the second access technology, the terminal device transmits the service flow using the first access technology and the second access technology. The terminal device can accurately determine, based on a correspondence between a service flow and an access technology, which access technology is used for transmission.

The request message includes a first identifier, and the first identifier is usable for determining the service flow. Because no transmission resource is obtained for the service flow, in a phase of requesting allocation of a transmission resource, the terminal device carries corresponding identification information, to indicate, to the first core network element, which service flows are the newly added or updated service flows.

The request message includes a PDU session modification request message.

The response message may be a PDU session modification command message.

With reference to the first aspect and the foregoing implementations of the first aspect, in another implementation of the first aspect, the first identification information includes at least one of description information of the service flow, a QoS flow identifier (QFI), or a PDU session identifier.

According to the communication method in this embodiment of this application, information that is usable for determining the service flow and that is included in the request message sent by the terminal device may be different indication information.

The flow description information may further include description information of a plurality of service flows. The plurality of service flows is referred to as a service flow template, and the description information of the plurality of service flows may be referred to as a service flow description template. The service flow can be determined based on the service flow description template.

With reference to the first aspect and the foregoing implementations of the first aspect, in another implementation of the first aspect, the indication information of the first access technology is a first access type, and the indication information of the second access technology is a second access type, or the indication information of the first access technology is a QoS rule corresponding to a first access type, and the indication information of the second access technology is a QoS rule corresponding to a second access type, or the indication information of the first access technology and the indication information of the second access technology are QoS rules corresponding to a first access type and a second access type.

According to the communication method in this embodiment of this application, the indication information indicating the first access technology and/or the second access technology may directly indicate an access type or indicate QoS rules corresponding to different access technologies. A used access technology is indicated in a plurality of manners.

With reference to the first aspect and the foregoing implementations of the first aspect, in another implementation of the first aspect, the request message further includes first indication information, and the first indication information is usable for indicating that the first core network element is allowed to modify an access technology corresponding to the service flow.

According to the communication method in this embodiment of this application, the terminal device may add the first indication information to the request message, and the first indication information is usable for indicating that the first core network element is allowed to modify a request of the terminal device. The first core network element can select a more proper access technology for the service flow for transmission. For example, the terminal device requests to transmit the service flow using the first access technology, and the first core network element may allocate a resource to the service flow for transmission based on the first indication information using the second access technology.

In some embodiments, after the terminal device sends the first indication information to the first core network element, the first indication information may be used to indicate that when the terminal device requests to transmit the service flow using the second access technology, the first core network element is allowed to instruct to transmit the service flow using the first access technology.

With reference to the first aspect and the foregoing implementations of the first aspect, in another implementation of the first aspect, the response message includes a flow splitting rule, and the terminal device determines, according to the flow splitting rule, data amounts of the service flow that are in transmission to be performed using the first access technology and the second access technology, and transmitting, by the terminal device, the service flow based on the response message using the first access technology and the second access technology includes transmitting, by the terminal device, the service flow based on the data amounts using the first access technology and the second access technology.

With reference to the first aspect and the foregoing implementations of the first aspect, in another implementation of the first aspect, the flow splitting rule includes the data amount that is of the service flow and that is in transmission to be performed using the first access technology and/or the data amount that is of the service flow and that is in transmission to be performed using the second access technology, or the flow splitting rule includes a bandwidth value that is of the service flow and that is in transmission to be performed using the first access technology and/or a bandwidth value that is of the service flow and that is in transmission to be performed using the second access technology, or the flow splitting rule includes a ratio of the data amount that is of the service flow and that is in transmission to be performed using the first access technology to the data amount that is of the service flow and that is in transmission to be performed using the second access technology or a ratio of a bandwidth value that is of the service flow and that is in transmission to be performed using the first access technology to a bandwidth value that is of the service flow and that is in transmission to be performed using the second access technology.

According to the communication method in this embodiment of this application, when instructing the terminal device to transmit the service flow using an access technology in the multi-access PDU session, the first core network element further indicates a data amount that is in transmission and that can be supported by the access technology such that the terminal device correctly transmits the service flow using a plurality of access technologies.

In some embodiments, the first core network element indicates data amounts in transmission that are respectively supported by the first access technology and the second access technology. For example, the first access technology can support transmission of a data amount of a bandwidth A, and the second access technology can support transmission of a data amount of a bandwidth B.

In some embodiments, the first core network element indicates a ratio of a data amount that is in transmission and that is supported by the first access technology to a data amount that is in transmission and that is supported by the second access technology. For example, a ratio of a bandwidth that can be supported by the first access technology to a bandwidth that can be supported by the second access technology is A/B. If a total transmission amount of the service flow is M, M×A/(A+B) of the service flow is transmitted using the first access technology, and M×B/(A+B) of the service flow is transmitted using the second access technology.

According to a second aspect, a communication method is provided, and includes sending, by a terminal device, a request message to a first core network element using a first access technology, where the request message requests to delete a second access technology in a multi-access PDU session, and receiving, by the terminal device, a response message of the request message from the first core network element using the first access technology, where the response message is usable for indicating that the second access technology in the multi-access PDU session is successfully deleted.

With reference to the second aspect, in an implementation of the second aspect, the request message further includes at least one of a deletion instruction and indication information of the second access technology, the deletion instruction indicates to delete the second access technology in the multi-access PDU session, and the indication information of the second access technology is usable for indicating the second access technology.

According to the communication method in this embodiment of this application, the terminal device may directly send the deletion instruction to instruct to delete the second access technology. The request message may include the indication information indicating the second access technology.

With reference to the second aspect and the foregoing implementation of the second aspect, in an implementation of the second aspect, the response message includes a first identifier and indication information of the first access technology, the first identifier is usable for indicating that a service flow is to be transmitted using the first access technology, and when the second access technology is not deleted, the service flow is a service flow transmitted using the second access technology.

According to a third aspect, a communication method is provided, and includes sending, by an access network device, network status information to a first core network element, where the network status information is usable for indicating a data transmission status of the access network device, and receiving, by the access network device, indication information from the first core network element, where the indication information includes a QoS profile that is sent to the access network device and that corresponds to the network status information.

According to the communication method in this embodiment of this application, the access network device may alternatively instruct the first core network element to update a QoS profile of a corresponding access technology. After the access network device reports a network status information based on a status of the access network device, the first core network element can configure QoS profiles of the first access technology and a second access technology based on the network status information.

With reference to the third aspect, in an implementation of the third aspect, the network status information includes at least one of a payload, a bandwidth, a delay, a packet loss rate, or signal strength of the first access network device.

According to the communication method in this embodiment of this application, the network status information reported by the access network device may be a data amount that is in transmission and that can be currently supported by the first access technology, or may be that the first access technology cannot currently support transmission of a service flow. The first core network element can configure the QoS profile of the first access technology based on the information.

According to a fourth aspect, a communication method is provided, and includes receiving, by a first core network element, a request message from a terminal device using a first access technology, where the request message requests to newly add or update a service flow, and sending, by the first core network element, a response message of the request message to the terminal device using the first access technology and/or a second access technology, where the response message indicates to the terminal device to transmit the service flow using the second access technology or the first access technology and the second access technology.

According to the communication method in this embodiment of this application, the terminal device sends the request message using the first access technology in a multi-access PDU session, to request to newly add or update the service flow, to be specific, to request the first core network element to allocate a transmission resource to the service flow using the access technology in the multi-access PDU session. The terminal device obtains the response message indicating that the service flow is allowed to be transmitted using the second access technology or the first access technology and the second access technology in the multi-access PDU session. In the communication method, the terminal device can update, based on the multi-access PDU session, a QoS profile of the second access technology that is in a plurality of access technologies in the multi-access PDU session and that is not used to send the request message such that the service flow can be transmitted using the second access technology.

With reference to the fourth aspect, in an implementation of the fourth aspect, the request message includes first identification information and indication information of the second access technology, and the first identification information is usable for determining the service flow. The response message includes the first identification information and the indication information of the second access technology, or the response message includes the first identification information, indication information of the first access technology, and the indication information of the second access technology.

With reference to the fourth aspect, in an implementation of the fourth aspect, the request message includes first identification information, indication information of the first access technology, and indication information of the second access technology, and the first identification information is usable for determining the service flow. The response message includes the first identification information and the indication information of the second access technology, or the response message includes the first identification information, the indication information of the first access technology, and the indication information of the second access technology.

With reference to the fourth aspect, in an implementation of the fourth aspect, the request message includes first identification information and indication information of the first access technology, and the first identification information is usable for determining the service flow. The response message includes the first identification information and indication information of the second access technology, or the response message includes the first identification information, indication information of the second access technology, and indication information of the second access technology.

According to the communication method in this embodiment of this application, the request message sent by the terminal device includes the first identification information and the indication information of the first access technology and/or the indication information of the second access technology, and requests to transmit the service flow using the first access technology and/or the second access technology.

The first identification information is usable for determining the service flow. When the response message includes the first identification information and the indication information of the second access technology, the first core network element instructs the terminal device to transmit the service flow using the second access technology. When the response message includes the first identification information, the indication information of the first access technology, and the indication information of the second access technology, the first core network element instructs the terminal device to transmit the service flow using the first access technology and the second access technology.

With reference to the fourth aspect, in an implementation of the fourth aspect, the first identification information includes at least one of description information of the service flow, a QFI, or a PDU session identifier.

According to the communication method in this embodiment of this application, information that is usable for determining the service flow and that is included in the request message sent by the terminal device may be different indication information.

With reference to the fourth aspect, in an implementation of the fourth aspect, the indication information of the first access technology is a first access type, and the indication information of the second access technology is a second access type, or the indication information of the first access technology is a QoS rule corresponding to a first access type, and the indication information of the second access technology is a QoS rule corresponding to a second access type, or the indication information of the first access technology and the indication information of the second access technology are QoS rules corresponding to a first access type and a second access type.

According to the communication method in this embodiment of this application, the indication information indicating the first access technology and/or the second access technology may directly indicate an access type or indicate QoS rules corresponding to different access technologies.

With reference to the fourth aspect and the foregoing implementations of the fourth aspect, in another implementation of the fourth aspect, the request message further includes first indication information, and the first indication information is usable for indicating that the first core network element is allowed to modify an access technology corresponding to the service flow.

According to the communication method in this embodiment of this application, the terminal device may add the first indication information to the request message, and the first indication information is usable for indicating that the first core network element is allowed to modify a request of the terminal device. The first core network element can select a more proper access technology for the service flow for transmission. For example, the terminal device requests to transmit the service flow using the first access technology, and the first core network element may allocate a resource to the service flow for transmission based on the first indication information using the second access technology.

In some embodiments, after the terminal device sends the first indication information to the first core network element, the first indication information may be used to indicate that when the terminal device requests to transmit the service flow using the second access technology, the first core network element is allowed to instruct to transmit the service flow using the first access technology.

With reference to the fourth aspect and the foregoing implementations of the fourth aspect, in another implementation of the fourth aspect, the response message includes a flow splitting rule, and the flow splitting rule is usable for determining data amounts of the service flow that are in transmission to be performed using the first access technology and the second access technology.

With reference to the fourth aspect and the foregoing implementations of the fourth aspect, in another implementation of the fourth aspect, the flow splitting rule includes the data amount that is of the service flow and that is in transmission to be performed using the first access technology and/or the data amount that is of the service flow and that is in transmission to be performed using the second access technology, or the flow splitting rule includes a bandwidth value that is of the service flow and that is in transmission to be performed using the first access technology and/or a bandwidth value that is of the service flow and that is in transmission to be performed using the second access technology, or the flow splitting rule includes a ratio of the data amount that is of the service flow and that is in transmission to be performed using the first access technology to the data amount that is of the service flow and that is in transmission to be performed using the second access technology or a ratio of a bandwidth value that is of the service flow and that is in transmission to be performed using the first access technology to a bandwidth value that is of the service flow and that is in transmission to be performed using the second access technology.

According to the communication method in this embodiment of this application, when instructing the terminal device to transmit the service flow using an access technology in the multi-access PDU session, the first core network element further indicates a data amount that is in transmission and that can be supported by the access technology such that the terminal device correctly transmits the service flow using a plurality of access technologies.

With reference to the fourth aspect, in an implementation of the fourth aspect, the method further includes obtaining, by the first core network element, policy information of the service flow, and sending, by the first core network element, the response message includes sending the response message based on the policy information.

According to the communication method in this embodiment of this application, the first core network element may obtain the policy information from a policy control function (PCF) network element, and determine, based on the policy information, an access technology used to transmit the service flow.

With reference to the fourth aspect, in an implementation of the fourth aspect, the policy information includes a data amount that is of the service flow and that is in transmission to be performed using the first access technology and/or a data amount that is of the service flow and that is in transmission to be performed using the second access technology, or the policy information includes a bandwidth value that is of the service flow and that is in transmission to be performed using the first access technology and/or a bandwidth value that is of the service flow and that is in transmission to be performed using the second access technology, or the policy information includes a ratio of a data amount that is of the service flow and that is in transmission to be performed using the first access technology to a data amount that is of the service flow and that is in transmission to be performed using the second access technology or a ratio of a bandwidth value that is of the service flow and that is in transmission to be performed using the first access technology to a bandwidth value that is of the service flow and that is in transmission to be performed using the second access technology. According to the communication method in this embodiment of this application, the policy information may be in a plurality of forms, provided that how to transmit the service flow using the access technology can be determined.

In some embodiments, an SMF network element may determine, based on a network status of the SMF network element, a data transmission amount corresponding to each access technology.

With reference to the fourth aspect, in an implementation of the fourth aspect, the first core network element sends second indication information to a second access network device corresponding to the second access technology, where the second indication information includes a QoS profile, and the QoS profile includes a QoS parameter corresponding to the service flow.

According to the communication method in this embodiment of this application, when the service flow is to be transmitted using the second access technology, the first core network element needs to send the second indication information to the second access network device using the second access technology, to instruct the second access network device to update the QoS profile of the second access technology. The QoS profile includes the QoS parameter corresponding to the service flow, to instruct to update a current QoS parameter of the second access technology such that the updated QoS parameter corresponds to the service flow, and the service flow can be transmitted. In this case, the response message is sent from the first core network element to the terminal device using the first access technology. The first core network element can feed back the response message using the first access technology, and update the QoS parameter of the second access technology. The second access technology is an access technology different from the first access technology.

With reference to the fourth aspect and the foregoing implementations of the fourth aspect, in another implementation of the fourth aspect, the first core network element sends third indication information to a first access network device corresponding to the first access technology, where the third indication information includes a QoS profile, and the QoS profile includes a QoS parameter corresponding to the service flow. The first core network element sends second indication information to a second access network device corresponding to the second access technology, where the second indication information includes a QoS profile, and the QoS profile includes a QoS parameter corresponding to the service flow.

According to the communication method in this embodiment of this application, when the service flow is to be transmitted using the first access technology and the second access technology, the first core network element needs to send the third indication information to the first access network device using the first access technology, and send the second indication information to the second access network device using the second access technology. An access network device is instructed to update a QoS parameter of a corresponding access technology such that the service flow can be transmitted using the first access technology and the second access technology. In this case, the response message is sent from the first core network element to the terminal device using the first access technology and/or the second access technology. The first core network element can update QoS parameters of the first access technology and the second access technology, and feed back the response message using the first access technology and/or the second access technology.

With reference to the fourth aspect and the foregoing implementations of the fourth aspect, in another implementation of the fourth aspect, that the first core network element sends second indication information to a second access network device corresponding to the second access technology includes sending, by the first core network element, a second message to a second core network element, where the second message includes indication information of the second access technology and the second indication information, and the indication information of the second access technology indicates sending the second indication information to the second access network device using the second access technology.

With reference to the fourth aspect and the foregoing implementations of the fourth aspect, in another implementation of the fourth aspect, that the first core network element sends second indication information to a second access network device corresponding to the second access technology includes sending, by the first core network element, a third message to a second core network element, where the third message includes the third indication information, indication information of the first access technology, the second indication information, and indication information of the second access technology, and the second indication information and the indication information of the second access technology that are in the third message indicate sending the second indication information to the second access network device using the second access technology.

With reference to the fourth aspect and the foregoing implementations of the fourth aspect, in another implementation of the fourth aspect, that the first core network element sends third indication information to a first access network device corresponding to the first access technology includes sending, by the first core network element, a first message to a second core network element, where the first message includes indication information of the first access technology and the third indication information, and the indication information of the first access technology indicates sending the third indication information to the first access network device using the first access technology.

With reference to the fourth aspect and the foregoing implementations of the fourth aspect, in another implementation of the fourth aspect, that the first core network element sends third indication information to a first access network device corresponding to the first access technology includes sending, by the first core network element, a third message to a second core network element, where the third message includes the third indication information, indication information of the first access technology, the second indication information, and indication information of the second access technology, and the third indication information and the indication information of the first access technology that are in the third message indicate sending the third indication information to the first access network device using the first access technology.

With reference to the fourth aspect and the foregoing implementations of the fourth aspect, in another implementation of the fourth aspect, that the first core network element sends third indication information to a first access network device corresponding to the first access technology includes sending, by the first core network element, a first message to a second core network element, where the first message includes indication information of the first access technology and the third indication information, and the indication information of the first access technology indicates sending the third indication information to the first access network device using the first access technology.

According to the communication method in this embodiment of this application, sending, by the first core network element, the response message to the terminal device using the first access technology may be as follows. The first core network element first sends two messages to the second core network element, and the second core network element respectively sends the two messages to the first access network device and the second access network device, or may be the first core network element first sends one message to the second core network element, and the second core network element divides the message into two messages based on different access technologies, and respectively sends the two messages to the first access network device and the second access network device.

The first core network element may be an SMF network element, and the second core network element may be an AMF network element. In some embodiments, sending, by the first core network element, the response message to the terminal device using the first access technology is as follows. The first core network element sends a first message to the second core network element, where the first message includes indication information of the first access technology and the response message, and the second core network element sends the response message to the terminal device based on the indication information of the first access technology using the first access technology.

In some other embodiments, sending, by the first core network element, the response message to the terminal device using the first access technology includes the following. The first core network element sends a third message to the second core network element, where the third message includes the response message, indication information of the first access technology, the second indication information, and indication information of the second access technology, the response message corresponds to the indication information of the first access technology, and the second indication information corresponds to the indication information of the second access technology, and the second core network element sends the response message to the terminal device based on the correspondence using the first access technology.

According to the communication method in this embodiment of this application, that the first core network element sends second indication information to a second access network device using the second access technology may be as follows. The first core network element first sends two messages to the second core network element, and the second core network element respectively sends the two messages to the first access network device and the second access network device, or may be the first core network element first sends one message to the second core network element, and the second core network element divides the message into two messages based on different access technologies, and respectively sends the two messages to the first access network device and the second access network device.

In some embodiments, the first core network element sends a third message to the second core network element, where the third message includes the response message, indication information of the first access technology, the second indication information, and indication information of the second access technology, the response message corresponds to the indication information of the first access technology, and the second indication information corresponds to the indication information of the second access technology, and the second core network element sends the second indication information to the second access network device based on the correspondence using the second access technology.

In some other embodiments, sending, by the first core network element, the response message to the terminal device using the first access technology includes that the first core network element sends a third message to the second core network element, where the third message includes the response message, indication information of the first access technology, the second indication information, and indication information of the second access technology, the response message corresponds to the indication information of the first access technology, and the second indication information corresponds to the indication information of the second access technology, and the second core network element sends the response message to the terminal device based on the correspondence using the first access technology.

According to a fifth aspect, a communication method is provided, and includes receiving, by a first core network element, a request message from a terminal device using a first access technology, where the request message requests to delete a second access technology in a multi-access PDU session, and sending, by the first core network element, a response message to the terminal device using the first access technology, where the response message is usable for indicating that the second access technology in the multi-access PDU session is successfully deleted.

In some embodiments, the request message carries a first identifier, and the first identifier is usable for determining to delete the second access technology.

According to the communication method in this embodiment of this application, the first core network element receives the request message using the first access technology in the multi-access PDU session, and deletes the second access technology based on the request message. The first core network element can delete, based on the multi-access PDU session, an access technology that is in a plurality of access technologies in the multi-access PDU session and that is not used to send the request message.

With reference to the fifth aspect, in an implementation of the fifth aspect, the request message further includes at least one of a deletion instruction and indication information of the second access technology, the deletion instruction indicates to delete the second access technology in the multi-access PDU session, and the indication information of the second access technology is usable for indicating the second access technology.

According to the communication method in this embodiment of this application, the terminal device may directly send the deletion instruction to instruct to delete the second access technology.

With reference to the fifth aspect and the foregoing implementation of the fifth aspect, in an implementation of the fifth aspect, the response message includes a first identifier and indication information of the first access technology, the first identifier is usable for indicating that a service flow is to be transmitted using the first access technology, and when the second access technology is not deleted, the service flow is a service flow transmitted using the second access technology.

According to the communication method in this embodiment of this application, an access technology that is requested to be deleted is carried in the multi-access PDU session. After the access technology is deleted, the service flow may be transmitted using an access technology that is not deleted. This can ensure that normal transmission of the service flow is not affected even if an access technology is deleted from the multi-access PDU session.

With reference to the fifth aspect and the foregoing implementations of the fifth aspect, in another implementation of the fifth aspect, sending, by the first core network element, the response message to the terminal device using the first access technology includes sending, by the first core network element, a first message to the second core network element, where the first message includes indication information of the first access technology and the response message, and sending, by the second core network element, the response message to the terminal device based on the indication information of the first access technology using the first access technology, or sending, by the first core network element, a third message to the second core network element, where the third message includes the response message, indication information of the first access technology, the access network resource release message, and indication information of the second access technology, the response message corresponds to the indication information of the first access technology, and the second indication information corresponds to the indication information of the second access technology, and sending, by the second core network element, the response message to the terminal device based on the correspondence using the first access technology.

According to the communication method in this embodiment of this application, sending, by the first core network element, the response message to the terminal device using the first access technology may be as follows. The first core network element first sends two messages to the second core network element, and the second core network element respectively sends the two messages to a first access network device and a second access network device, or may be the first core network element first sends one message to the second core network element, and the second core network element divides the message into two messages based on different access technologies, and respectively sends the two messages to a first access network device and a second access network device.

In some embodiments, the first core network element sends a third message to the second core network element, where the third message includes the response message, indication information of the first access technology, the access network resource release message, and indication information of the second access technology, the response message corresponds to the indication information of the first access technology, and the second indication information corresponds to the indication information of the second access technology, and the second core network element sends the response message to the terminal device based on the correspondence using the first access technology.

In some other embodiments, sending, by the first core network element, the response message to the terminal device using the first access technology is as follows. The first core network element sends a third message to the second core network element, where the third message includes the response message, indication information of the first access technology, the access network resource release message, and indication information of the second access technology, the response message corresponds to the indication information of the second access technology, and the access network resource release message corresponds to the indication information of the second access technology, and the second core network element sends the response message to the terminal device based on the correspondence using the second access technology.

According to a sixth aspect, a communication method is provided, and includes receiving, by a first core network element, network status information from a first access network device using a first access technology, configuring, by the first core network element based on the network status information, a QoS profile corresponding to the first access technology, and sending, by the first core network element, fourth indication information to the first access network device using the first access technology, where the fourth indication information indicates to the first access network device to update the QoS profile corresponding to the first access technology.

According to the communication method in this embodiment of this application, the access network device may alternatively instruct the first core network element to update a QoS parameter corresponding to a corresponding access technology. After the access network device reports the network status information based on a status of the access network device, the first core network element can configure, based on the network status information, QoS parameters corresponding to the first access technology and a second access technology.

With reference to the sixth aspect, in an implementation of the sixth aspect, the network status information includes at least one of a payload, a bandwidth, a delay, a packet loss rate, or signal strength of the first access network device.

According to the communication method in this embodiment of this application, the network status information reported by the access network device using the first access technology may be a data amount that is in transmission and that can be currently supported by the first access technology, or may be that the first access technology cannot currently support transmission of a service flow. The first core network element can configure, based on the information, the QoS parameter corresponding to the first access technology.

With reference to the sixth aspect and the foregoing implementation of the sixth aspect, in another implementation of the sixth aspect, the method further includes configuring, by the first core network element based on the network status information, a QoS profile corresponding to the second access technology, where the second access technology is an access technology other than the first access technology in access technologies in a multi-access PDU session.

According to the communication method in this embodiment of this application, the network status information reported by the access network device using the first access technology may be used to instruct the first core network element to configure a QoS parameter corresponding to another access technology in the access technologies in the multi-access PDU session. The first core network element updates, based on the network status information, the QoS parameter corresponding to the second access technology.

With reference to the sixth aspect and the foregoing implementations of the sixth aspect, in another implementation of the sixth aspect, the method further includes sending, by the first core network element, fifth indication information to a second access network device using the second access technology, where the fifth indication information indicates to the second access network device to update the QoS profile corresponding to the second access technology.

According to the communication method in this embodiment of this application, first network status information reported by the access network device using the first access technology may be used to instruct the first core network element to configure a QoS parameter of another access technology in the access technologies in the multi-access PDU session. The first core network element may update, based on the first network status information, the QoS parameter corresponding to the second access technology.

With reference to the sixth aspect and the foregoing implementations of the sixth aspect, in another implementation of the sixth aspect, sending, by the first core network element, fourth indication information to the first access network device using the first access technology includes sending, by the first core network element, a first message to the second core network element, where the first message includes indication information of the first access technology and the fourth indication information, and sending, by the second core network element, the fourth indication information to the first access network device using the first access technology, or sending, by the first core network element, a third message to the second core network element, where the third message includes the fourth indication information, indication information of the first access technology, the fifth indication information, and indication information of the second access technology, the fourth indication information corresponds to the indication information of the first access technology, and the fifth indication information corresponds to the indication information of the second access technology, and sending, by the second core network element, the fourth indication information to the first access network device based on the correspondence using the first access technology.

According to the communication method in this embodiment of this application, sending, by the first core network element, fourth indication information to the first access network device using the first access technology may be as follows. The first core network element first sends two messages to the second core network element, and the second core network element respectively sends the two messages to the first access network device and the second access network device, or may be the first core network element first sends one message to the second core network element, and the second core network element divides the message into two messages based on different access technologies, and respectively sends the two messages to the first access network device and the second access network device.

In some embodiments, sending, by the first core network element, fourth indication information to the first access network device using the first access technology is as follows. The first core network element sends a first message to the second core network element, where the first message includes indication information of the first access technology and the fourth indication information, and the second core network element sends the fourth indication information to the first access network device using the first access technology.

In some other embodiments, sending, by the first core network element, fourth indication information to the first access network device using the first access technology is as follows. The first core network element sends a third message to the second core network element, where the third message includes the fourth indication information, indication information of the first access technology, the fifth indication information, and indication information of the second access technology, the fourth indication information corresponds to the indication information of the first access technology, and the fifth indication information corresponds to the indication information of the second access technology, and the second core network element sends the fourth indication information to the first access network device based on the correspondence using the first access technology.

With reference to the sixth aspect and the foregoing implementations of the sixth aspect, in another implementation of the sixth aspect, sending, by the first core network element, fifth indication information to a second access network device using the second access technology includes sending, by the first core network element, a fifth message to the second core network element, where the second message includes indication information of the second access technology and the fifth indication information, and sending, by the second core network element, the fifth indication information to the second access network device using the second access technology, or sending, by the first core network element, a third message to the second core network element, where the third message includes the fourth indication information, indication information of the first access technology, the fifth indication information, and indication information of the second access technology, the fourth indication information corresponds to the indication information of the first access technology, and the fifth indication information corresponds to the indication information of the second access technology, and sending, by the second core network element, the fifth indication information to the second access network device based on the correspondence using the second access technology.

According to the communication method in this embodiment of this application, sending, by the first core network element, fifth indication information to a second access network device using the second access technology may be as follows. The first core network element first sends two messages to the second core network element, and the second core network element respectively sends the two messages to the first access network device and the second access network device, or may be the first core network element first sends one message to the second core network element, and the second core network element divides the message into two messages based on different access technologies, and respectively sends the two messages to the first access network device and the second access network device.

According to a seventh aspect, a communication method is provided, and includes receiving, by an access network device, a first data packet sent from a terminal device, where a packet header of the first data packet carries a fifth identifier, and the fifth identifier is usable for indicating that the first data packet supports flow splitting using a plurality of access technologies, sending, by the access network device, a second data packet to a first core network element, where a packet header of the second data packet includes a sixth identifier, the sixth identifier is usable for indicating that the second data packet supports flow splitting using a plurality of access technologies, and the second data packet includes data content of the second data packet.

That the fifth identifier or the sixth identifier is usable for indicating that the data packet supports flow splitting using a plurality of access technologies includes the fifth identifier or the sixth identifier is usable for indicating that the data packet supports a Traffic Flow Control Protocol (TFCP), or the data packet includes a TFCP packet header or a sequence number of the data packet.

That the first core network element obtains the data packet based on the sixth identifier includes the following. Based on the sixth identifier, the first core network element parses the TFCP packet header or ranks the data packet.

According to the communication method in this embodiment of this application, when a service flow supports packet granularity flow splitting, and the terminal device determines to perform multi-access flow splitting on the service flow, the terminal device encapsulates a data packet of the service flow into the first data packet, and sends the first data packet to the access network device, to indicate that the service flow is a service flow that supports packet granularity flow splitting. The access network device encapsulates the sixth identification information and the first data packet in the second data packet header, and sends the second data packet header to the first core network element. Based on the sixth identifier in the second data packet header, the first core network element parses the TFCP data packet header or ranks the data packet.

According to the communication method in this embodiment of this application, when the data packet supports flow splitting, because the terminal device provides an indication for the first core network element, the first core network element can obtain a corresponding data packet through parsing based on the indication.

According to an eighth aspect, a communication method is provided, and includes sending, by a terminal device, a request message to a first core network element using a first access technology, where the request message requests to newly add or update a third service flow or requests to establish a PDU session, receiving, by the terminal device using the first access technology and/or a second access technology, a response message sent from the first core network element, and transmitting, by the terminal device, the third service flow or the PDU session based on the response message using a plurality of access technologies.

With reference to the eighth aspect, in another implementation of the eighth aspect, the request message or the response message further includes a third identifier and a multi-access technology-based transmission indication, and the multi-access technology-based transmission indication is usable for indicating that the terminal device requests to perform multi-access technology-based transmission or TFCP-based encapsulation on the third service flow or the PDU session determined based on the third identifier.

With reference to the eighth aspect and the foregoing implementation of the eighth aspect, in another implementation of the eighth aspect, the third identifier includes at least one of description information of a service flow, a QFI, or a PDU session identifier.

With reference to the eighth aspect and the foregoing implementations of the eighth aspect, in another implementation of the eighth aspect, the multi-access transmission indication is a TFCP indication, a TFCP-based encapsulation indication, or a packet granularity flow splitting indication. The terminal device determines, based on the QFI, that a data packet includes a TFCP header, or determines, based on a PDU session to which a data packet belongs, that the data packet includes a TFCP header, or determines, based on an end marker data packet, that a data packet received after the end marker data packet includes a TFCP header.

According to the communication method in this embodiment of this application, there may also be a plurality of forms of indicating that the data packet is in multi-access transmission. That the terminal device determines, based on an end marker data packet, that a data packet received after the end marker data packet includes a TFCP header indicates that the TFCP header is not carried when the service flow starts, and when flow splitting needs to be performed on a data packet, the end marker data packet is sent to indicate that a following data packet includes TFCP. The end marker data packet may also be used to identify that following data packets support flow splitting, but whether a data packet following the end marker data packet includes TFCP is not limited.

The first access technology and the second access technology may be two different access technologies in a multi-access PDU session.

With reference to the eighth aspect and the foregoing implementations of the eighth aspect, in another implementation of the eighth aspect, the terminal device ranks the data packet based on a sequence number included in the TFCP packet header.

According to a ninth aspect, a communication method is provided, and includes receiving, by a first core network element, a request message from a terminal device using a first access technology, where the request message requests to newly add or update a third service flow or requests to establish a PDU session, and sending, by the first core network element, a response message to the terminal device using the first access technology and/or a second access technology, where the response message is usable for indicating that the third service flow or the PDU session allows transmission using a plurality of access technologies.

With reference to the ninth aspect, in another implementation of the ninth aspect, the request message or the response message further includes a third identifier and a multi-access technology-based transmission indication, and the multi-access technology-based transmission indication is usable for indicating that the terminal device requests to perform multi-access technology-based transmission or TFCP-based encapsulation on the third service flow or the PDU session determined based on the third identifier.

With reference to the ninth aspect and the foregoing implementation of the ninth aspect, in another implementation of the eighth aspect, the third identifier includes at least one of description information of a service flow, a QFI, or a PDU session identifier.

With reference to the ninth aspect and the foregoing implementations of the ninth aspect, in another implementation of the ninth aspect, the multi-access transmission indication is a TFCP indication, a TFCP-based encapsulation indication, or a packet granularity flow splitting indication.

With reference to the ninth aspect and the foregoing implementations of the ninth aspect, in another implementation of the ninth aspect, the first core network element sends a fourth identifier and a multi-access technology-based transmission indication to a user plane network element.

With reference to the ninth aspect and the foregoing implementations of the ninth aspect, in another implementation of the ninth aspect, the fourth identifier is at least one of description information of a service flow, a QFI, a PDU session identifier, or an N4 session identifier.

With reference to the ninth aspect and the foregoing implementations of the ninth aspect, in another implementation of the ninth aspect, the QFI is used by the terminal device to determine that a data packet includes a TFCP header, or the tunnel identifier is used by the terminal device to determine that a data packet in the PDU session includes a TFCP header, or an end marker data packet is used by the terminal device to determine that a data packet received after the end marker data packet includes a TFCP header.

With reference to the ninth aspect and the foregoing implementations of the ninth aspect, in another implementation of the ninth aspect, a sequence number included in the TFCP packet header is used to rank the data packet.

According to a tenth aspect, a communication method is provided, and includes sending, by a data sending network element to a data receiving network element, a parameter indicating that data is to be transmitted on a plurality of links, and receiving, by the data sending network element, acknowledgment information that indicates that data is to be transmitted on a plurality of links and that is sent from the data receiving network element.

According to the communication method in this embodiment of this application, the data can be transmitted on the plurality of links.

With reference to the tenth aspect, in another implementation of the tenth aspect, sending, by a data sending network element to a data receiving network element, a parameter indicating that data is to be transmitted on a plurality of links includes sending, by the data sending network element to the data receiving network element using a control plane, the parameter indicating that data is to be transmitted on a plurality of links, or sending, by the data sending network element to the data receiving network element using a user plane, the parameter indicating that data is to be transmitted on a plurality of links.

According to the communication method in this embodiment of this application, the parameter indicating that data is to be transmitted on a plurality of links may be directly sent using the user plane, or may be sent using the control plane.

With reference to the tenth aspect and the foregoing implementation of the tenth aspect, in another implementation of the tenth aspect, the parameter indicating that data is to be transmitted on a plurality of links includes identification information of the data and indication information indicating that the data is to be transmitted on the plurality of links.

With reference to the tenth aspect and the foregoing implementations of the tenth aspect, in another implementation of the tenth aspect, the parameter indicating that data is to be transmitted on a plurality of links further includes a first window length, and the first window length is usable for indicating a send window length of the data sending network element.

With reference to the tenth aspect and the foregoing implementations of the tenth aspect, in another implementation of the tenth aspect, the identification information of the data includes at least one of description information of a service flow, a QFI, a PDU session identifier, or an N4 session identifier.

With reference to the tenth aspect and the foregoing implementations of the tenth aspect, in another implementation of the tenth aspect, the indication information includes at least one of TFCP indication, a TFCP-based encapsulation indication, a packet granularity flow splitting indication, a converged tunnel indication, a converged tunnel identifier, or a network element Internet Protocol (IP) address, the converged tunnel indication is usable for indicating that a converged tunnel is established for the service flow, and the network element IP address is an IP address of the data sending network element or/and an IP address of the data receiving network element.

With reference to the tenth aspect and the foregoing implementations of the tenth aspect, in another implementation of the tenth aspect, the data sending network element is a terminal device, and the data receiving network element is a user plane network element, or the data sending network element is the user plane network element, and the data receiving network element is the terminal device, or the data sending network element is a session management function network element, and the data receiving network element is the terminal device and the user plane network element.

With reference to the tenth aspect and the foregoing implementations of the tenth aspect, in another implementation of the tenth aspect, the acknowledgment information indicating that data is to be transmitted on a plurality of links includes the parameter indicating that data is to be transmitted on a plurality of links, or the acknowledgment information indicating that data is to be transmitted on a plurality of links includes an acknowledgment message.

With reference to the tenth aspect and the foregoing implementations of the tenth aspect, in another implementation of the tenth aspect, the plurality of links include a 3GPP link and a non-3GPP link, or the plurality of links further include links on which different access technologies are used and that are connected to different access network devices, or the plurality of links further include links on which a same access technology is used and that are connected to different access network devices.

According to an eleventh aspect, a communication method is provided, and includes determining, by a data sending network element, a link status of a first link and/or a link status of a second link, and based on the link status of the first link and/or the link status of the second link, transmitting, by the data sending network element, a first data packet on the first link, and transmitting a second data packet on the second link, where the first data packet and the second data packet belong to a same service flow, the first data packet includes a first TFCP header, the first TFCP header includes a sequence number of the first data packet, the second data packet includes a second TFCP header, and the second TFCP header includes a sequence number of the second data packet.

With reference to the eleventh aspect and the foregoing implementation of the eleventh aspect, in another implementation of the eleventh aspect, the communication method further includes determining, by the data sending network element, that a first round-trip time (RTT) of the first link and a second RTT of the second link meet a first preset condition, or determining, by the data sending network element, that a delay of the first link and a delay of the second link meet a second preset condition.

With reference to the eleventh aspect and the foregoing implementation of the eleventh aspect, in another implementation of the eleventh aspect, the first preset condition includes a difference between the first RTT and the second RTT is less than or equal to a first preset threshold, or the second preset condition includes a difference between the delay of the first link and the delay of the second link is less than or equal to a second preset threshold.

With reference to the eleventh aspect and the foregoing implementations of the eleventh aspect, in another implementation of the eleventh aspect, the first data packet and the second data packet are a same data packet.

With reference to the eleventh aspect and the foregoing implementations of the eleventh aspect, in another implementation of the eleventh aspect, the communication method further includes if both flow splitting percentages that are of the first link and the second link and that are in a flow splitting policy are 100%, determining, by the data sending network element, that the first data packet and the second data packet are the same data packet.

According to a twelfth aspect, a communication method is provided, and includes receiving, by a data receiving network element on a first link, a first data packet sent from a data sending network element, where the first data packet includes a first TFCP header, and the first TFCP header includes a sequence number of the first data packet, receiving, by the data receiving network element on a second link, a second data packet sent from the data sending network element, where the second data packet includes a second TFCP header, the second TFCP header includes a sequence number of the second data packet, and the first data packet and the second data packet belong to a same service flow, and caching, by the data receiving network element, the first data packet and/or the second data packet based on the sequence number of the first data packet and the sequence number of the second data packet.

With reference to the twelfth aspect and the foregoing implementation of the twelfth aspect, in another implementation of the twelfth aspect, the caching, by the data receiving network element, the first data packet and/or the second data packet based on the sequence number of the first data packet and the sequence number of the second data packet includes storing, by the data receiving network element, the first data packet and the second data packet in a buffer based on a sequence number and the sequence number of the first data packet and the sequence number of the second data packet.

With reference to the twelfth aspect and the foregoing implementation of the twelfth aspect, in another implementation of the twelfth aspect, the communication method further includes determining, by the data receiving network element, a status of a data packet in the buffer.

With reference to the twelfth aspect and the foregoing implementations of the twelfth aspect, in another implementation of the twelfth aspect, the status of the data packet includes a lost state, and the communication method further includes if the data receiving network element does not receive the data packet beyond preset duration, determining, by the data receiving network element, that the status of the data packet is the lost state.

With reference to the twelfth aspect and the foregoing implementations of the twelfth aspect, in another implementation of the twelfth aspect, the communication method further includes determining, by the data receiving network element, the preset duration based on a link delay of the first link and/or a link delay of the second link, or determining, by the data receiving network element, the preset duration based on an RTT of the first link and/or an RTT of the second link.

With reference to the twelfth aspect and the foregoing implementations of the twelfth aspect, in another implementation of the twelfth aspect, a time period beyond the preset duration is survival duration, the survival duration is a difference between a current time and an estimated receiving time of the data packet, and the estimated receiving time of the data packet is obtained based on a receiving time of a previous data packet of the data packet or/and a receiving time of a next data packet of the data packet, or a preset duration timer is started based on a receiving time of a previous data packet of the data packet or/and a receiving time of a next data packet of the data packet. Further, the preset duration timer is started when the previous data packet of the data packet is received. Alternatively, the preset duration timer is started when the next data packet of the data packet is received. Alternatively, the preset duration timer is started at any moment before the previous data packet and the next data packet that are of the data packet are received.

With reference to the twelfth aspect and the foregoing implementations of the twelfth aspect, in another implementation of the twelfth aspect, the caching, by the data receiving network element, the first data packet and/or the second data packet based on the sequence number of the first data packet and the sequence number of the second data packet includes if the buffer includes the first data packet and/or the second data packet, discarding, by the data receiving network element, the first data packet and/or the second data packet, or if the sequence number of the first data packet and/or the sequence number of the second data packet are/is less than a smallest sequence number of a data packet in the buffer, discarding, by the data receiving network element, the first data packet and/or the second data packet.

According to a thirteenth aspect, a communications apparatus is provided. The apparatus may be configured to perform an operation of the communications apparatus according to any one of the first aspect or the possible implementations of the first aspect. Further, the communications apparatus includes a corresponding component configured to perform the steps or functions described in the first aspect, and the component may be the first communications apparatus in the first aspect. The steps or functions may be implemented by software, hardware, or a combination of hardware and software.

According to a fourteenth aspect, a communications apparatus is provided. The apparatus may be configured to perform an operation of the communications apparatus according to any one of the second aspect or the possible implementations of the second aspect. Further, the apparatus may include a corresponding component configured to perform the steps or functions described in the second aspect. The steps or functions may be implemented by software, hardware, or a combination of hardware and software.

According to a fifteenth aspect, a communications apparatus is provided. The apparatus may be configured to perform an operation of the communications apparatus according to any one of the third aspect or the possible implementations of the third aspect. Further, the communications apparatus includes a corresponding component configured to perform the steps or functions described in the third aspect, and the component may be the first communications apparatus in the third aspect. The steps or functions may be implemented by software, hardware, or a combination of hardware and software.

According to a sixteenth aspect, a communications apparatus is provided. The apparatus may be configured to perform an operation of the communications apparatus according to any one of the fourth aspect or the possible implementations of the fourth aspect. Further, the apparatus may include a corresponding component configured to perform the steps or functions described in the fourth aspect. The steps or functions may be implemented by software, hardware, or a combination of hardware and software.

According to a seventeenth aspect, a communications apparatus is provided. The apparatus may be configured to perform an operation of the communications apparatus according to any one of the fifth aspect or the possible implementations of the fifth aspect. Further, the apparatus may include a corresponding component configured to perform the steps or functions described in the fifth aspect. The steps or functions may be implemented by software, hardware, or a combination of hardware and software.

According to an eighteenth aspect, a communications apparatus is provided. The apparatus may be configured to perform an operation of the communications apparatus according to any one of the sixth aspect or the possible implementations of the sixth aspect. Further, the apparatus may include a corresponding component configured to perform the steps or functions described in the sixth aspect. The steps or functions may be implemented by software, hardware, or a combination of hardware and software.

According to a nineteenth aspect, a communications apparatus is provided. The apparatus may be configured to perform an operation of the communications apparatus according to any one of the seventh aspect or the possible implementations of the seventh aspect. Further, the apparatus may include a corresponding component configured to perform the steps or functions described in the seventh aspect. The steps or functions may be implemented by software, hardware, or a combination of hardware and software.

According to a twentieth aspect, a communications apparatus is provided. The apparatus may be configured to perform an operation of the communications apparatus according to any one of the eighth aspect or the possible implementations of the eighth aspect. Further, the apparatus may include a corresponding component configured to perform the steps or functions described in the eighth aspect. The steps or functions may be implemented by software, hardware, or a combination of hardware and software.

According to a twenty-first aspect, a communications apparatus is provided. The apparatus may be configured to perform an operation of the communications apparatus according to any one of the ninth aspect or the possible implementations of the ninth aspect. Further, the apparatus may include a corresponding component configured to perform the steps or functions described in the ninth aspect. The steps or functions may be implemented by software, hardware, or a combination of hardware and software.

According to a twenty-second aspect, a communications apparatus is provided. The apparatus may be configured to perform an operation of the communications apparatus according to any one of the tenth aspect or the possible implementations of the tenth aspect. Further, the apparatus may include a corresponding component configured to perform the steps or functions described in the tenth aspect. The steps or functions may be implemented by software, hardware, or a combination of hardware and software.

According to a twenty-third aspect, a communications apparatus is provided. The apparatus may be configured to perform an operation of the communications apparatus according to any one of the eleventh aspect or the possible implementations of the eleventh aspect. Further, the apparatus may include a corresponding component configured to perform the steps or functions described in the eleventh aspect. The steps or functions may be implemented by software, hardware, or a combination of hardware and software.

According to a twenty-fourth aspect, a communications apparatus is provided. The apparatus may be configured to perform an operation of the communications apparatus according to any one of the twelfth aspect or the possible implementations of the twelfth aspect. Further, the apparatus may include a corresponding component configured to perform the steps or functions described in the twelfth aspect. The steps or functions may be implemented by software, hardware, or a combination of hardware and software.

According to a twenty-fifth aspect, a communications apparatus is provided, and includes a processor and a memory. The memory is configured to store a computer program, and the processor is configured to invoke the computer program from the memory and run the computer program such that the communications apparatus performs the communication method according to any one of the first aspect to the twelfth aspect or the possible implementations of the first aspect to the twelfth aspect.

There are one or more processors and one or more memories.

The memory may be integrated into the processor, or the memory and the processor are separately disposed.

The communications apparatus further includes a transmitter and a receiver.

In a possible design, a communications apparatus is provided, and includes a transceiver, a processor, and a memory. The processor is configured to control the transceiver to receive and send a signal. The memory is configured to store a computer program. The processor is configured to invoke the computer program from the memory and run the computer program such that the communications device performs the method according to any one of the first aspect to the twelfth aspect or the possible implementations of the first aspect to the twelfth aspect.

According to a twenty-sixth aspect, a system is provided, and the system includes the foregoing communications apparatus.

According to a twenty-seventh aspect, a computer program product is provided, and the computer program product includes a computer program (which may also be referred to as code or an instruction). When the computer program is run, a computer is enabled to perform the method according to any one of the first aspect to the twelfth aspect or the possible implementations of the first aspect to the twelfth aspect.

According to a twenty-eighth aspect, a computer readable medium is provided, and the computer readable medium stores a computer program (which may also be referred to as code or an instruction). When the computer program is run on a computer, the computer is enabled to perform the method according to any one of the first aspect to the twelfth aspect or the possible implementations of the first aspect to the twelfth aspect.

According to a twenty-ninth aspect, a chip system is provided, and includes a memory and a processor. The memory is configured to store a computer program, and the processor is configured to invoke the computer program from the memory and run the computer program such that a communications apparatus on which the chip system is installed performs the method according to any one of the first aspect to the twelfth aspect or the possible implementations of the first aspect to the twelfth aspect.

According to the communication method and the communications apparatus in the embodiments of the present disclosure, an update procedure of the multi-access PDU session can be implemented.

DESCRIPTION OF EMBODIMENTS

Figure 1:
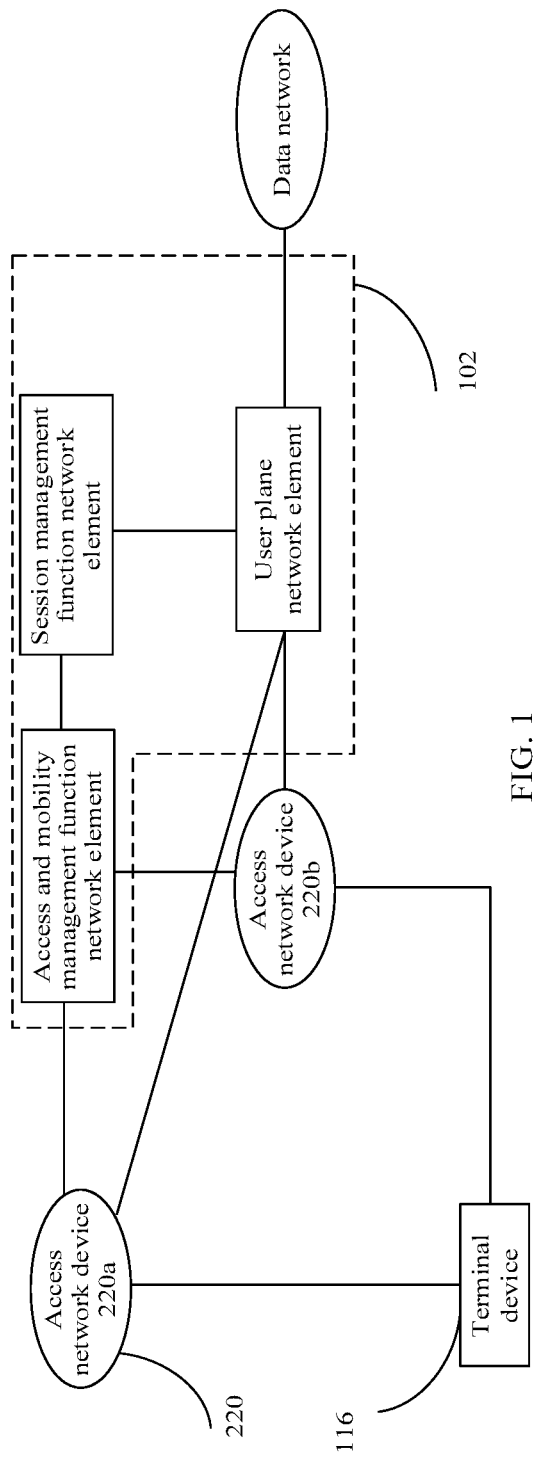
FIG. 1 is a diagram of a system architecture to which an embodiment of this application is applicable.

The following describes technical solutions of this application with reference to accompanying drawings.

The technical solutions in the embodiments of this application may be applied to various communications systems, for example, an LTE system, an LTE frequency division duplex (FDD) system, an LTE time division duplex (TDD) system, a future 5G system, and a subsequent evolved communications system.

A terminal device in the embodiments of this application may be referred to as user equipment, an access terminal, a subscriber network element, a subscriber station, a mobile station, a remote station, a remote terminal, a mobile device, a user terminal, a terminal, a wireless communications apparatus, a user agent, or a user apparatus. The terminal device may alternatively be a cellular phone, a cordless phone, a Session Initiation Protocol (SIP) phone, a wireless local loop (WLL) station, personal digital assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN), or the like. This is not limited in the embodiments of this application.

As an example, instead of a limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In the embodiments of this application, the terminal device or an access network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing using a process, for example, a LINUX operating system, a UNIX operating system, an ANDROID operating system, an IOS operating system, or a WINDOWS operating system. The application layer includes applications such as a browser, an address book, word processing software, and instant messaging software. In addition, a specific structure of an execution body of a method provided in the embodiments of this application is not limited in the embodiments of this application, provided that a program that records code of the method provided in the embodiments of this application can be run to perform communication according to the method provided in the embodiments of this application. For example, the method provided in the embodiments of this application may be performed by the terminal device or a core network device, or a function module that can invoke and execute the program in the terminal device or the core network device.

In addition, aspects or features in the embodiments of this application may be implemented as a method, an apparatus, or a product that uses standard programming and/or engineering technologies. The term "product" used in this application covers a computer program that can be accessed from any computer readable device, carrier, or medium. For example, the computer readable medium may include but is not limited to a magnetic storage device (for example, a hard disk, a FLOPPY DISK, or a magnetic tape), an optical disc (for example, a compact disc (CD), a digital versatile disc (DVD), a smart card, and a flash memory device (for example, an erasable programmable read-only memory (EPROM), a card, a stick, or a key drive). In addition, various storage media described in this specification may indicate one or more devices and/or other machine readable media that are configured to store information. The term "machine readable media" may include but is not limited to a radio channel, and various other media that can store, include, and/or carry an instruction and/or data.

Figure 2:
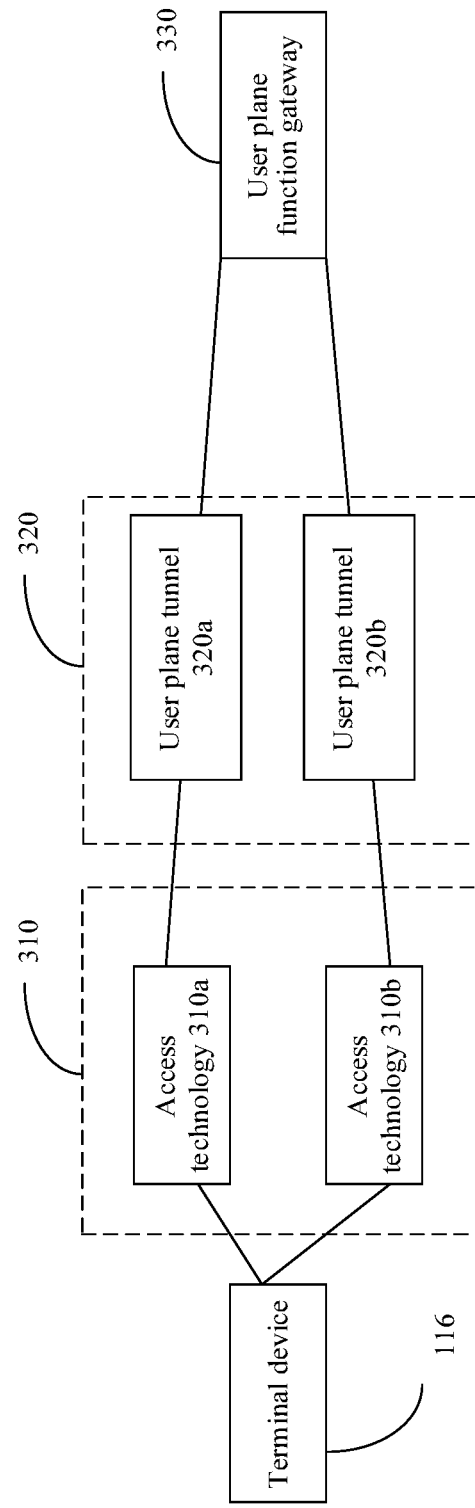
FIG. 2 is a schematic diagram of a multi-access PDU session.

With reference to FIG. 1 and FIG. 2, the following describes in detail a network system architecture and a multi-access PDU session in the architecture in the embodiments of this application.

FIG. 1 is a diagram of a system architecture to which an embodiment of this application is applicable. The architectural diagram includes three parts: a terminal device 116, access network devices 220, and a core network device 102. The following describes the three parts in detail.

The terminal device 116 may include the plurality of possible forms described above. Details are not described herein again.

The access network devices 220 (including an access network device 220a and an access network device 220b that are shown in FIG. 1) each may be a RAN device corresponding to a 3GPP access technology and/or a non-3GPP access network device and/or an access gateway device corresponding to a non-3GPP access technology, which are collectively referred to as an access network device. A RAN of the 3GPP access technology includes but is not limited to a next generation RAN (NG-RAN), an LTE network, or the like. A corresponding access network device may be a next generation radio access node (NG-RAN) or an evolved NodeB (eNB or eNodeB). An access network of the non-3GPP access technology includes but is not limited to a trusted WLAN access network, an untrusted WLAN access network, a fixed access network, or a wired access network. In a WLAN access network, a corresponding access network device may be an access point (AP), an N3IWF network element, an NGPDG, or the like.

The terminal device 116 may use a 3GPP radio technology to access a CN.

Alternatively, the terminal device 116 may use a non-3GPP access technology to access a core network using the N3IWF network element or the NGPDG.

The system architecture shown in FIG. 1 may further support to use an untrusted non-3GPP access technology to access a core network device. Using the untrusted non-3GPP access technology to access the core network device may be using an untrusted wireless local area network (WLAN) to access the core network device.

Using trusted non-3GPP access technology to access the core network device is similar to using untrusted non-3GPP access technology to access the core network device. An access network device corresponding to the untrusted non-3GPP access technology may be replaced with an access network device corresponding to the trusted non-3GPP access technology, and the N3IWF network element may be replaced with a trusted access gateway. Alternatively, when an untrusted non-3GPP access gateway does not exist, an access network device is a trusted non-3PGP access network device.

Regardless of the 3GPP access technology, the trusted non-3GPP access technology, or the untrusted non-3GPP access technology, a first core network element (for example, an SMF network element) may support a point-to-point interface protocol or an architecture in which a service-oriented interface is used and that is the same as an architecture in which 3GPP is used to access the core network.

It should be understood that a specific access technology used by the terminal device to access the core network device is not limited in this application, and any one of existing or future access technologies may be used to access the core network device.

In this embodiment, an example in which a 3GPP access network device is the NG-RAN, and a non-3GPP access network device is the N3IWF network element is used for description.

The core network device 102 is divided into a user plane function (UPF) network element and a control plane function (CPF) network element based on a function.

The user plane function network element is mainly responsible for forwarding a packet data packet, controlling QoS, collecting statistics about charging information, and the like.

The control plane network element function network element is mainly responsible for terminal device registration and authentication, mobility management, delivery of a data packet forwarding policy and a QoS control policy to the user plane function network element, and the like.

The control plane network element function network element may be further divided into an access and mobility management function (AMF) network element and a session management function (SMF) network element based on a function.

The AMF network element is responsible for a registration procedure when the terminal device accesses the core network device, and location management in a movement process of the terminal device.

The SMF network element is responsible for a corresponding session connection established by the core network device when the terminal device initiates a service, to provide a specific service for the terminal device. The service includes delivering a data packet forwarding policy, a QoS policy, and the like to the UPF network element based on an interface between the SMF network element and the UPF network element.

The core network device further includes an authentication server function (AUSF) network element, a unified data management (UDM) network element, a PCF network element, an application function (AF) network element, a data network (DN) network element, a network slice selection function (NSSF) network element, a network exposure function (NEF) network element, and a network repository function (NRF) network element. The AUSF network element is mainly responsible for performing authentication on the terminal device, to determine validity of the terminal device.

The UDM network element is mainly configured to store subscription data of the terminal device.

The PCF network element is mainly configured to deliver a service-related policy to the AMF or the SMF.

The AF is configured to send an application-related requirement to the PCF such that the PCF generates a corresponding policy.

The NSSF is configured to select a network slice.

The NEF is configured to expose a 5G network capability to a third-party network.

The NRF is configured to select the foregoing network function network element.

The DN is configured to provide a service for user equipment, for example, provide a mobile operator service, an internet service, a network service, or a third-party service.

This embodiment of this application mainly relates to the terminal device, the access network devices (including the first access network device NG-RAN and the second access network device N3IWF), and the SMF network element, the AMF network element, the PCF network element, and the UPF network element that are in the core network device in FIG. 1.

It should be understood that descriptions of a function of a network element other than the SMF network element, the AMF network element, the PCF network element, and the UPF network element that are in the core network device are not provided when the technical solutions of this application are described below with reference to the accompanying drawings, and the function of the other network element in the core network device is not limited in this application.

It should be understood that the core network device described in FIG. 1 may further include another function network element. This is not limited in this application.

Based on a multi-access technology supported by the 5G network architecture, a multi-access PDU session may be established in the other approaches. "Multi-access" means that a PDU session is accessed to a core network using a plurality of access network devices, and different access network devices may correspond to different access technologies, or may correspond to a same access technology.

For example, multi-access includes accessing the core network device using the first access network device NG-RAN and the second access network device N3IWF. Correspondingly, a first access technology corresponding to a case in which the core network device is accessed using the NG-RAN is a 3GPP access technology or an NG-RAN access technology, and a second access technology corresponding to a case in which the core network device is accessed using the N3IWF is a non-3GPP access technology or an untrusted WLAN access technology.

When a service flow is added to the multi-access PDU session or a service flow in the session changes, the terminal device sends an update request to the core network device using the first access network device corresponding to the first access technology, and completes a QoS profile establishment or update procedure of the first access network device. Alternatively, the terminal device sends an update request to the first core network element using the second access network device corresponding to the second access technology, and completes a QoS profile establishment or update procedure of the second access network device.

The following embodiment is described using an example in which the terminal device sends the update request using the first access network device. For example, the terminal device needs to add a service flow 1 to the multi-access PDU session, and the terminal device sends the update request to the first core network element using the NG-RAN, to request to transmit the service flow 1 using the NG-RAN and the 3GPP access technology. The first core network element updates a QoS profile of the NG-RAN based on the request message. Assuming that the QoS profile can support transmission of a 5 megabits per second (Mbps) (5 M) service flow before being updated, and the service flow 1 needs to be transmitted using a 5 M resource, the updated QoS profile supports transmission of a 10 Mbps (10 M) service flow.

It should be understood that a form of using the 3GPP access technology is merely an example. The first access technology is any one of access technologies in the multi-access PDU session.

The multi-access PDU session is briefly described below with reference to FIG. 2. FIG. 2 is a schematic diagram of a multi-access PDU session.

Access technologies 310 (including an access technology 310a and an access technology 310b that are shown in FIG. 2) refer to access technology manners of accessing a network side when the terminal device 116 and a user plane function network element 330 transmit a service flow data packet in a PDU session.

The access technology 310 may be an access technology such as the foregoing 3GPP access technology or the foregoing non-3GPP access technology. Alternatively, the access technology 310 may be an access technology such as an LTE access technology, an NG-RAN access technology, a trusted non-3GPP access technology, an untrusted non-3GPP access technology, a WLAN access technology, and a fixed network access technology. A specific manner of the access technology is not limited in this application. The access technology 310a and the access technology 310b are different access technologies, or a same access technology but used by different access network devices.

User plane tunnels 320 (including a user plane tunnel 320a and a user plane tunnel 320b that are shown in FIG. 2) each are a user plane tunnel between an access network device and a UPF. Different user plane tunnels 320a and 320b are established between different access network devices and a same UPF. The access network device and the UPF each allocate a tunnel identifier, and send the tunnel identifier to the peer devices for storage. For example, an access network device 1 allocates a tunnel identifier 1 to the user plane tunnel 320a, and sends the tunnel identifier 1 to the UPF for storage. The UPF allocates a tunnel identifier 2 to the user plane tunnel 320a, and sends the tunnel identifier 2 to the access network device for storage. The tunnel identifier 1 and the tunnel identifier 2 are tunnel identifiers of the user plane tunnel 320a between the access network device 1 and the UPF. Tunnel identifiers of the user plane tunnel 230b are similar to the tunnel identifiers of the user plane tunnel 320a. An access network device 2 allocates a tunnel identifier 3 to the user plane tunnel 320b, and the UPF allocates a tunnel identifier 4 to the user plane tunnel 320b. The tunnel identifier 2 of the user plane tunnel 320a and the tunnel identifier 4 of the user plane tunnel 320b that are allocated by the UPF may be the same or different. This is not limited in this application.

The PDU session is a session between the terminal and the UPF. The user plane tunnels 320a and 320b belong to a same PDU session. The access technologies 310 are different access technologies in the same PDU session or a same access technology that is in the same PDU session and that corresponds to different access network devices.

In the other approaches, a 5G network architecture supports multi-access, and the multi-access PDU session may be established.

Service flow splitting at different granularities can be implemented using the multi-access PDU session. To be specific, different service flows can be transmitted using different access technologies and different access network devices or a same access technology and different access network devices. A scenario in which the different access technologies and the different access network devices are used is used as an example for description below. In a scenario in which the same access technology and the different access network devices are used, an access technology only needs to be replaced with an access network device in the following description.

A minimum flow splitting granularity of a service flow is a packet granularity. To be specific, different data packets of a same service flow may be transmitted using the different access technologies.

To implement packet granularity flow splitting using the multi-access PDU session shown in FIG. 2, TFCP header-based encapsulation needs to be performed on all service flow data packets in the PDU session, all service flow data packets that belong to a same QoS flow, or all data packets that belong to a same service flow. The TFCP is a user plane protocol layer between UE and a UPF, and is used to carry a data packet sequence number, or is used to detect a status of a link between the UE and the UPF. A protocol type of the protocol layer is not limited in this patent, for example, may alternatively be Generic Routing Encapsulation (GRE) protocol or another protocol type. The TFCP is used as an example in the following description.

When a service flow needs to be newly added to the multi-access PDU session shown in FIG. 2 or a service flow in the multi-access PDU session needs to be updated, the multi-access PDU session needs to be updated. Updating the service flow includes that a QoS parameter of the service flow is changed, or an access technology of the service flow is changed.

In some embodiments, the terminal device sends, using the first access technology shown in FIG. 2, an update request for the multi-access PDU session, for example, for adding a service flow 1. The first core network element allocates the service flow 1 to the first access technology used to send the update request for transmission, and requests the first access network device corresponding to the first access technology to update a current QoS parameter.

In some other embodiments, the terminal device sends, using the second access technology shown in FIG. 2, an update request for the multi-access PDU session, for example, for adding a service flow 1. The first core network element allocates the service flow 1 to the second access technology used to send the update request for transmission, and requests the second access network device corresponding to the second access technology to update a current QoS parameter.

It can be learned from the foregoing descriptions that in the other approaches, when the multi-access PDU session is updated in the 5G network architecture, only a QoS parameter of an access network device (for example, the first access network device) that sends the update request can be updated, but a QoS parameter of an access network device (for example, the second access network device) on the other side in the multi-access PDU session cannot be updated.

For example, when a new service flow 1 needs to be transmitted, the terminal device sends, using the first access technology, a request message used to request to transmit the service flow 1, to correspondingly update a QoS parameter of the first access technology such that the service flow 1 can be transmitted using the first access technology, but a QoS parameter of the second access technology cannot be updated to transmit the service flow 1 using the second access technology. In addition, if a new service flow 1 and a new service flow 2 need to be transmitted respectively using the first access technology and the second access technology, in the other approaches, an update request message needs to be sent separately using the first access technology and the second access technology such that the first technology 1 is correspondingly updated using the service flow 1, and the second technology 2 is correspondingly updated using the service flow 2.

In addition, the other approaches do not support packet granularity flow splitting. Consequently, when an access technology on one side cannot meet a QoS requirement of a service flow, an access technology on the other side cannot be used to provide a transmission service for the service flow.

To resolve the foregoing problem, some embodiments of this application provide a communication method such that a plurality of access technologies in a multi-access PDU session can be updated based on the multi-access PDU session.

Some other embodiments of this application may support TFCP-based encapsulation at a plurality of granularities, to implement packet granularity flow splitting. The TFCP-based encapsulation at a plurality of granularities includes TFCP-based encapsulation at a PDU session granularity, TFCP-based encapsulation at a QoS flow granularity, or TFCP-based encapsulation at a service flow granularity or a service flow template granularity. For the TFCP-based encapsulation at a service flow granularity or a service flow template granularity, TFCP header-based encapsulation only needs to be performed on the service flow or all service flows corresponding to a service flow template, but TFCP header-based encapsulation does not need to be performed on service flows that belong to a same QoS flow.

It should be further understood that names such as English full names of the foregoing PDUs and the network elements in the core network device are all names defined for ease of differentiation, and should not constitute any limitation on this application. A possibility that other names are used to replace the foregoing names in an existing protocol or a future protocol is not excluded in this application.

Figure 3:
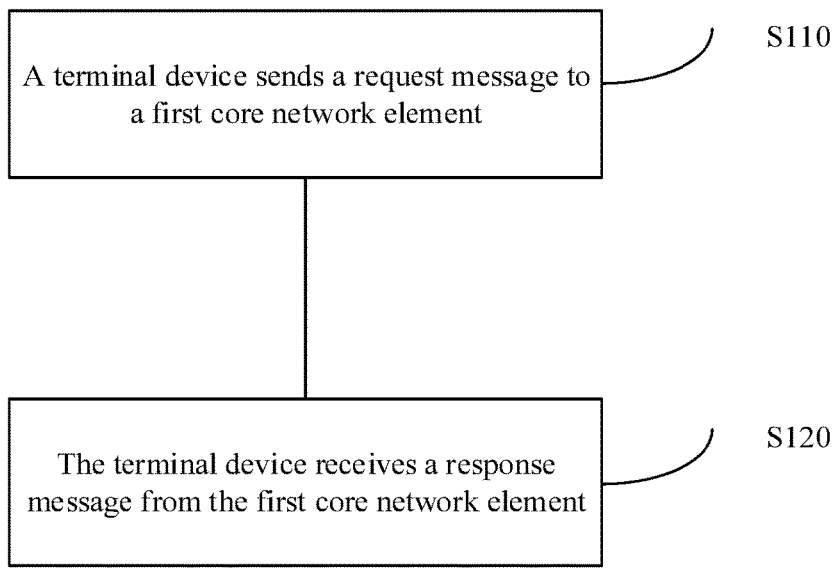
FIG. 3 is a schematic flowchart of a communication method.

With reference to FIG. 3, the following describes in detail a communication method provided in an embodiment of this application.

FIG. 3 is a schematic flowchart of a communication method according to an embodiment of this application.

S110. A terminal device sends a request message to a first core network element.

For a case in which the request message requests to update a multi-access PDU session between the terminal device and the UPF network element, refer to descriptions in the following case 1.

For a case in which the request message requests to delete one of access technologies in the multi-access PDU session between the terminal device and the UPF network element, refer to descriptions in the following case 2.

Case 1: The terminal device sends the request message to the first core network element using a first access technology, where the request message requests to newly add or update a service flow.

Optionally, the request message includes a first identifier, and the first identifier is usable for determining the service flow. The service flow may be one or more service flows.

The first identifier includes at least one of description information of the service flow, a QFI, or a PDU session identifier.

In some embodiments, the terminal device adds a correspondence between a third identifier and a multi-access technology-based transmission indication to the request message, and sends the request message to the first core network element. The third identifier may be the same as the first identifier, and is usable for determining the service flow. Alternatively, the third identifier is the same as a second identifier and is the PDU session identifier (ID), and is usable for determining a PDU session. Alternatively, the third identifier is the QFI, and is usable for determining a QoS flow. The multi-access technology-based transmission indication is usable for indicating that the terminal device requests to perform multi-access technology-based transmission on a third service flow determined based on the third identifier, or is usable for indicating that the terminal device requests to perform TFCP-based encapsulation on a third service flow determined based on the third identifier. The multi-access transmission indication is a TFCP indication, a TFCP-based encapsulation indication, or a packet granularity flow splitting indication.

In some embodiments, the service flow may be understood as a changed service flow or a newly added service flow in the multi-access PDU session between the terminal device and the UPF network element. The changed service flow may be that a QoS parameter of the service flow is changed, or an access technology of the service flow is changed.

In some embodiments, the request message includes first identification information and indication information of the first access technology, and the terminal device requests the first core network element to allocate a transmission resource to the service flow using the first access technology such that the service flow is transmitted using the first access technology.

In some other embodiments, the request message includes first identification information and indication information of the second access technology, and the terminal device requests the first core network element to allocate a transmission resource to the service flow using the second access technology such that the service flow is transmitted using the second access technology.

In some other embodiments, the request message includes first identification information, indication information of the first access technology, and indication information of the second access technology, and the terminal device requests the first core network element to allocate transmission resources to the service flow using the first access technology and the second access technology such that the service flow is transmitted separately using the first access technology and the second access technology.

The first identification information is a service flow description or a service flow template, and the service flow or all service flows in the service flow template support packet granularity flow splitting.

It may be further understood that the request message requests to update a QoS profile of an access technology in the multi-access PDU session between the terminal device and the UPF network element such that the terminal device can transmit the service flow using the first access technology and/or the second access technology.

The multi-access PDU session means that the PDU session may be accessed to a core network device using a plurality of access technologies, and one access technology may correspond to one access network device.

In this application, descriptions are provided using an example in which the multi-access PDU session between the terminal device and the UPF network element includes two access technologies, and the first access technology and the second access technology in the two access technologies are different.

It should be understood that in this embodiment of this application, access technologies in the multi-access PDU session are not limited to only two access technologies. The multi-access PDU session may include more than two access technologies, and the access technologies are different.

It should be further understood that the first access technology and the second access technology are different in a specific implementation, or one access technology may correspond to two access network devices. In this case, "access technologies" described below are replaced with "access network devices", that is, different access technologies are replaced with different access network devices.

In some embodiments, the first access technology is a 3GPP access technology, and the second access technology is a non-3GPP access technology.

In some other embodiments, the first access technology is a non-3GPP access technology, and the second access technology is a 3GPP access technology.

In some other embodiments, the first access technology is an NG-RAN access technology, and the second access technology is a WLAN access technology.

It should be understood that the first access technology and the second access technology each may be any one of access technologies such as a 3GPP access technology, a non-3GPP access technology, an LTE access technology, an NG-RAN access technology, a trusted non-3GPP access technology, an untrusted non-3GPP access technology, a WLAN access technology, and a fixed network access technology.

In a possible implementation, the request message in step 101 requests to newly add or update the service flow for the multi-access PDU session between the terminal device and the UPF network element.

In a possible implementation, QoS profiles/a QoS profile of the first access technology and/or the second access technology may be updated such that a newly added service flow can be transmitted using the first access technology and/or the second access technology.

In some embodiments, the request message carries the second identifier, and the second identifier is the multi-access PDU session ID. The PDU session identifier is usable for indicating the multi-access PDU session. Because there may be a plurality of multi-access PDU sessions between the terminal device and the UPF network element, each multi-access PDU session has a corresponding session identifier.

It should be understood that how to generate the multi-access PDU session identifier is not limited in this embodiment of this application. In this embodiment of this application, the multi-access PDU session is updated based on the established multi-access PDU session.

In a possible implementation, the request message in step 301 includes the first identifier, and the first identifier is usable for determining the service flow. The first identifier may be a data packet filter that may be used to describe the service flow, and therefore may also be referred to as a service flow description. Alternatively, the first identifier may be a service data flow (SDF) template, and the SDF template is a service flow description set, namely, a packet filter set. Therefore, the first identifier may also be referred to as a service flow description.

The first identifier is used to describe the service flow, that is, is used to describe a newly added or modified service flow in the multi-access PDU session. The first core network element may determine the service flow based on the first identifier.

In some embodiments, the service flow description includes a source IP address and a destination IP address that are of the service flow.

Optionally, the service flow description includes a source port number and a destination port number that are of the service flow.

Optionally, the service flow description information includes a protocol type of the service flow.

Optionally, the service flow description information includes an application type of the service flow.

Optionally, the service flow description information includes at least one of a source IP address and a destination IP address that are of the service flow, a source media access control (MAC) address and a destination MAC address that are of the service flow, a source port number and a destination port number that are of the service flow, a protocol type of the service flow, or an application type of the service flow.

It should be understood that the foregoing various types of service flow description information are merely an example, and the service flow description information may alternatively include other information that can be used to describe a newly added or updated service flow in the multi-access PDU session.

In some embodiments, the request message further includes indication information of an access technology and the first identifier that are used to indicate that the service flow is to be transmitted using the first access technology and/or the second access technology.

For example, a correspondence between the first identifier and an access technology corresponding to the service flow is included. The service flow is a service flow determined based on the first identifier, and the access technology is the access technology corresponding to the service flow. The first core network element determines, based on an access technology corresponding to the service flow requested by the terminal device and/or a flow splitting policy of a core network, the access technology corresponding to the service flow.

In some embodiments, the access technology corresponding to the service flow is a 3GPP access technology.

In some other embodiments, the access technology corresponding to the service flow is a non-3GPP access technology.

In some other embodiments, the access technology corresponding to the service flow is a 3GPP access technology and a non-3GPP access technology.

It should be understood that in this embodiment of this application, descriptions are provided using an example in which the first access technology is the 3GPP access technology and the second access technology is the non-3GPP access technology. When the first access technology and the second access technology are access technologies of other types, the access technology corresponding to the service flow may alternatively be an access technology of another type, for example, an LTE access technology, a 5G RAN access technology, a trusted non-3GPP access technology, an untrusted non-3GPP access technology, a WLAN access technology, or a fixed network access technology.

In some embodiments, the request message may further include a QoS rule, and the QoS rule includes a QoS parameter required by the service flow. There is a correspondence between the first identifier and the QoS rule. When the QoS rule corresponds to the second access technology, it indicates that the service flow determined based on the first identifier is to be transmitted using the second access technology. Alternatively, when the QoS rule corresponds to the first access technology and the second access technology, it indicates that the service flow determined based on the first identifier is to be transmitted using the first access technology and the second access technology.

The foregoing QoS parameter includes at least one of a bandwidth, a guaranteed bandwidth, a maximum bandwidth, and QoS identifier (5QI).

That a terminal device sends a request message to a first core network element includes the following. The terminal device sends the request message to the access network device, and then the access network device sends the request message to the first core network element.

That the terminal device sends the request message to the first core network element using a first access technology includes the following.

Manner 1: When the first access technology is a 3GPP access technology, the terminal device sends the request message using the 3GPP access technology, to request to update the multi-access PDU session. To be specific, the terminal device sends the request message to the access network device using the 3GPP access technology. In this case, the access network device is an NG-RAN.

The terminal device sends the request message to the first core network element using the first access technology. The terminal device first sends the request message to the NG-RAN, and then the NG-RAN sends the request message to the first core network element.

Manner 2: When the first access technology is a non-3GPP access technology, the terminal device sends the request message using the non-3GPP access technology, to request to update the multi-access PDU session. To be specific, the terminal device sends the request message to the access network device using the non-3GPP access technology. In this case, the access network device is an N3IWF.

The terminal device sends the request message to the first core network element using the first access technology. The terminal device first sends the request message to the N3IWF, and then the N3IWF sends the request message to the first core network element.

That manners in which the terminal device sends the request message are the manner 1 and the manner 2 is merely an example. When the first access technology is an access technology other than the 3GPP access technology, and the second access technology is an access technology other than the non-3GPP access technology, the terminal device may send the request message to the first core network element using the first access technology in a sending manner other than the manner 1 and the manner 2.

That the request message includes the correspondence information between the first identifier and the access technology includes the following several cases.

First case: The request message carries the first identifier and the access technology. The first identifier indicates a newly added or updated service flow, and the access technology is an access technology corresponding to the service flow.

For example, a service flow 1 corresponding to the first identifier carried in the request message sent from the terminal device corresponds to the 3GPP access technology. In addition, a service flow 2 corresponding to the first identifier carried in the request message sent from the terminal device corresponds to the non-3GPP access technology. When the first identifier is one or more packet filters, a packet filter 1 is used to describe the service flow 1, and a packet filter 2 is used to describe the service flow 2.

The first core network element determines, based on the first identifier and the access technology that are carried in the request message, an access technology corresponding to the newly added or updated service flow.

The terminal device may add the correspondence to a flow splitting rule, and send the flow splitting rule to the first core network element. The flow splitting rule may be an access traffic splitting, switching, steering (ATSSS) rule.

Second case: The request message carries a correspondence between description information of a service flow and a flow splitting rule. The flow splitting rule may be a flow splitting rule sent from the terminal device to the first core network element, or may be a flow splitting rule sent from the first core network element to the terminal device.

The first core network element has established a correspondence between the flow splitting rule and the access technology.

For example, the request message sent from the terminal device carries description information of a service flow 1 and a flow splitting rule 1. The request message sent from the terminal device carries description information of a service flow 2 and a flow splitting rule 2.

The correspondence that is between the flow splitting rule and the access technology and that is established by the first core network element is as follows. The flow splitting rule 1 corresponds to the 3GPP access technology, and the flow splitting rule 2 corresponds to the non-3GPP access technology.

The first core network element may determine, based on the description information that is of the service flow and that is carried in the request message, an access technology corresponding to the newly added or updated service flow.

Third case: There is a correspondence between a service flow and a QoS rule, an SDF template, or a QoS flow, and the service flow is a service flow determined based on the first identifier carried in the request message.

The first core network element side has established a correspondence between the access technology and the QoS rule or the QoS flow.

For example, a service flow 1 determined based on the first identifier sent from the terminal device belongs to a QoS rule 1, an SDF template 1, or a QoS flow 1. A service flow 2 determined based on the first identifier sent from the terminal device belongs to a QoS rule 2, an SDF template 2, or a QoS flow 2.

The correspondence that is between the access technology and the QoS rule, the SDF template, or the QoS flow and that is established on the first core network element side is as follows. The QoS rule 1, the SDF template 1, or the QoS flow 1 corresponds to the 3GPP access technology, and the QoS rule 2, the SDF template 2, or the QoS flow 2 corresponds to the non-3GPP access technology.

The first core network element determines the newly added or updated service flow based on the first identifier in the request message, and the first core network element has known the access technology corresponding to the QoS rule, the SDF template, or the QoS flow. In this case, the first core network element can determine an access technology corresponding to the modified or added service flow.

Fourth case: The request message carries a correspondence between the first identifier and the first access technology and/or the second access technology.

In this embodiment, service flow splitting at different granularities can be implemented using the service flow in the multi-access PDU session. A flow splitting granularity of the service flow includes a QoS flow granularity, a flow granularity, or a packet granularity. The following describes the flow splitting manners in detail.

(1) QoS flow granularity flow splitting: QoS flow granularity flow splitting indicates that different QoS flows may be allocated to different access technologies.

For example, QoS parameters of a service flow 1 and a service flow 2 are similar, and the service flow 1 and the service flow 2 may be aggregated into a QoS flow 1. The QoS flow 1 may be identified using a QFI 1. QoS parameters of a service flow 3 and a service flow 4 are similar, and the service flow 3 and the service flow 4 may be aggregated into a QoS flow 2. The QoS flow 2 may be identified using a QFI 2.

A service flow corresponding to the QFI 1 is transmitted using the first access technology. A service flow corresponding to the QFI 2 is transmitted using the second access technology. Alternatively, a service flow corresponding to the QFI 1 is transmitted using the second access technology. A service flow corresponding to the QFI 2 is transmitted using the first access technology.

That the QoS parameters of the foregoing service flows are similar includes the following. Values of at least M of N parameters in the QoS parameters of the service flows are the same or approximate, where N is a positive integer, and M is an integer greater than or equal to 1 and less than or equal to N.

(2) Flow granularity flow splitting: Flow granularity flow splitting indicates that different service flows may be allocated to different access technologies. The service flows may belong to a same QoS flow.

For example, the QFI 1 corresponds to a service flow 1 and a service flow 2. The service flow 1 is transmitted using the first access technology. The service flow 2 is transmitted using the second access technology. Alternatively, the service flow 1 is transmitted using the second access technology. The service flow 2 is transmitted using the first access technology. To be specific, different access technologies are allocated based on the different service flows, and flow splitting is not performed based on a QoS parameter of a service flow.

In some embodiments, the flow granularity flow splitting further includes SDF template-based flow splitting.

The SDF template-based flow splitting is as follows. Based on the flow description information, a service flow 1 and a service flow 2 are used as an SDF template 1, and the SDF template 1 corresponds to the first access technology, and a service flow 3 and a service flow 4 are used as an SDF template 2, and the SDF template 2 corresponds to the second access technology. The service flow 1, the service flow 2, the service flow 3, and the service flow 4 belong to a same QoS flow.

(3) Packet granularity flow splitting: Different data packets in a service flow may be allocated to different access technologies.

For example, a service flow 1 includes a data packet 1 and a data packet 2. The data packet 1 is transmitted using the first access technology. The data packet 2 is transmitted using the second access technology. Alternatively, the data packet 1 is transmitted using the second access technology. The data packet 2 is transmitted using the first access technology.

The foregoing correspondence is merely an example, and another correspondence that is between a service flow and an access technology and that is determined using the description information of the service flow also falls within the protection scope of this application.

The service flow 1, the service flow 2, the first access technology, and the second access technology are merely examples, and cannot limit the protection scope of this application.

In some embodiments, the terminal device sends first indication information to the first core network element. The first indication information is usable for indicating that the first core network element is allowed to modify an access technology corresponding to the service flow.

The first indication information may be included in the request message and sent from the terminal device to the first core network element.

The description information that is of the service flow and that is in the request message of the terminal device is usable for determining, based on the request message, that the service flow 1 corresponds to the first access technology.

When the terminal device sends the first indication information to the first core network element, to be specific, when the terminal device indicates to the first core network element that a correspondence that is between the service flow 1 and the first access technology and that is sent from the terminal device can be modified, for example, the first core network element may modify the correspondence between the service flow 1 and the first access technology to a correspondence between the service flow 1 and the second access technology.

For example, the terminal device sends the request message to the first core network element, to request the first core network element to use the first access technology to transmit the added or updated service flow 1. However, the first core network element determines that the first access technology does not meet a transmission requirement of the service flow 1, the first core network element may use the second access technology to transmit the service flow 1, and the first core network element changes a request of the terminal device. Alternatively, the first core network element uses both the first access technology and the second access technology to transmit the service flow 1.

For example, the terminal device requests to perform access using a WLAN, but the first core network element determines that current WLAN cannot support an access request of the terminal device. If the terminal device sends the first indication information to the first core network element, the first core network element may designate the terminal device to perform access using an NG-RAN.

Case 2: The terminal device sends the request message to the first core network element using a first access technology, where the request message requests to delete a second access technology in a multi-access PDU session.

Optionally, the request message carries a first identifier, and the first identifier is used to identify the second access technology.

When the terminal device needs to update the multi-access PDU session between the terminal device and the UPF network element to a single-access PDU session, the terminal device may initiate, to the first core network element using an access technology on one side, a request used to delete an access technology on the other side.

In some embodiments, the terminal device sends the request message to the first core network element using the first access technology, to request to delete the second access technology.

The request message includes the second access technology and a first identifier used to delete the second access technology.

In some other embodiments, the terminal device sends the request message to the first core network element using the first access technology, to request to delete the second access technology. The request message includes the second access technology and a first identifier used to update the multi-access PDU session to the single-access PDU session. The first identifier is a deletion instruction, and indicates to delete the second access technology.

In some other embodiments, the terminal device sends the request message to the first core network element using the first access technology, to request to delete the second access technology. The request message includes indication information of the first access technology and a first identifier used to update the multi-access PDU session to the single-access PDU session. The first identifier is a reservation instruction, and indicates to reserve the first access technology.

In some other embodiments, the terminal device sends the request message to the first core network element using the first access technology, to request to delete the second access technology. The request message is a deletion message or a connection release message, and the request message carries an access technology. When the first identifier included in the request message is the second access technology, it indicates that a connection on a side of the second access technology in the multi-access PDU session is to be deleted. When the first identifier is the first access technology, it indicates that a connection on a side of the first access technology in the multi-access PDU session is to be deleted.

It should be understood that in this embodiment of this application, the terminal device may send the request message to the first core network element using the first access technology, to request to delete the first access technology. For example, the request message does not need to include indication information of an access technology, and the first core network element deletes an access technology used to currently transmit the request message.

It should be understood that in this embodiment of this application, the terminal device may alternatively send the request message to the first core network element using the second access technology, to request to delete the first access technology. A side on which an access technology is used to initiate updating of the multi-access PDU session to the single-access PDU session is not limited in this application.

S120. The terminal device receives a response message from the first core network element.

The response message is usable for indicating that the service flow is to be transmitted using the second access technology or the first access technology and the second access technology. For details, refer to descriptions in the following case 1.

The response message is usable for indicating that the second access technology in the multi-access PDU session is successfully deleted. For details, refer to descriptions in the following case 2.

Case 1: The terminal device receives, using the first access technology and/or the second access technology, the response message of the request message from the core network element.

The terminal device transmits the service flow based on the response message using the second access technology or the first access technology and the second access technology.

In some embodiments, the response message received by the terminal device includes a correspondence between a third identifier and a multi-access technology-based transmission indication. The correspondence is usable for indicating that the first core network element allows or authorizes multi-access technology-based transmission of a third service flow determined based on the third identifier, or indicate that the first core network element allows or authorizes TFCP-based encapsulation of a third service flow determined based on the third identifier. The third identifier is a service flow description (one or more packet filters), an SDF template, a QFI, or a PDU session ID. The multi-access technology-based transmission indication is a TFCP indication, a TFCP-based encapsulation indication, or a packet granularity flow splitting indication.

Figure 4:
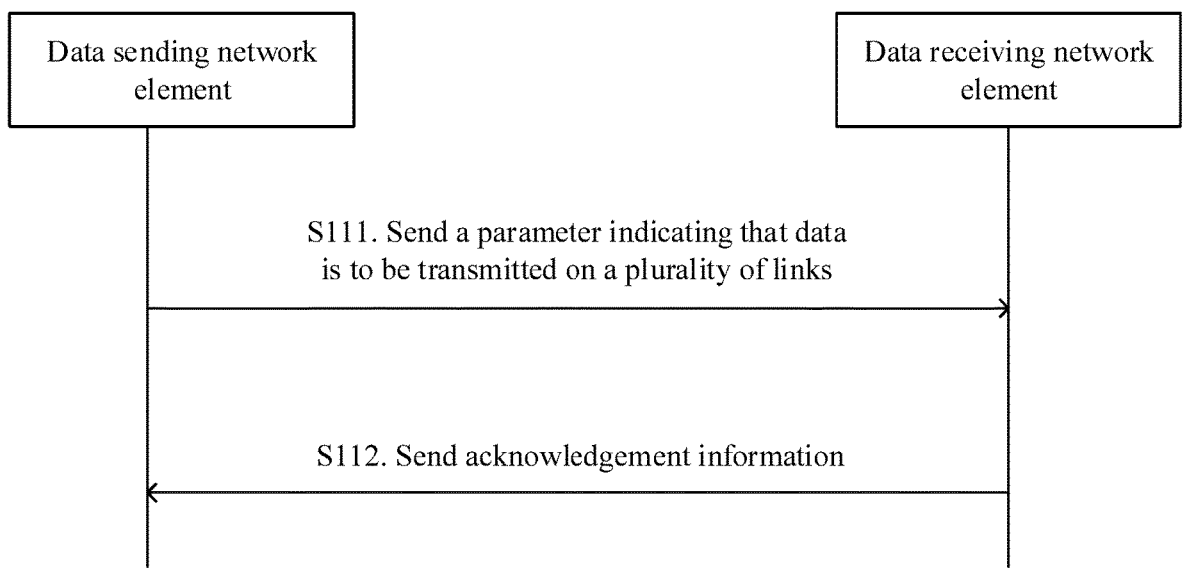
FIG. 4 is a schematic flowchart of another communication method.

Further, multi-access technology-based transmission may be further performed on the determined third service flow using a communication method shown in FIG. 4. FIG. 4 is a schematic diagram of another communication method according to an embodiment of this application. S111 and S112 are included.

S111. A data sending network element sends, to a data receiving network element, a parameter indicating that data is to be transmitted on a plurality of links.

Case 1: The data sending network element may be the terminal device shown in FIG. 2. The data receiving network element may be the UPF network element shown in FIG. 2.

When the terminal device sends, to the UPF, the parameter indicating that data is to be transmitted on a plurality of links, the request message in FIG. 3 may include the parameter indicating that data is to be transmitted on a plurality of links.

Further, the parameter indicating that data is to be transmitted on a plurality of links includes identification information of the data and indication information indicating that the data is to be transmitted on the plurality of links. The to-be-transmitted data may be the third service flow shown in FIG. 3.

The identification information of the data may be at least one of description information of the data, a QFI, or a PDU session identifier. The description information of the data is equivalent to the foregoing description information of the service flow. The description information of the data, the QFI, or the PDU session identifier is described above in detail. Details are not described herein again.

The indication information includes at least one of a TFCP indication, a TFCP-based encapsulation indication, a packet granularity flow splitting indication, a converged tunnel indication, a converged tunnel identifier, or a network element IP address, the converged tunnel indication is usable for indicating that a converged tunnel is established for the service flow, and the network element IP address is an IP address of the data sending network element or/and an IP address of the data receiving network element. The TFCP indication, the TFCP-based encapsulation indication, and the packet granularity flow splitting indication are described above in detail. The converged tunnel indication, the converged tunnel identifier, and the network element IP address is significantly described herein.

It should be understood that the TFCP may be GRE protocol, Multipath Transmission Control Protocol (MPTCP), IP, a Quick user datagram protocol (UDP) Internet Connection (QUIC) Protocol, IP Security (IPSec) protocol, or another protocol type. A type of the TFCP is not limited in this application, and may be any one of the foregoing protocols.

The converged tunnel indication indicates that a converged tunnel is established for the to-be-transmitted data. The converged tunnel corresponds to a PDU session identifier, that is, the converged tunnel is established for this PDU session. Alternatively, the converged tunnel corresponds to a QFI, that is, the converged tunnel is established for this QoS flow. Alternatively, the converged tunnel corresponds to a service flow identifier, that is, the converged tunnel is established for this service flow. Correspondingly, the converged tunnel identifier can also indicate a converged tunnel.

The network element IP address is the IP address of the data sending network element or/and the IP address of the data receiving network element. The IP address corresponds to a PDU session identifier, that is, IP-based encapsulation is performed on this PDU session. Alternatively, the IP address corresponds to a corresponding QFI, that is, IP-based encapsulation is performed on this QoS flow. Alternatively, the IP address corresponds to a corresponding service flow identifier, that is, IP-based encapsulation is performed on this service flow.

Further, the parameter indicating that data is to be transmitted on a plurality of links further includes a first window length, and the first window length is usable for indicating a transmit window length of the terminal device. The first window length may be set to a transmit window length of the terminal device at a Transmission Control Protocol (TCP) layer.

The first window length is used by the UPF to set a value of a receive window length of the UPF when the UPF receives the parameter indicating that data is to be transmitted on a plurality of links. The value of the receive window length of the UPF may be greater than or equal to the first window length.

It should be understood that when the terminal device sends, to the UPF, the parameter indicating that data is to be transmitted on a plurality of links, the terminal device may directly send, to the UPF, the parameter indicating that data is to be transmitted on a plurality of links, or the terminal device sends, to an SMF, the parameter indicating that data is to be transmitted on a plurality of links, and the SMF sends, to the UPF, the parameter indicating that data is to be transmitted on a plurality of links.

For example, the terminal device sends, to the SMF, the parameter indicating that data is to be transmitted on a plurality of links, and the SMF sends an N4 interface message to the UPF. The N4 interface message carries the parameter indicating that data is to be transmitted on a plurality of links.

It should be understood that when the N4 interface message carries the parameter indicating that data is to be transmitted on a plurality of links, the identification information that is of the data and that is in the parameter indicating that data is to be transmitted on a plurality of links may be at least one of description information of the data, a QFI, a PDU session identifier, or an N4 session identifier.

Further, the acknowledgment information indicating that data is to be transmitted on a plurality of links includes the parameter indicating that data is to be transmitted on a plurality of links, or the acknowledgment information indicating that data is to be transmitted on a plurality of links includes an acknowledgment message.

For example, the UPF sends, to the terminal device, the acknowledgment information indicating that data is to be transmitted on a plurality of links. The acknowledgment information may include the identification information of the data acknowledged by the UPF and the indication information indicating that the data is to be transmitted on the plurality of links. Alternatively, the acknowledgment information includes the acknowledgment message used to acknowledge that the terminal device sends the parameter indicating that data is to be transmitted on a plurality of links. Optionally, the acknowledgment information may further include a transmit window length of the UPF.

Further, the plurality of links may be transmission links corresponding to the different access technologies described above, and may be a 3GPP link and a non-3GPP link.

For example, two transmission links are included. A first transmission link is a transmission link corresponding to a 3GPP access technology, and a second transmission link is a transmission link corresponding to a non-3GPP access technology. To be specific, data is transmitted using the transmission links corresponding to the different access technologies.

Further, the plurality of links may alternatively be links on which different access technologies are used and that are connected to different access network devices.

For example, two transmission links are included. A first transmission link is to transmit data using a 5G RAN, and a second transmission link is to transmit data using an N3IWF. Alternatively, two transmission links are included. A first transmission link is to transmit data using a wireline 5G access network (W-5G AN), and a second transmission link is used to transmit data using a 5G RAN.

Further, the plurality of links may alternatively be links on which a same access technology is used and that are connected to different access network devices.

For example, two transmission links are included. A first transmission link is to transmit data using the 3GPP access technology and a 5G RAN device 1, and a second transmission link is to transmit data using the 3GPP access technology and a 5G RAN device 2. Alternatively, two transmission links are included. A first transmission link is to transmit data using the non-3GPP access technology and an N3IWF 1, and a second transmission link is to transmit data using the non-3GPP access technology and an N3IWF 2. Alternatively, data is transmitted using a same access technology and N different access network devices, and N may be a positive integer greater than 2.

Case 2: The data sending network element may be the UPF network element shown in FIG. 2. The data receiving network element may be the terminal device shown in FIG. 2.

It should be understood that in the case 2, the request message sent from the terminal device to the UPF may not need to carry the parameter indicating that data is to be transmitted on a plurality of links, and the UPF initiates a multi-access transmission indication. When the UPF initiates the multi-access transmission indication, the parameter indicating that data is to be transmitted on a plurality of links is similar to that in the case 1. Details are not described herein again. A difference lies in that when the parameter indicating that data is to be transmitted on a plurality of links is sent from the UPF to the terminal device, the first window length is usable for indicating a transmit window length of the UPF. The first window length may be set to a transmit window length of the UPF at a TCP protocol layer.

The first window length is used by the terminal device to set a value of a receive window length of the terminal device when the terminal device receives the parameter indicating that data is to be transmitted on a plurality of links. The value of the receive window length of the terminal device may be greater than or equal to the first window length.

Case 3: The data sending network element may be the SMF network element shown in FIG. 1. The data receiving network element may be the terminal device and the UPF network element that are shown in FIG. 2.

It should be understood that the parameter indicating that data is to be transmitted on a plurality of links may be sent from the SMF to the terminal device and the UPF. For example, the SMF adds the parameter indicating that data is to be transmitted on a plurality of links to a command message, and sends the command message to the terminal device, and adds the parameter indicating that data is to be transmitted on a plurality of links to an N4 interface message, and sends the N4 interface message to the UPF.

S112. The data receiving network element sends, to the data sending network element, the received acknowledgment information indicating that data is to be transmitted on a plurality of links.

In the case 1 shown in S111, the UPF sends the acknowledgment information to the terminal device. The acknowledgment information includes the parameter indicating that data is to be transmitted on a plurality of links. Alternatively, the acknowledgment information includes an acknowledgment message used to acknowledge that the parameter indicating that data is to be transmitted on a plurality of links is received.

Optionally, the acknowledgment information further includes a second window length used to indicate the transmit window length of the UPF.

In the case 2 shown in S111, the terminal device sends the acknowledgment information to the UPF. The acknowledgment information includes the parameter indicating that data is to be transmitted on a plurality of links. Alternatively, the acknowledgment information includes an acknowledgment message used to acknowledge that the parameter indicating that data is to be transmitted on a plurality of links is received.

Optionally, the acknowledgment information further includes a second window length used to indicate a transmit window length of the terminal device.

In the case 3 shown in S111, the terminal device sends the acknowledgment information to the SMF. The acknowledgment information includes first acknowledgment information sent from the terminal device to the SMF, and the first acknowledgment information includes the parameter indicating that data is to be transmitted on a plurality of links. Alternatively, the first acknowledgment information includes a first acknowledgment message used to acknowledge that the parameter indicating that data is to be transmitted on a plurality of links is received.

Optionally, the first acknowledgment information further includes a second window length used to indicate a transmit window length of the terminal device.

In some other embodiments, the terminal device sends the request message to the first core network element using a first access technology. The terminal device receives the response message from the first core network element using the first access technology.

In some other embodiments, the terminal device sends the request message to the first core network element using the first access technology. The terminal device receives the response message from the first core network element using a second access technology.

In some other embodiments, the terminal device sends the request message to the first core network element using the first access technology. The terminal device receives the response message from the first core network element using the first access technology and the second access technology.

The response message is usable for indicating that the service flow is to be transmitted using the second access technology or the first access technology and the second access technology. The following several cases are further included.

In some embodiments, the response message includes a first identifier and indication information of the second access technology. It is understood that the first identifier corresponds to the second access technology. This is usable for indicating that the service flow is to be transmitted using the second access technology. For example, the first identifier is description information of the service flow, and a corresponding service flow is a service flow 1. In this case, when the terminal device needs to transmit the service flow 1, the service flow 1 is transmitted using the second access technology.

In some other embodiments, the response message includes the first identifier, indication information of the first access technology, and the indication information of the second access technology. It is understood that the first identifier corresponds to the first access technology and the second access technology. This is usable for indicating that the service flow is to be transmitted using the first access technology and the second access technology. For example, the first identifier is description information of the service flow, and a corresponding service flow is a service flow 1. In this case, when the terminal device needs to transmit the service flow 1, the service flow 1 is separately transmitted using the first access technology and the second access technology.

In some other embodiments, the response message includes a correspondence between the first identifier and a QoS rule. The QoS rule is a QoS rule corresponding to the second access technology, or the QoS rule is QoS rules corresponding to the first access technology and the second access technology.

The response message may be request message instruction information. For example, the response message is a PDU session modification command message, and indicates to the terminal device to transmit the added or updated service flow using the second access technology or the first access technology and the second access technology.

The response message includes the description information of the service flow and the second access technology authorized by the first core network element, or the description information of the service flow and the first access technology and the second access technology that are authorized by the first core network element.

In this embodiment of this application, the request message sent from the terminal device to the first core network element using the first access technology needs to be sent using a first access network device. For example, the terminal device first sends the request message to the first access network device corresponding to the first access technology, and then the first access network device sends the request message to the first core network element.

Alternatively, the request message sent from the terminal device to the first core network element using the second access technology needs to be sent using a second access network device. For example, the terminal device first sends the request message to the second access network device corresponding to the second access technology, and then the second access network device sends the request message to the first core network element.

It should be understood that the response message received by the terminal device from the first core network element using the first access technology and/or the second access technology needs to be sent using the first access network device and/or the second access network device.

For example, the first core network element first sends the response message to the first access network device corresponding to the first access technology, and then the first access network device sends the response message to the terminal device.

Alternatively, the first core network element first sends the response message to the second access network device corresponding to the second access technology, and then the second access network device sends the response message to the terminal device.

Alternatively, the first core network element first sends the response message to the first access network device corresponding to the first access technology and the second access network device corresponding to the second access technology, and then the first access network device and the second access network device send the response message to the terminal device.

In some embodiments, the response message further includes a flow splitting rule, and the flow splitting rule is usable for indicating data amounts in transmission that are respectively supported by the first access technology and the second access technology, bandwidth values in transmission that are respectively supported by the first access technology and the second access technology, a ratio of a data amount that is in transmission and that is supported by the first access technology to a data amount that is in transmission and that is supported by the second access technology, or a ratio of a bandwidth that is in transmission and that is supported by the first access technology to a bandwidth that is in transmission and that is supported by the second access technology.

For example, the flow splitting rule is usable for indicating available bandwidth values in the first access technology and the second access technology, or the flow splitting rule is usable for indicating a sum of an available bandwidth value in the first access technology and an available bandwidth value in the second access technology and information about a ratio of the available bandwidth value in the first access technology to the available bandwidth value in the second access technology.

When transmitting the service flow using the first access technology and the second access technology, the terminal device may separately transmit data packets with different bandwidth values using the first access technology and the second access technology in consideration of bandwidth values that can be supported by the first access technology and the second access technology.

For example, the service flow supports packet granularity flow splitting, to be specific, the service flow can be transmitted using the first access technology and the second access technology. An available bandwidth value in the first access technology is A, and an available bandwidth value in the second access technology is B.

Alternatively, for example, the service flow supports packet granularity flow splitting, to be specific, the service flow can be transmitted using the first access technology and the second access technology. A sum of an available bandwidth value in the first access technology and an available bandwidth value in the second access technology is A, and a ratio of the available bandwidth value in the first access technology to the available bandwidth value in the second access technology is a:b. The following may be obtained based on A and a:b: the available bandwidth value in the first access technology is $A \times a/(a+b)$, and the available bandwidth value in the second access technology is $A \times b/(a+b)$.

Case 2: The terminal device receives a response message from the first core network element using the first access technology, where the response message is usable for indicating that the second access technology in the multi-access PDU session is successfully deleted.

In this embodiment of this application, when the terminal device requests to delete the second access technology to update the multi-access PDU session to a single-access PDU session, the first core network element needs to notify the terminal device of a deletion result after deleting the second access technology.

In some embodiments, the response message is further used to indicate that a service flow is to be transmitted using the first access technology, and when the second access technology is not deleted, the service flow is a service flow transmitted using the second access technology.

For example, a service flow 1 and a service flow 2 are currently transmitted using the second access technology. When the second access technology is deleted, the service flow 1 and the service flow 2 need to be transmitted using the first access technology that is not deleted. To be specific, a correspondence between the first access technology and description information of the service flow 1 and the service flow 2 indicates to the terminal device to transmit the service flow 1 and the service flow 2 using the first access technology.

After receiving the response message sent from the first core network element, the terminal device needs to send an answer message. For example, the terminal device sends the answer message to the first core network element, and the answer message is a reply message of the response message. The answer message is used by the terminal device to notify the first core network element that the terminal device determines to accept a correspondence that is between a service flow and an access technology and that is included in the response message sent from the first core network element. When the terminal device does not add the correspondence to the request message, the terminal device sends an acknowledgment indication of the response message to the first core network element, to indicate that the terminal device accepts the correspondence that is between the service flow and the access technology and that is included in the response message sent from the first core network element. An acknowledgment indication of the correspondence is that the terminal device returns the received and accepted correspondence to the first core network element.

That the first core network element indicates to the terminal device that the second access technology is successfully deleted includes the following two manners.

Manner 1: The first core network element sends a first message to a second core network element, where the first message includes indication information of the first access technology and a response message. Optionally, the first message includes third indication information, and the third indication information is N2 session management (SM) information and includes a QoS profile. The QoS profile is a QoS parameter corresponding to a service flow transmitted using the first access technology replacing the second access technology. The first access network device sends the response message to the terminal device. Optionally, when the N2 SM information is received, the first access network device stores the N2 SM information.

The first core network element sends a second message to the second core network element, where the second message includes indication information of the second access technology and an N2 resource release request. The N2 resource release request includes a second identifier, namely, a PDU session ID. The N2 resource release request indicates to the second access network device to release the PDU session resource. The second access network device releases the PDU session resource based on the N2 resource release request.

Manner 2: The first core network element sends a third message to a second core network element, where the third message includes a first correspondence between indication information of the first access technology and a combination of a response message and optional N2 SM information, and a second correspondence between indication information of the second access technology and an N2 resource release request.

The second core network element sends, based on the first correspondence, the response message and the optional N2 SM information to the first access network device corresponding to the indication information of the first access technology. The N2 SM information includes a QoS profile. The QoS profile is a QoS parameter related to a service flow transmitted using the first access technology replacing the second access technology. The first access network device sends the response message to the terminal device. Optionally, when the N2 SM information is received, the first access network device stores the N2 SM information.

The second core network element sends, based on the second correspondence, the N2 resource release request to the second access network device corresponding to the indication information of the second access technology. The N2 resource release request includes a second identifier, namely, a PDU session ID. The N2 resource release request indicates to the second access network device to release the PDU session connection resource. The second access network device releases the PDU session resource based on the N2 resource release request.

Figure 5:
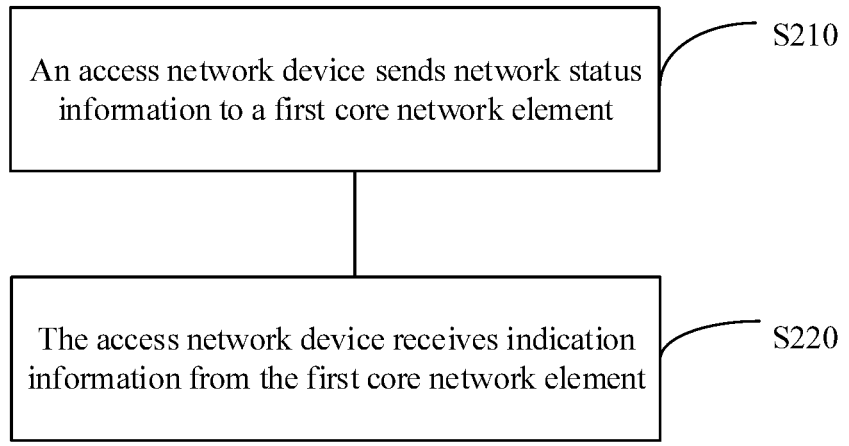
FIG. 5 is a schematic flowchart of another communication method.

FIG. 5 is a schematic flowchart of a communication method according to an embodiment of this application. The method includes the following steps.

5210. An access network device sends network status information to a first core network element. The access network device sends the network status information to the first core network element, where the network status information is usable for indicating a data transmission status of the access network device.

In some embodiments, the network status information sent from the access network device to the first core network element is first network status information sent from a first access network device corresponding to a first access technology to the first core network element. The first network status information is usable for indicating at least one of a data amount, a bandwidth, a delay, a packet loss rate, or signal strength that is in transmission and that is supported by the first access technology.

In some other embodiments, the network status information sent from the access network device to the first core network element is second network status information sent from a second access network device corresponding to a second access technology to the first core network element. The second network status information is usable for indicating at least one of a data amount, a bandwidth, a delay, a packet loss rate, or signal strength that is in transmission and that is supported by the second access technology.

In some embodiments, the network status information is a bandwidth value parameter that may be provided by the access network device for a multi-access PDU session. For example, the first access technology corresponding to the first access network device may be used to provide transmission of data whose bandwidth value is A.

In some other embodiments, the network status information is a delay parameter that may be provided by the access network device for a multi-access PDU session. For example, if a delay in the first access technology corresponding to the first access network device is 1 millisecond (ms), the first access technology may be used to provide transmission of data whose requirement of a delay is greater than 1 ms.

In some other embodiments, the network status information is a bandwidth value parameter and a delay parameter that may be provided by the access network device for a multi-access PDU session. For example, the first access technology corresponding to the first access network device may be used to provide transmission of data whose bandwidth value is A and whose delay is 1 ms.

In some other embodiments, the network status information is that the access network device can release a transmission resource of a service flow. For example, current access quality of the first access technology does not support normal transmission of a service flow 1, to be specific, the first access technology is used to release a transmission resource of the service flow 1.

In some other embodiments, the network status information is a packet loss rate or signal strength corresponding to the access network device.

In some embodiments, the network status information may be at least one of a payload, a bandwidth, a delay, a packet loss rate, or signal strength of the access network device.

The following uses an example in which the first access network device in access network devices sends the network status information to request to update a QoS profile of an access technology in the multi-access PDU session.

In some embodiments, the network status information includes service flow identification information, and the service flow identification information is usable for indicating a service flow deleted using the first access technology. It should be understood that when only one service flow is transmitted using the first access technology, the service flow identification information is not required to indicate a corresponding service flow.

In some other embodiments, the first network status information includes multi-access PDU session identification information, and the multi-access PDU session identification information is usable for indicating a multi-access PDU session in which a service flow is deleted using the first access technology. It should be understood that when only one multi-access PDU session is included between the terminal device and the UPF network element, the multi-access PDU session identification information is not required to indicate a corresponding multi-access PDU session.

When the first access technology cannot meet a transmission requirement of a service flow, for example, a quality requirement of a first service cannot be met due to performance degradation of the first access technology, the first access network device sends the first network status information to the first core network element using the first access technology, to indicate that a resource used to transmit the service flow using the first access technology is released by the first access network device.

In some embodiments, the first network status information is further used to instruct the first core network element to configure a QoS profile of the second access technology, and the second access technology is an access technology other than the first access technology in access technologies in the multi-access PDU session between the terminal device and the UPF network element. For example, when the multi-access PDU session is established, QoS of the first access technology is equal to 10 million (M), and QoS of the second access technology is equal to 10 M. When the first network status information indicates that the first access technology can support only 5 M of QoS, the first core network element configures 15 M of QoS of the second access technology.

5220. The access network device receives indication information from the first core network element.

The access network device receives the indication information sent from the first core network element, where the indication information requests the access network device to allocate a QoS parameter corresponding to the network status information.

The first access network device receives fourth indication information from the first core network element using the first access technology, where the fourth indication information indicates to the first access network device to update a QoS profile of the first access technology.

In some embodiments, updating a QoS profile of the first access technology includes the following.

The first access network device sets a bandwidth value in the first access technology to a, where a is less than or equal to A.

In some other embodiments, updating a QoS profile of the first access technology includes the following.

The first access network device sets a delay in the first access technology to x ms, where x ms is less than or equal to 1 ms.

In some other embodiments, updating a QoS profile of the first access technology includes the following.

The first access network device sets a bandwidth value in the first access technology to a and a requirement of a delay in the first access technology to x ms, where a is less than or equal to A and x ms is less than or equal to 1 ms.

In some embodiments, the first access network device receives fourth indication information from the first core network element using the first access technology. The fourth indication information is usable for indicating that a service flow is to be transmitted using the second access technology, the service flow is a service flow corresponding to description information of the service flow, the flow description information of the service flow is information sent from the terminal device to the first core network element using the first access technology, and the first access technology and the second access technology are access technologies in the multi-access PDU session between the terminal device and the UPF network element.

That the second access network device receives fifth indication information from the first core network element includes the following.

The second access network device receives the fifth indication information sent from the first core network element, where the fifth indication information requests the second access network device to allocate a second QoS profile corresponding to the first network status information, and the QoS profile includes a related QoS parameter.

The first core network element may update a QoS profile of the second access technology based on the first network status information reported by the first access network device, where the QoS profile includes a related QoS parameter.

In some embodiments, when the first network status information sent from the first access network device is usable for indicating that the first access network device deletes a transmission resource of the service flow in the first access technology, the second access network device receives the fifth indication information from the first core network element using the second access technology. The fifth indication information indicates to the second access network device to update the QoS profile of the second access technology such that the service flow can be transmitted using the second access technology.

For example, when transmission quality that is of a service flow 1 and that is in the first access technology cannot be met, the first access network device deletes the transmission resource that is used to transmit the service flow 1 and that is in the first access technology, and sends the network status information to notify the first core network element. The first core network element needs to set the QoS profile of the second access technology such that the service flow 1 can be transmitted using the second access technology, to ensure normal transmission of the service flow 1. Currently, a QoS parameter included in the QoS profile of the second access technology is QoS 1. Normal transmission of the service flow 1 can be satisfied only when the QoS 1 is updated to QoS 2. In this case, the fifth indication information sent from the first core network element includes the QoS 2, and the second access device receives the fifth indication information to update the QoS 1 to the QoS 2.

In some embodiments, the second access network device may send the second network status information to the first core network element. The second network status information includes at least one of a payload, a bandwidth, a delay, a packet loss rate, or signal strength of the second access network device.

It can be learned from FIG. 3 and FIG. 5 that the first core network element needs to process the request message of the terminal device and the indication information of the access network device, and return a corresponding answer message. The following describes in detail a communication method in the embodiments of this application with reference to FIG. 6 and FIG. 7.

Figure 6:
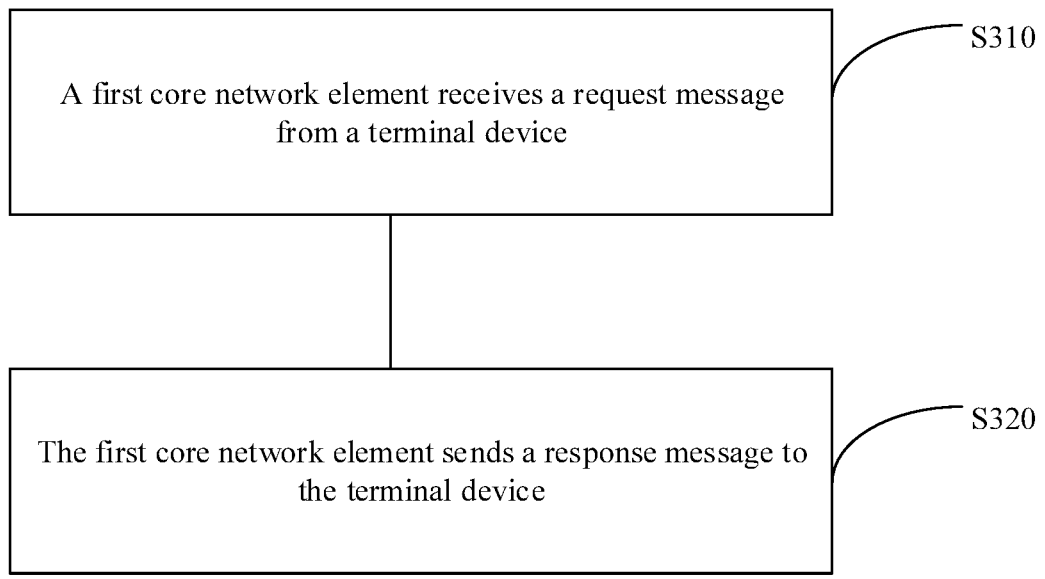
FIG. 6 is a schematic flowchart of another communication method.

FIG. 6 is a schematic flowchart of another communication method according to an embodiment of this application. The method includes the following steps.

S310. A first core network element receives a request message from a terminal device.

The first core network element receives the request message from the terminal device using a first access technology, where the request message requests to newly add or update a service flow, the request message includes a first identifier, and the first identifier is usable for determining the service flow.

The first access technology and the second access technology are two different access technologies in a multi-access PDU session between the terminal device and the UPF network element. The request message is the same as the request message in the case 1 in FIG. 3, and may carry a plurality of types of information. Details are not described herein again.

The method further includes the following. The first core network element determines an access technology corresponding to the service flow.

The first core network element determines, based on the request message and a first core network element policy, that the service flow is to be transmitted using the second access technology or the first access technology and the second access technology. The core network policy is flow splitting policy information configured on a PCF or an SMF. When the PCF configures a flow splitting policy, the PCF sends the flow splitting policy to the SMF. Optionally, a policy and charging control (PCC) rule sent from the PCF to the SMF includes the flow splitting policy. The flow splitting policy includes a correspondence between a service flow description (one of more packet filters) or an SDF template and an access technology, and an optional routing factor. The access technology is the first access technology, the second access technology, the first access technology and the second access technology, or a multi-access indication. The first access technology and the second access technology, or the multi-access indication are/is usable for indicating that the service flow may be transmitted using any one or two of the first access technology and the second access technology. When the flow splitting policy includes both the first access technology and the second access technology, a routing factor is further included for each access technology. When the routing factor is set to "NULL", it indicates that a data amount in transmission to be performed using each access technology is not limited. When the routing factor is a specific value (for example, a:b), a specific data amount, bandwidth value, data amount ratio, or bandwidth ratio in transmission to be performed using each access technology is indicated. If the flow splitting policy includes a flow description 1 or a flow template 1, a routing factor corresponding to the first access technology is a, and a routing factor corresponding to the second access technology is b, a/(a+b) of a total data amount or a total bandwidth is in transmission to be performed using the first access technology, and b/(a+b) of a total data amount or a total bandwidth is in transmission to be performed using the second access technology. The same flow splitting policy information may alternatively be configured on the SMF. Alternatively, the flow splitting policy information of the PCF indicates the first access technology and the second access technology, and the SMF determines a routing factor of each access technology based on a network link status.

In some embodiments, the terminal device requests to transmit the service flow using the first access technology. In this case, if the terminal device allows the first core network element to modify the request, the first core network element allocates a resource using the second access technology to transmit the service flow.

In some other embodiments, the terminal device requests to transmit the service flow using the second access technology. The first core network element allocates a resource using the second access technology to transmit the service flow.

In some other embodiments, the terminal device requests to transmit the service flow using the first access technology and the second access technology. The first core network element allocates resources using the first access technology and the second access technology to transmit the service flow.

Optionally, the first core network element receives a correspondence that is between a third identifier and a multi-access technology-based transmission indication and that is included in the request message. When the first core network element supports the TFCP, the first core network element allows multi-access technology-based transmission of a third service flow determined based on the third identifier, or allows TFCP-based encapsulation of a third service flow determined based on the third identifier.

S320. The first core network element sends a response message to the terminal device.

The first core network element sends the response message to the terminal device using the first access technology and/or the second access technology, where the response message includes the first identification information and indication information of the second access technology.

Alternatively, the response message includes the first identification information, indication information of the first access technology, and indication information of the second access technology, and is usable for indicating that the service flow is to be transmitted using the second access technology or the first access technology and the second access technology.

Optionally, the response message includes a third identifier and a multi-access technology-based transmission indication. The third identifier and the multi-access technology-based transmission indication indicate that the first core network element allows/authorizes multi-access technology-based transmission of a third service flow determined based on the third identifier or allows/authorizes TFCP-based encapsulation of a third service flow determined based on the third identifier. The third identifier is a service flow description (one or more packet filters), an SDF template, a QFI, or a PDU session ID. The multi-access technology-based transmission indication is a TFCP indication, a TFCP-based encapsulation indication, or a packet granularity flow splitting indication.

In some embodiments, that the first core network element sends a response message to the terminal device includes the following manners, and the indication information of the first access technology/the indication information of the second access technology may also be defined as a first access technology indication/a second access technology indication or a first access technology identifier/a second access technology identifier.

Manner 1:

The first core network element (the SMF network element shown in FIG. 2) sends a first message to a second core network element (the AMF network element shown in FIG. 2), where the first message includes indication information of the first access technology and a response message.

The second core network element sends the response message to a first access network device based on the indication information of the first access technology, and the first access network device sends the response message to the terminal device.

Manner 2:

The first core network element sends a first message to a second core network element, where the first message includes indication information of the second access technology and a response message.

The second core network element sends the response message to a second access network device based on the indication information of the second access technology, and the second access network device sends the response message to the terminal device.

Manner 3:

The first core network element sends a first message to a second core network element, where the first message includes a response message and a correspondence between the second access technology and the first access technology.

The second core network element sends the response message to a first access network device and a second access network device, and the first access network device and the second access network device send the response message to the terminal device.

Manner 4:

The first core network element sends a third message to a second core network element, where the third message includes a correspondence between the first access technology and a response message, and a correspondence between the second access technology and second indication information.

The second core network element sends the response message to a first access network device based on the correspondence between the first access technology and the response message, and the first access network device sends the response message to the terminal device.

Alternatively, when the third message includes a correspondence between the second access technology and a response message, or the second access technology and a correspondence between the second access technology and a response message, the second core network element may send the response message to a corresponding access network device based on the correspondence.

In some embodiments, that the service flow is to be transmitted using the second access technology includes the following.

Manner 1:

The first core network element sends a second message to a second core network element, where the second message includes indication information of the second access technology and second indication information. The second indication information may be N2 SM information.

The first core network element sends, based on the indication information of the second access technology, the second indication information to a second access network device corresponding to the second access technology, where the second indication information includes a QoS profile, and the QoS profile includes a QoS parameter related to the service flow.

Manner 2:

The first core network element sends a third message to a second core network element, where the third message includes a correspondence between indication information of the first access technology and a response message, and a correspondence between indication information of the second access technology and second indication information.

The second core network element sends the second indication information to a second access network device based on the correspondence between the indication information of the second access technology and the second indication information, to instruct the second access network device to update a QoS parameter of the second access technology such that the service flow can be transmitted using the second access network device.

In some embodiments, that the service flow is to be transmitted using the first access technology and the second access technology includes the following.

Manner 1:

The first core network element sends a first message to a second core network element, where the first message includes indication information of the first access technology, third indication information, and a response message. The third indication information includes a QoS profile, and the QoS profile includes a QoS parameter related to the service flow.

The third indication information may be N2 SM information used to instruct to update a QoS parameter of the first access technology.

The first core network element sends a second message to the second core network element, where the second message includes indication information of the second access technology and second indication information. The second indication information may be SM information used to instruct to update a QoS parameter of the second access technology.

The second core network element sends the third indication information and the response message to a first access network device, to instruct the first access network device to update the QoS parameter of the first access technology such that the service flow can be transmitted using the first access network device. In addition, the first access network device continues to send the response message to the terminal device.

The second core network element sends the second indication information to a second access network device, where the second indication information includes a QoS profile, and the QoS profile includes a QoS parameter related to the service flow, to instruct the second access network device to update the QoS parameter of the second access technology such that the service flow can be transmitted using the second access network device.

Manner 2:

The first core network element sends a third message to a second core network element, where the third message includes a first correspondence between indication information of the first access technology and a combination of third indication information and a response message, and a second correspondence between the second access technology and second indication information.

The second core network element sends, based on the first correspondence, the third indication information and the response message to a first access network device corresponding to the indication information of the first access technology, to instruct the first access network device to update a QoS parameter of the first access technology such that the service flow can be transmitted using the first access network device. In addition, the first access network device sends the response message to the terminal device.

In addition, the second core network element sends, based on the second correspondence, the second indication information to a second access network device corresponding to the indication information of the second access technology, to instruct the second access network device to update a QoS parameter of the second access technology such that the service flow can be transmitted using the second access network device.

The first core network element (the SMF network element shown in FIG. 1) may be further configured to send an N4 session message to a third core network element (the UPF network element shown in FIG. 1). The N4 session message includes a fourth identifier and a multi-access transmission indication. The fourth identifier is a service flow description (one or more packet filters), an SDF template, a QFI, a PDU session ID, or an N4 session identifier. An N4 session is in a one-to-one correspondence with a PDU session. The multi-access technology-based transmission indication is a TFCP indication, a TFCP-based encapsulation indication, or a packet granularity flow splitting indication. The UPF stores a correspondence between the fourth identifier and the multi-access transmission indication, and the UPF performs TFCP header parsing on user plane data based on the correspondence.

Further, the user plane UPF network element determines, based on a QFI received on a user plane, that a data packet includes a TFCP header, or determines, based on a user plane tunnel identifier, that a data packet in a PDU session includes a TFCP header, or determines, based on an end marker data packet, that a data packet received after the end marker data packet includes a TFCP header. The user plane UPF network element ranks the data packet based on a sequence number included in the TFCP packet header.

Figure 7:
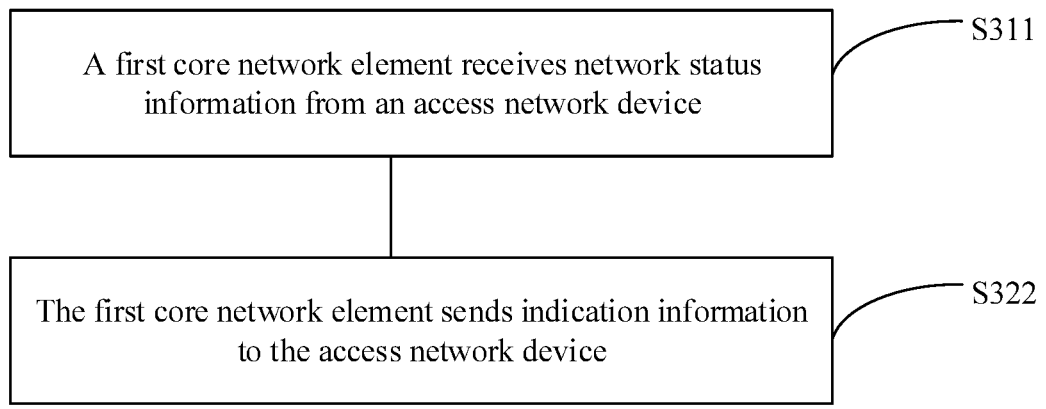
FIG. 7 is a schematic flowchart of another communication method.

FIG. 7 is a schematic flowchart of another communication method according to an embodiment of this application. The method includes the following steps.

S311. A first core network element receives network status information from an access network device.

The first core network element receives the network status information from the access network device, where the network status information is usable for indicating a data transmission status of the access network device.

In some embodiments, the first core network element receives first network status information from a first access network device.

In some embodiments, the first core network element receives second network status information from a second access network device.

In some embodiments, the first network status information is usable for indicating a data amount or a transmission bandwidth that is in transmission and that is currently supported by the first access technology. For example, the first network status information indicates at least one of a bandwidth value, a delay, a packet loss rate, or signal strength that is in transmission and that can be supported by the first access technology.

In some other embodiments, the first network status information is usable for indicating that a transmission resource of a service flow is released using the first access technology, and the service flow is any service flow transmitted using the first access technology. For example, the first network status information indicates that the first access technology does not support transmission of a service flow 1 due to quality, and a transmission resource of the service flow 1 is released using the first access technology.

The method further includes the following. The first core network element determines a QoS profile corresponding to the network status information.

The first core network element determines a QoS profile of the access network device based on the network status information.

In some embodiments, the first core network element configures a QoS profile of the first access technology based on the network status information, for example, a bandwidth value or a delay value in the first access technology.

In some other embodiments, the first core network element configures a QoS profile of the second access technology based on the network status information, for example, a bandwidth value or a delay value in the second access technology.

In some other embodiments, the first core network element configures a QoS profile of the second access technology based on the network status information such that a service flow corresponding to a resource released using the first access technology can be transmitted using the second access technology.

S322. The first core network element sends indication information to the access network device.

The first core network element sends the indication information to the access network device, where the indication information includes a QoS profile that corresponds to the network status information and that is sent to the access network device.

For example, the first core network element sends fourth indication information to the first access network device using the first access technology. The fourth indication information indicates to the first access network device to update the QoS profile of the first access technology.

In some embodiments, the fourth indication information includes a bandwidth value or a delay value in the first access technology.

In some other embodiments, the fourth indication information includes a QoS profile of the first access technology after a transmission resource corresponding to the service flow is released using the first access technology.

For another example, the first core network element sends fifth indication information to the second access network device using the second access technology. The fifth indication information indicates to the second access network device to update the QoS profile of the second access technology.

In some embodiments, the fifth indication information includes a bandwidth value or a delay value in the second access technology.

In some other embodiments, the fifth indication information includes a QoS parameter of the second access technology after a transmission resource corresponding to the service flow is released using the first access technology, and the second access technology can support transmission of the service flow after the QoS parameter of the second access technology is configured.

It should be understood that sending the fourth indication information and the fifth indication information by the first core network element is similar to sending the response message to the terminal device that is shown in FIG. 6, and may be that the first core network (SMF) network element sends two messages to a second core network (AMF) network element, and the second core network element sends the two messages to corresponding access network devices.

Alternatively, the first core network element sends a message to a second core network element, and the second core network element separately sends indication information in the message to a corresponding access network device based on a correspondence that is between each piece of indication information and an access technology and that is in the message sent from the first core network element.

Functions of the parts in a communications system in different embodiments are described in detail with reference to FIG. 3 to FIG. 7 from perspectives of functions of the terminal device, the access network device, and the first core network element.

In this embodiment, descriptions are provided using an example in which the first access network device is an NG-RAN, the second access network device is an N3IWF, the first access technology is a 3GPP access technology, the second access technology is a non-3GPP access technology, and the service flow is a newly added or updated service flow 1 in a multi-access PDU session.

Figure 8:
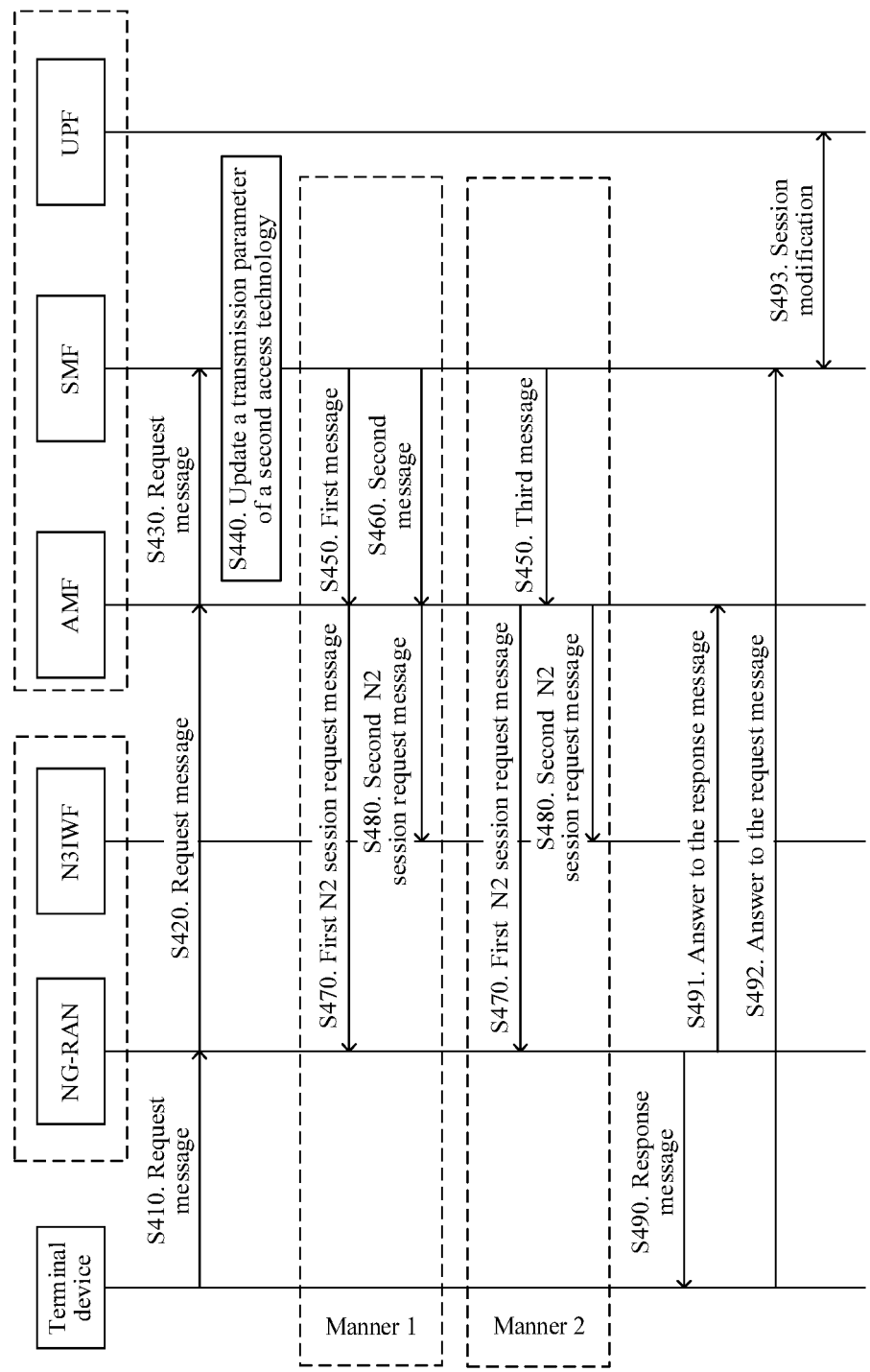
FIG. 8 is a schematic flowchart of a communication method according to a first specific embodiment of this application.

FIG. 8 is a schematic flowchart of a communication method according to a first specific embodiment of this application.

In the method in this embodiment, a terminal device initiates a PDU session modification request message using a 3GPP access technology such that the terminal device can transmit a service flow 1 using a non-3GPP access technology.

The method in this embodiment includes the following steps.

S410. The terminal device sends a request message to an NG-RAN, where the request message is a PDU session modification request message.

In a possible implementation, the PDU session modification request message may be carried in a non-access stratum transport (NAS transport) message.

The PDU session modification request message may be the request message in FIG. 3. Further, the request message includes at least one of a first identifier, a second identifier, a requested QoS parameter, a requested access technology, or a QoS rule identifier. For example, the first identifier is flow description information of a service flow 1, the second identifier is a PDU session ID, and the access technology is a non-3GPP access technology. In a possible implementation, the request message further includes first indication information indicating that an SMF is allowed to modify a correspondence between the service flow 1 and the access technology. In addition, a correspondence between a service flow description or a QFI or a PDU session identifier and a multi-access technology-based transmission indication is sent.

S420. The NG-RAN sends the request message to an AMF network element.

In a possible implementation, the NAS transport message is sent to the AMF, and the NAS transport message includes the request message.

S430. The AMF network element receives the NAS transport message, and sends the request message to the SMF network element.

S440. If the SMF network element allows transmission of the service flow 1 on a non-3GPP access technology side based on the PDU session modification request message and an SMF policy, the SMF updates a QoS profile of the non-3GPP access technology. The SMF policy includes a locally configured flow splitting rule or a flow splitting rule sent from a PCF. The SMF sends a QoS profile of the non-3GPP access technology such that a newly added or updated service flow 1 can be transmitted using the non-3GPP access technology. Information about the SMF policy is obtained from the PCF. An obtaining manner is similar to that in existing information transmission, and is not shown in the figure.

After receiving the request message and determining the QoS profile of the non-3GPP access technology, the SMF needs to instruct an N3IWF to update a corresponding QoS profile of the non-3GPP access technology, and send a PDU session modification response message to the terminal device. The PDU session modification response message includes a correspondence between a first identifier and an authorized access technology, and the authorized access technology is the non-3GPP access technology. In addition, the message includes a correspondence between a service flow description or a QFI or a PDU session identifier and a multi-access technology-based transmission indication, and is usable for indicating that a network side allows/authorizes multi-access technology-based transmission or TFCP-based encapsulation of a corresponding service flow or QFI or PDU session.

The process includes the following steps.

Manner 1:

S450. The SMF network element sends a first message to the AMF network element. The first message includes information indicating that an access technology type is set to 3GPP access and a PDU session modification response message. The PDU session modification response message includes a correspondence between flow description information of the service flow 1 and the non-3GPP access technology or a correspondence between flow description information of the service flow 1 and a QoS rule 1. The QoS rule 1 is a QoS rule on a non-3GPP side. In addition, optionally, a correspondence between a service flow description or a QFI or a PDU session identifier and a multi-access technology-based transmission indication is included. The multi-access technology-based transmission indication is usable for indicating that a data packet in a corresponding service flow or QFI or PDU session supports multi-access technology-based transmission, supports TFCP-based encapsulation, or supports packet granularity flow splitting.

S460. The SMF network element sends a second message to the AMF network element, where the second message includes information indicating that an access technology type is set to non-3GPP and N2 SM information, and the N2 SM information includes the QoS profile configured for non-3GPP.

S470. The AMF network element sends a first N2 session request message to the NG-RAN based on 3GPP access, where the first N2 session request message includes the PDU session modification response message.

S480. The AMF network element sends a second N2 session request message to the N3IWF, where the second N2 session request message includes the N2 SM information in S460, and indicates to the N3IWF to update a current QoS profile on the non-3GPP side such that the service flow 1 can be transmitted using non-3GPP.

Manner 2:

S450. The SMF network element sends a third message to the AMF network element. The third message includes a correspondence between information indicating that an access technology type is set to 3GPP access and a PDU session modification response message, and a correspondence between information indicating that an access technology type is set to non-3GPP access and N2 SM information.

S470. After the AMF network element receives the third message, the AMF network element sends an N2 session request message to the NG-RAN based on the correspondence between the information indicating that an access technology type is set to 3GPP access and the PDU session modification response message, where the N2 session request message includes the PDU session modification response message.

S480. After the AMF network element receives the third message, the AMF network element sends an N2 session request message to the N3IWF based on the correspondence between the information indicating that an access technology type is set to non-3GPP access and the N2 SM information, where the N2 session request message includes the N2 SM information, and indicates to the N3IWF to update a current QoS profile on the non-3GPP side such that the service flow 1 can be transmitted using non-3GPP.

S490. The NG-RAN sends a PDU session modification response message to the terminal device. The PDU session modification response message includes a correspondence between flow description information of the service flow 1 and non-3GPP or a correspondence between flow description information of the service flow 1 and a QoS rule, and the correspondence is usable for indicating that a newly added service flow 1 of the terminal device is transmitted using non-3GPP. In addition, the PDU session modification response message includes a correspondence between a service flow description or a QFI or a PDU session identifier and a multi-access technology-based transmission indication. The multi-access technology-based transmission indication is usable for indicating that a data packet in a corresponding service flow or QFI or PDU session supports multi-access technology-based transmission, supports TFCP-based encapsulation, or supports packet granularity flow splitting.

S491. The NG-RAN sends an N2 session reply message to the AMF network element, to indicate that the NG-RAN successfully receives the N2 session request message.

S492. The terminal device sends a PDU session modification response answer message to the SMF network element, to indicate that the terminal device successfully completes an update request.

S493. The SMF network element sends an N4 session establishment or update request message to a UPF network element, to determine that a PDU session is modified. Optionally, the N4 session establishment or update request message includes a correspondence between a multi-access technology-based transmission indication and at least one of a service flow description, a service flow template, a QFI, a PDU session ID, or an N4 session identifier. The multi-access technology-based transmission indication is usable for indicating that a data packet in a corresponding service flow or service flow template or QFI or PDU session supports multi-access technology-based transmission, supports TFCP-based encapsulation, or supports packet granularity flow splitting.

It should be understood that FIG. 8 shows merely a specific embodiment. A case in which the service flow 1 is added and the request message is sent using 3GPP is merely an example, and cannot limit the protection scope of this application. For example, alternatively, a service flow 1 in an original multi-access PDU session may change, and therefore an access technology in the session needs to be updated. Alternatively, the request message may be sent using non-3GPP to request to update a 3GPP QoS profile.

FIG. 8 shows the embodiment in which the terminal device initiates, using 3GPP, the request message used to update non-3GPP. A procedure in which an access network device initiates updating of an access technology in a multi-access PDU session is briefly described below with reference to FIG. 9.

Figure 9:
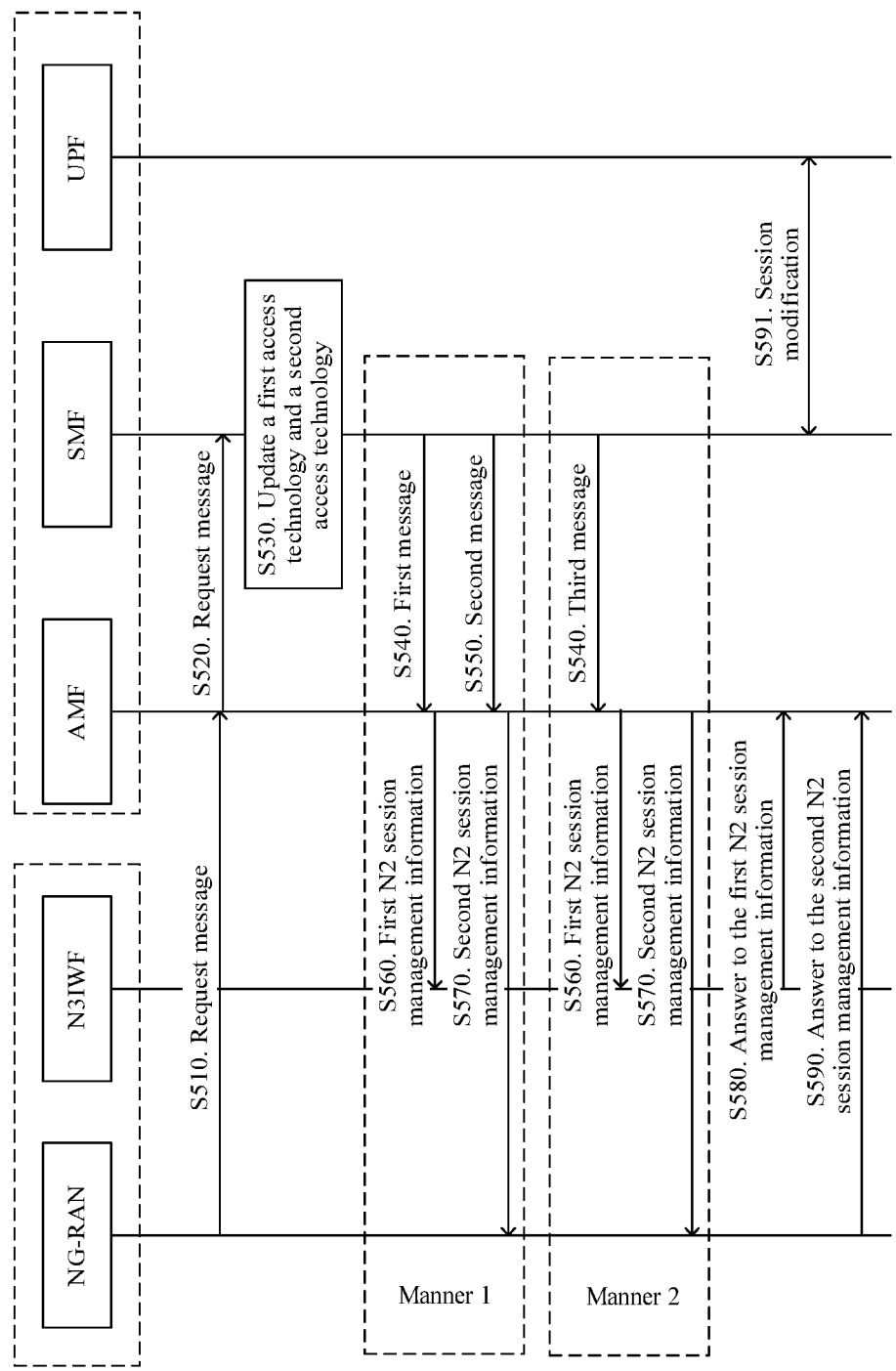
FIG. 9 is a schematic flowchart of a communication method according to a second specific embodiment of this application.

FIG. 9 is a schematic flowchart of a communication method according to a second specific embodiment of this application.

In the method in this embodiment, an NG-RAN initiates a non-3GPP modification request message in a multi-access PDU session using 3GPP such that a service flow 1 deleted using 3GPP can be transmitted using non-3GPP.

S510. The NG-RAN sends a request message to an AMF network element, where the request message is an N2 request message. For example, 3GPP cannot support normal transmission of the service flow 1 due to quality degradation. In this case, the N2 request message includes a resource that is used to transmit the service flow 1 on a 3GPP side and that is released by the NG-RAN.

S520. The AMF network element notifies an SMF network element of a status change of the access network device NG-RAN.

S530. The SMF network element sends N2 SM information to an N3IWF, where the N2 SM information carries an updated non-3GPP QoS profile. Therefore, the service flow 1 can be transmitted using non-3GPP. In addition, a QoS profile on a non-3GPP side is configured based on a QoS parameter that is used to transmit the service flow 1 using 3GPP and that is released by the NG-RAN.

That the SMF network element updates a QoS profile on the non-3GPP side and a QoS profile on the 3GPP side includes the following. The N3IWF needs to be instructed to modify a corresponding non-3GPP QoS profile, and the NG-RAN needs to be instructed to modify a corresponding 3GPP QoS profile. The process includes the following steps.

Manner 1:

S540. The SMF network element sends a first message to the AMF network element. The first message includes information indicating that an access technology type is set to 3GPP access, an optional PDU session modification response message, and a first update message. The first update message is first N2 SM information, and the first N2 SM information includes a QoS profile configured for 3GPP.

S550. The SMF sends a second message to the AMF, where the second message includes information indicating that an access technology type is set to non-3GPP access, an optional PDU session modification response message, and a second update message. The second update message is second N2 SM information, and the second N2 SM information includes a QoS profile configured for non-3GPP.

It should be understood that the PDU session modification response message exists only in S540 or S550. For example, when the PDU session modification response message is included in S540, the PDU session modification response message is not included in S550.

S560. The AMF network element sends the first N2 SM information to the NG-RAN, to instruct the NG-RAN to update a current 3GPP QoS parameter.

S570. The AMF network element sends the second N2 SM information to the N3IWF, to instruct the N3IWF to update a current non-3GPP QoS parameter such that the service flow 1 can be transmitted using non-3GPP.

It should be understood that after receiving the PDU session modification response message, the NG-RAN or the N3IWF continues to send the PDU session modification response message to the terminal device.

Manner 2:

S540. The SMF network element sends a third message to the AMF network element. The third message includes a correspondence between information indicating that an access technology type is set to 3GPP access and first N2 SM information, and a correspondence between information indicating that an access technology type is set to non-3GPP access and second N2 SM information. In addition, a PDU session modification response message corresponds to 3GPP access or non-3GPP access.

S560. After the AMF network element receives the third message, the AMF network element sends an N2 session request message to the NG-RAN based on the correspondence between the information indicating that an access technology type is set to 3GPP access and the first N2 SM information, where the N2 session request message includes the first N2 SM information. If the PDU session modification response message corresponds to 3GPP access, the N2 session request message further includes the PDU session modification response message.

S570. After the AMF network element receives the third message, the AMF network element sends an N2 session request message to the N3IWF based on the correspondence between the information indicating that an access technology type is set to non-3GPP access and the second N2 SM information, where the N2 session request message includes the second N2 SM information, and indicates to the N3IWF to update a current non-3GPP QoS parameter such that the service flow 1 can be transmitted using non-3GPP. If the PDU session modification response message corresponds to non-3GPP access, the N2 session request message further includes the PDU session modification response message.

S580. The N3IWF sends an N2 session reply message to the AMF network element, to reply to the N2 session request message in order to indicate that the non-3GPP QoS parameter is updated.

S590. The NG-RAN network element sends an N2 session reply message to the AMF network element, to reply to the N2 session request message in order to indicate that the 3GPP QoS parameter is updated.

S591. The SMF network element sends an N4 session establishment or modification message to a UPF network element, to determine that a multi-access PDU session is modified.

FIG. 8 shows the embodiment in which the terminal device initiates, using 3GPP, the request message used to update non-3GPP. A procedure in which a terminal device initiates, using 3GPP, a request message used to update 3GPP and non-3GPP is briefly described below with reference to FIG. 10.

Figure 10:
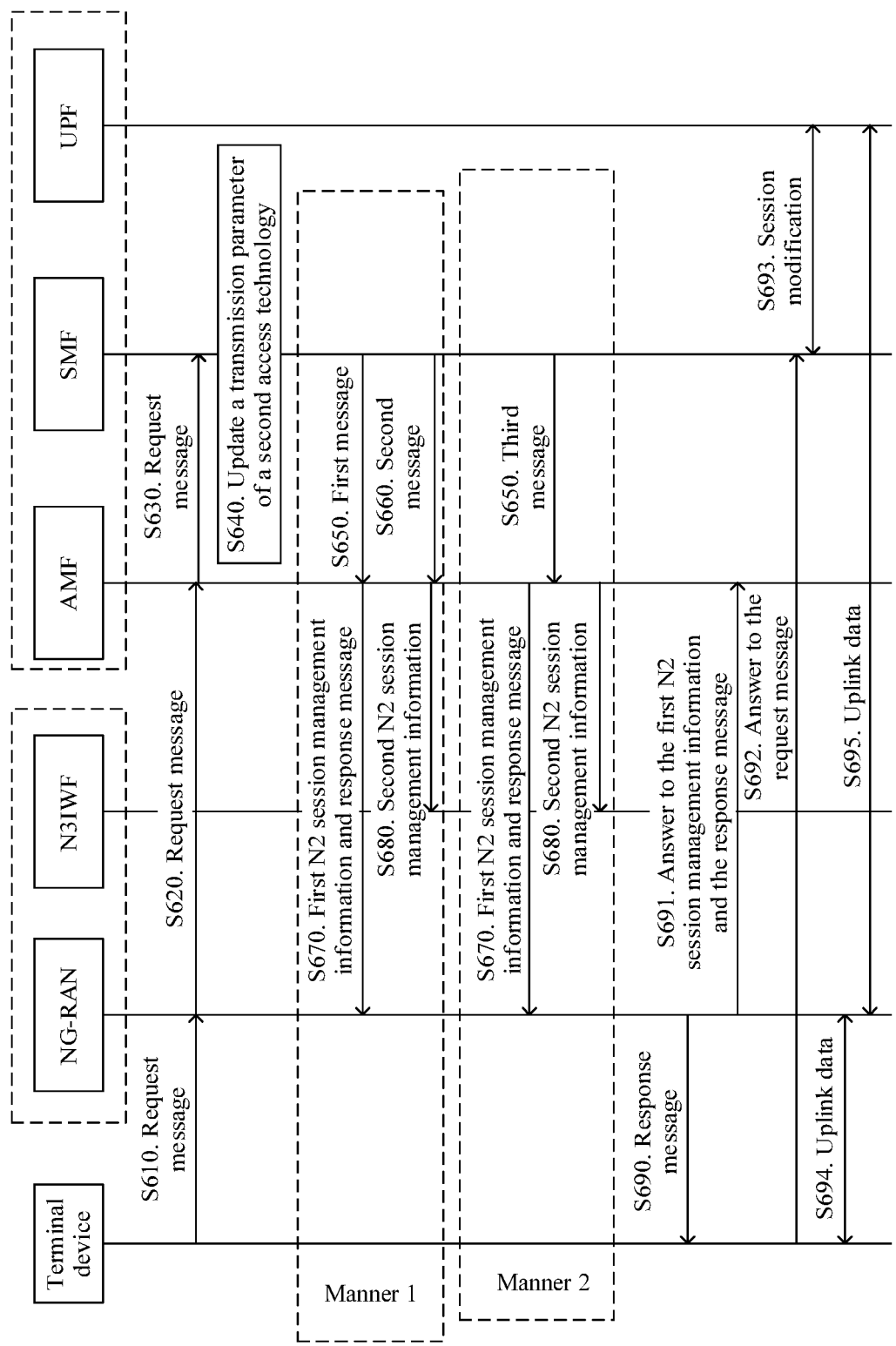
FIG. 10 is a schematic flowchart of a communication method according to a third specific embodiment of this application.

FIG. 10 is a schematic flowchart of a communication method according to a third specific embodiment of this application.

In the method in this embodiment, a terminal device initiates a PDU session modification request message using a 3GPP technology such that when a service flow 1 supports data packet flow splitting, the terminal device can transmit the service flow 1 using both the 3GPP technology and a non-3GPP technology.

S610. The terminal device sends a request message to an NG-RAN using 3GPP, where the request message is a PDU session modification request message. The PDU session modification request may be carried in a NAS transport message.

The PDU session modification request message is the request message in FIG. 3. Further, the request message includes a PDU session ID, flow description information of the service flow 1, a requested QoS parameter, and a correspondence between the service flow 1 and a combination of a requested 3GPP access technology and a requested non-3GPP access technology or a correspondence between the service flow 1 and a requested QoS rule 1. The QoS rule 1 is a QoS rule applicable to a 3GPP access technology side and a non-3GPP access technology side.

S620. The NG-RAN sends the NAS transport message to an AMF network element, where the NAS transport message includes the PDU session modification request message.

S630. The AMF network element receives the NAS transport message, and sends the PDU session modification request message to an SMF network element.

S640. The SMF network element determines, based on the PDU session modification request message and a first core network element policy, that the service flow 1 can be transmitted on the 3GPP side and the non-3GPP side, and the SMF updates a 3GPP QoS profile and a non-3GPP QoS profile. In addition, the SMF determines routing factors according to at least one of a flow splitting policy delivered by a PCF, a local policy, or network statuses on the two sides, to be specific, determines the 3GPP access technology and a routing factor a of the 3GPP access technology, and the non-3GPP access technology and a routing factor b of the non-3GPP access technology. For example, a QoS profile on the 3GPP side and a QoS profile on the non-3GPP side are set based on a requirement of the service flow 1 for the QoS profile such that a newly added service flow 1 can be transmitted using both the 3GPP access technology and the non-3GPP access technology. Further, if a guaranteed bandwidth required by the service flow 1 is A, and a ratio of the routing factor on the 3GPP side to the routing factor on the non-3GPP access technology side is a:b, a guaranteed bandwidth in the QoS profile on the 3GPP access technology side is A×a/(a+b), and a guaranteed bandwidth in the QoS profile on the non-3GPP access technology side is A×b/(a+b).

After receiving the PDU session modification request message and determining the QoS profile of the 3GPP access technology and the QoS profile of the non-3GPP access technology, the SMF network element needs to instruct the NG-RAN and an N3IWF to modify a corresponding QoS profile on the 3GPP side and a corresponding QoS profile on the non-3GPP side, and send a PDU session modification response message to the terminal device. The PDU session modification response message includes a correspondence between a first identifier and a combination of a first access technology and a second access technology. In addition, optionally, at least one of a routing factor of the first access technology and a routing factor of the second access technology is included. The ratio of the routing factor may be set to null, or may be a specific value a:b. The process includes the following steps.

Manner 1:

S650. The SMF network element sends a first message to the AMF network element. The first message includes information indicating that an access technology type is set to 3GPP access, a PDU session modification response message, and first update information. The first update information may be first N2 SM information.

S660. The SMF network element sends a second message to the AMF network element. The second message includes information indicating that an access technology type is set to non-3GPP access and second update information. The second update information may be second N2 SM information.

It should be understood that the PDU session modification command may be carried in the first message and/or the second message. An example in which the PDU session modification command is carried in the first message is used herein.

S670. The AMF network element sends an N2 session request message to the NG-RAN, where the N2 session request message includes the first update information and the PDU session modification response message, and indicates to the NG-RAN to update the corresponding QoS profile on the 3GPP side, and to transmit the PDU session modification response to the terminal device.

S680. The AMF network element sends an N2 session request message to the N3IWF, where the N2 session request message includes the second update information, and indicates to the N3IWF to update the corresponding QoS profile on the non-3GPP side.

Manner 2:

S650. The SMF network element sends a third message to the AMF network element. The third message includes a correspondence between information indicating that an access technology type is set to 3GPP access and a combination of first update information and a PDU session modification response message, and a correspondence between information indicating that an access technology type is set to non-3GPP access and second update information.

S670. After the AMF network element receives the third message, the AMF network element sends an N2 session request message to the NG-RAN based on the correspondence between the information indicating that an access technology type is set to 3GPP access and the combination of first update information and a PDU session modification response message, where the N2 session request message includes the first update information and the PDU session modification response message, and indicates to the NG-RAN to update a current 3GPP QoS profile such that the service flow 1 can be transmitted using 3GPP, and to instruct the NG-RAN to send the PDU session modification response message to the terminal device.

S680. After the AMF network element receives the third message, the AMF network element sends an N2 session request message to the N3IWF based on the correspondence between the information indicating that an access technology type is set to non-3GPP access and the second update information, where the N2 session request message indicates to the N3IWF to update a current non-3GPP QoS profile such that the service flow 1 can be transmitted using non-3GPP.

S690. The NG-RAN sends a PDU session modification response message to the terminal device. The PDU session modification response message includes a correspondence between a flow description of the service flow 1 and a combination of the 3GPP access technology and the non-3GPP access technology, or a correspondence between a flow description of the service flow 1 and a QoS rule 1. The QoS rule 1 is a QoS rule applicable to the 3GPP side and the non-3GPP side. The correspondence is usable for indicating that a newly added service flow 1 of the terminal device is transmitted using 3GPP and non-3GPP. In addition, a correspondence between a flow description or a QFI or a PDU session ID and a multi-access transmission indication is further included. The multi-access transmission indication is usable for indicating that a network side allows multi-access technology-based transmission or TFCP-based encapsulation of a data packet in a corresponding service flow or QoS flow or PDU session.

S691. The NG-RAN sends an N2 session reply message to the AMF network element, to indicate that the NG-RAN successfully receives the N2 session request message.

S692. The terminal device sends a PDU session modification response answer message to the SMF network element, to indicate that the terminal device successfully completes an update request.

S693. The SMF network element sends an N4 session establishment or modification request message to a UPF network element, to determine that a PDU session is modified. The message carries a correspondence between a flow description or a flow template or a QFI or a PDU session ID or an N4 session identifier and a multi-access technology-based transmission indication. The multi-access technology-based transmission indication is a TFCP indication or a packet granularity flow splitting indication. A function of the foregoing parameter is to indicate that the UPF network element supports to perform multi-access technology-based transmission or TFCP header-based encapsulation on a data packet in a corresponding service flow or QoS flow or PDU session.

S694. The terminal device transmits uplink data to the NG-RAN. The terminal device sends a service flow data packet to the NG-RAN on a user plane.

It should be understood that the NG-RAN is an example, and an access network device may be the NG-RAN on the 3GPP side, the N3IWF on the non-3GPP side, a trusted access gateway, a fixed network access gateway device (AGF), or the like.

The service flow 1 supports packet granularity flow splitting, to be specific, the service flow 1 can be transmitted using a plurality of access technologies. The service flow 1 supports TFCP-based encapsulation, to be specific, all data packets in the service flow 1 carry a TFCP packet header.

Packet granularity flow splitting or TFCP-based encapsulation is performed at three granularities: a service flow granularity, a QoS flow granularity, or a PDU session granularity. The service flow granularity indicates that packet granularity flow splitting or TFCP header-based encapsulation is performed on all data packets in a related service flow. The QoS flow granularity indicates that packet granularity flow splitting or TFCP header-based encapsulation is performed on all data packets in a related QoS flow. The PDU session granularity indicates that packet granularity flow splitting or TFCP header-based encapsulation is performed on all data packets in a related PDU session. The following separately describes the three execution granularities.

Execution granularity 1: Packet granularity flow splitting or TFCP header-based encapsulation is performed at the service flow granularity.

In some embodiments, if the terminal device determines to perform multi-access flow splitting on a service flow 1, the terminal device encapsulates a data packet in the service flow 1 into a TFCP header. In addition, for the data packet on which TFCP header-based encapsulation is performed, the terminal device sends TFCP indication information to the NG-RAN. The TFCP indication information indicates that TFCP header-based encapsulation is performed on the data packet in the service flow 1, or the TFCP indication information indicates that an upper-layer protocol of the data packet is the TFCP.

In some other embodiments, if the terminal device determines to perform multi-access flow splitting on a service flow 1, the terminal device sends a sequence number of a data packet in the service flow 1 to the NG-RAN. The sequence number may indicate a rank of the data packet in the service flow 1.

For example, the service flow 1 includes a data packet 1 and a data packet 2. If the data packet 1 is the first data packet, a sequence number 1 of the data packet 1 is sent to the NG-RAN, and if the data packet 2 is the second data packet, a sequence number 2 of the data packet 2 is sent to the NG-RAN. In this way, even if the data packet 1 and the data packet 2 are transmitted using different access technologies, the data packet 2 is first successfully transmitted, and then the data packet 1 is successfully transmitted, a data receive end can determine the rank of the data packet based on the sequence number of the data packet, and correctly receive the service flow 1.

It should be understood that before the terminal device sends the data packet, the terminal device sends a request message to the first core network element, to request to perform multi-access technology-based transmission on the data packet. The request message includes a correspondence between a third identifier and a multi-access transmission indication, the third identifier is usable for determining a service flow on which packet granularity flow splitting or TFCP header-based encapsulation is to be performed, and the multi-access transmission indication is usable for indicating that the service flow supports transmission using a plurality of access technologies.

The multi-access transmission indication may be a TFCP indication, a TFCP-based encapsulation indication, or a packet granularity flow splitting indication.

S695. The NG-RAN sends the data packet.

In some embodiments, the NG-RAN sends the data packet and the TFCP indication to the UPF. Further, after the NG-RAN obtains the TFCP indication, the NG-RAN adds the TFCP indication to a data packet header to be sent to the UPF. The UPF learns, based on the TFCP indication, that an upper-layer protocol at the protocol layer is the TFCP, or the UPF learns, based on the TFCP indication, that TFCP-based encapsulation is performed on an inner data packet. Subsequently, the UPF obtains the data packet through parsing according to the TFCP.

In some other embodiments, the NG-RAN sends the data packet and the sequence number of the data packet to the UPF. Further, after the access network device obtains the sequence number of the data packet, the NG-RAN adds the sequence number of the data packet to a message header to be sent to the UPF, and sends the message header to the UPF. The UPF re-ranks the data packet based on the sequence number, and correctly obtains the service flow 1 through parsing.

It should be understood that the uplink data in S694 and S695 is used as an example to describe this embodiment of this application. When the service flow supports packet granularity flow splitting, a multi-access flow splitting indication needs to be added to an uplink message, to instruct to perform packet granularity flow splitting on the service flow. Downlink data is similar to the uplink data. Details are not described herein again.

Execution granularity 2: Packet granularity flow splitting or TFCP header-based encapsulation is performed at the QoS flow granularity.

S694. The terminal device transmits uplink data to the NG-RAN. The terminal device sends a service flow data packet to the NG-RAN on a user plane. The terminal device sends, to the NG-RAN, a QoS flow identifier to which the data packet belongs, namely, the QFI.

S695. The NG-RAN sends the data packet.

The NG-RAN sends the data packet to the UPF, and sends the QFI to the UPF. Further, after the NG-RAN obtains the QFI, the NG-RAN adds the QFI to a data packet header to be sent to the UPF. The UPF learns, based on the QFI, that an upper-layer protocol at the protocol layer is the TFCP, or the UPF learns, based on the QFI, that TFCP header-based encapsulation is performed on an inner data packet. Subsequently, the UPF obtains the data packet through parsing according to the TFCP. Further, the UPF obtains the sequence number of the data packet in the TFCP header, and ranks the data packet based on the sequence number.

Downlink data is similar to the uplink data. Details are not described herein again.

It should be understood that before the terminal device sends the data packet, the terminal device sends a request message to the first core network element, to request to perform multi-access technology-based transmission on the data packet. The request message includes a correspondence between a third identifier and a multi-access transmission indication. The third identifier is a QFI. The multi-access transmission indication may be a TFCP indication, a TFCP-based encapsulation indication, or a packet granularity flow splitting indication. The third identifier is usable for determining a QoS flow on which packet granularity flow splitting or TFCP header-based encapsulation is to be performed, and the multi-access transmission indication is usable for indicating that all service flows in the QoS flow support transmission using a plurality of access technologies.

Execution granularity 3: Packet granularity flow splitting or TFCP header-based encapsulation is performed at the PDU session granularity.

S694. The terminal device transmits uplink data to the NG-RAN. The terminal device sends a service flow data packet to the NG-RAN on a user plane. The terminal device sends the data packet to the NG-RAN through an access side connection corresponding to a PDU session to which the data packet belongs.

S695. The NG-RAN sends the data packet.

The NG-RAN sends the data packet to the UPF. Further, the NG-RAN sends the data packet to the UPF on a user plane tunnel corresponding to the PDU session to which the data packet belongs. The UPF identifies, based on a tunnel identifier, the PDU session to which the data packet belongs, and determines, based on the PDU session, that an upper-layer protocol is the TFCP. Alternatively, the UPF learns, based on the PDU session, that TFCP-based encapsulation is performed on an inner data packet. Subsequently, the UPF obtains the data packet through parsing according to the TFCP. Further, the UPF obtains the sequence number of the data packet in the TFCP header, and ranks the data packet based on the sequence number.

Downlink data is similar to the uplink data. Details are not described herein again.

It should be understood that before the terminal device sends the data packet, the terminal device sends a request message to the first core network element, to request to perform multi-access technology-based transmission on the data packet. The request message includes a correspondence between a third identifier and a multi-access transmission indication. The third identifier is a PDU session ID. The multi-access transmission indication may be a TFCP indication, a TFCP-based encapsulation indication, or a packet granularity flow splitting indication. The third identifier is usable for determining a PDU session on which packet granularity flow splitting or TFCP header-based encapsulation is to be performed, and the multi-access transmission indication is usable for indicating that all service flows in the PDU session support transmission using a plurality of access technologies.

FIG. 9 shows the embodiment in which the RAN initiates, using 3GPP, the request message used to update non-3GPP. A procedure in which a RAN initiates updating of 3GPP and non-3GPP using 3GPP is briefly described below with reference to FIG. 11.

Figure 11:
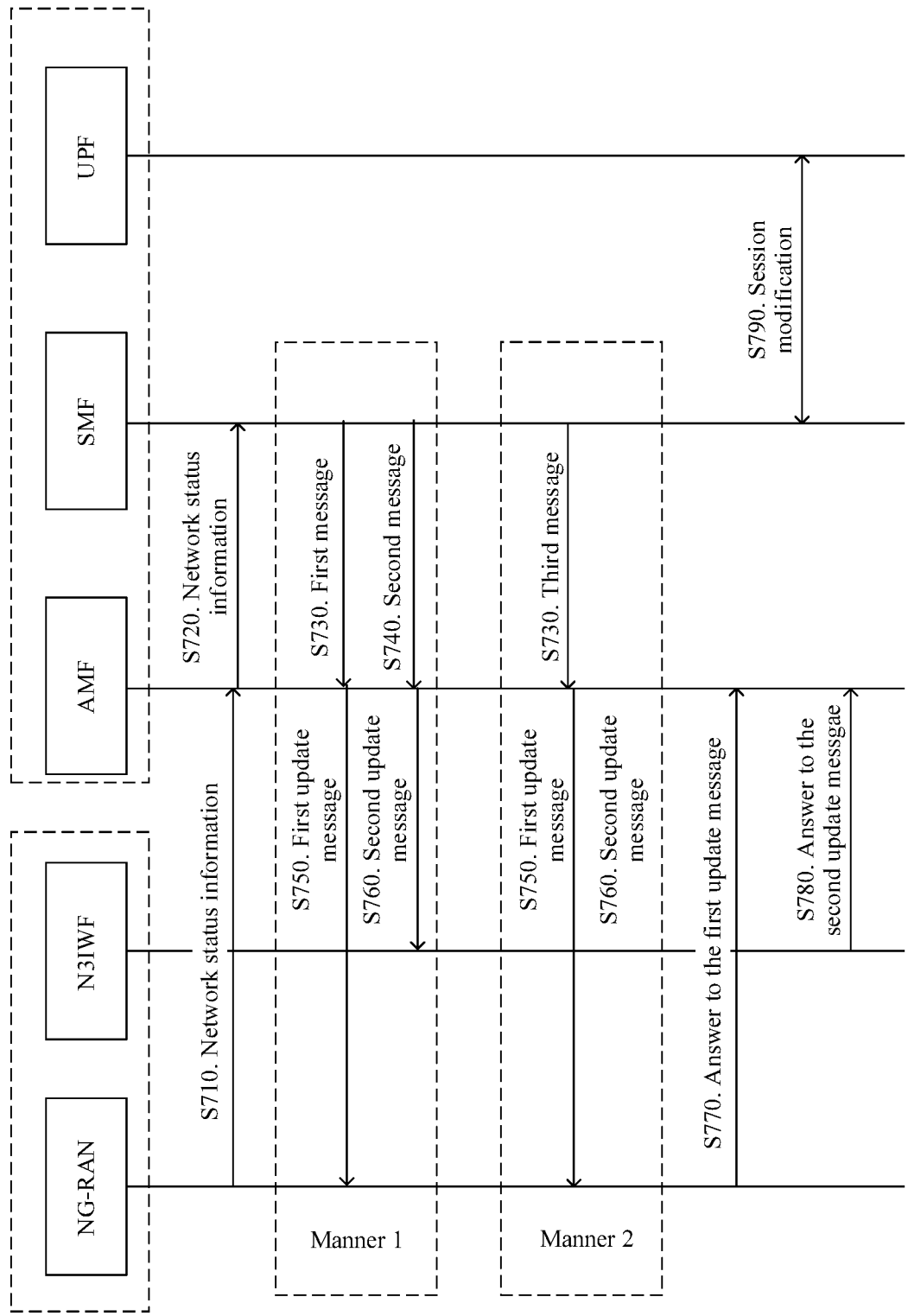
FIG. 11 is a schematic flowchart of a communication method according to a fourth specific embodiment of this application.

FIG. 11 is a schematic flowchart of a communication method according to a fourth specific embodiment of this application.

In the method in this embodiment, an NG-RAN initiates network status reporting on a 3GPP technology side, to update 3GPP and non-3GPP.

S710. The NG-RAN sends network status information to an AMF network element, to indicate a current network connection status on a 3GPP side corresponding to the NG-RAN. For example, the network status information may be at least one of a bandwidth value, a delay value, a packet loss rate, or signal strength that is in transmission and that is supported by the NG-RAN.

S720. The AMF network element sends the network status information to an SMF network element.

After the SMF network element receives the network status information, the session management function network element needs to modify 3GPP and non-3GPP QoS profiles based on the first network status information, and notify the NG-RAN and an N3IWF. The process includes the following steps.

Manner 1:

S730. The SMF sends a first message to the AMF network element, where the first message includes information indicating that an access technology type is set to 3GPP access and a first update message. The first update message is first N2 SM information, and the first N2 SM information includes a QoS profile configured for 3GPP based on the first network status information.

S740. The SMF sends a second message to the AMF network element, where the second message includes information indicating that an access technology type is set to non-3GPP access and a second update message. The second update message is second N2 SM information, and the second N2 SM information includes a QoS profile configured for non-3GPP. The second N2 SM information includes the QoS profile configured for non-3GPP based on the first network status information.

It should be understood that a PDU session modification command may alternatively be carried in the first message or the second message. The message carries a correspondence between a service flow and a combination of a first access technology and a second access technology, and a routing factor corresponding to each access technology. The routing factor is set based on the first network status information.

S750. The AMF network element sends the first N2 SM information to the NG-RAN, to instruct the NG-RAN to update a current 3GPP QoS profile.

S760. The AMF network element sends the second N2 SM information to the N3IWF, to instruct the N3IWF to update a current non-3GPP QoS profile.

It should be understood that the PDU session modification response (PDU session Modification command) is sent from the NG-RAN or the N3IWF to UE.

Manner 2:

S730. The SMF network element sends a third message to the AMF network element. The third message includes a correspondence between information indicating that an access technology type is set to 3GPP access and first N2 SM information, and a correspondence between information indicating that an access technology type is set to non-3GPP access and second N2 SM information. It should be understood that a PDU session modification response (PDU session modification command) may alternatively correspond to 3GPP access or non-3GPP access. The message carries a correspondence between a service flow and a combination of a first access technology and a second access technology, and a routing factor corresponding to each access technology. The routing factor is set based on the first network status information.

S750. After the AMF network element receives the third message, the AMF network element sends an N2 session request message to the NG-RAN based on the correspondence between the information indicating that an access technology type is set to 3GPP access and the first N2 SM information, where the N2 session request message includes the first N2 SM information.

S760. After the AMF network element receives the third message, the AMF network element sends an N2 session request message to the N3IWF based on the correspondence between the information indicating that an access technology type is set to non-3GPP access and the second N2 SM information, where the N2 session request message includes the second N2 SM information.

S770. The N3IWF sends an N2 session reply message to the AMF network element, to reply to the N2 session request message in order to indicate that the non-3GPP QoS profile is updated.

S780. The NG-RAN network element sends an N2 session reply message to the AMF network element, to reply to the N2 session request message in order to indicate that the 3GPP QoS profile is updated.

It should be understood that the PDU session modification response (PDU session modification command) is sent from the NG-RAN or the N3IWF to UE.

S790. The SMF network element sends a session modification message to a UPF network element, to determine that a multi-access PDU session is modified.

FIG. 8 shows the embodiment in which the terminal device initiates, using the first access technology, the request message used to update the second access technology. A procedure in which a terminal device initiates, using a first access technology, a request message used to delete a second access technology is briefly described below with reference to FIG. 12.

Figure 12:
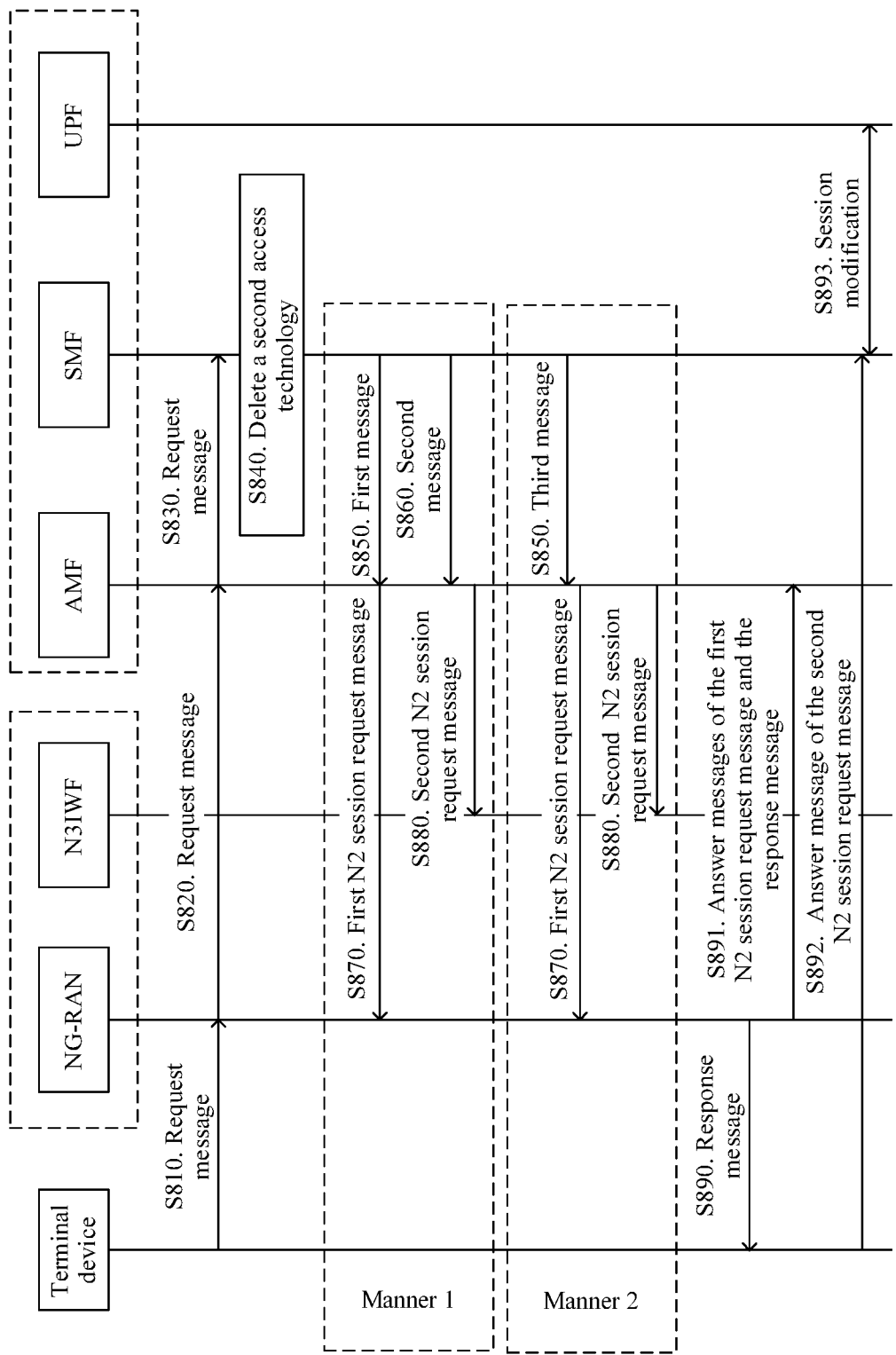
FIG. 12 is a schematic flowchart of a communication method according to a fifth specific embodiment of this application.

FIG. 12 is a schematic flowchart of a communication method according to a fifth specific embodiment of this application.

In the method in this embodiment, a terminal device initiates a PDU session modification request message or a PDU session release request message using a 3GPP access technology, to delete a connection on a non-3GPP side in a multi-access PDU session such that the multi-access PDU session is updated to a single-access PDU session.

S810. The terminal device sends a request message to an NG-RAN on a 3GPP side, where the request message is a PDU session modification request message or a PDU session release request message, and the message is used to delete a connection on a non-3GPP side. In a specific embodiment, the PDU session modification request message is the request message in FIG. 3. Further, the request message includes a first identifier and an optional deletion instruction. The first identifier indicates deleted non-3GPP access, and the deletion instruction indicates to delete a session connection on an access technology side indicated by the first identifier.

S820. The NG-RAN sends the PDU session modification request message or the PDU session release request message to an AMF network element.

S830. The AMF network element sends the PDU session modification request message or the PDU session release request message to an SMF network element.

S840. The SMF network element deletes the session connection on the non-3GPP side based on the PDU session modification request message or the PDU session release request message.

That the SMF network element receives the request message, and deletes the session connection on the non-3GPP side includes the following. The SMF network element needs to instruct an N3IWF to delete a corresponding session resource and send a response message to the terminal device. The process includes the following steps.

Manner 1:

S850. The SMF network element sends a first message to the AMF network element. The first message includes information indicating that an access technology type is set to 3GPP access and a PDU session modification response message or a PDU session release response message.

S860. The SMF network element sends a second message to the AMF network element, where the second message includes information indicating that an access technology type is set to non-3GPP access and an N2 resource release request. The N2 resource release request includes a PDU session ID. The N3IWF determines a to-be-deleted PDU session resource based on the PDU session ID.

S870. The AMF network element sends a first N2 session request message to the NG-RAN, where the first N2 session request message carries the PDU session modification response message or the PDU session release response message.

Optionally, before non-3GPP is deleted, a service flow is transmitted using non-3GPP, and after non-3GPP is deleted, the service flow needs to be transmitted using 3GPP. In this case, the PDU session modification response message or the PDU session release response message includes a correspondence between flow description information of the service flow and 3GPP, to indicate that the service flow is to be transmitted using 3GPP.

S880. The AMF network element sends a second N2 session request message to the N3IWF, where the second N2 session request message carries the N2 resource release request, to instruct the N3IWF to delete a session resource on the non-3GPP side. The N2 resource release request includes a PDU session ID. The N3IWF determines a to-be-deleted PDU session resource based on the PDU session ID.

Manner 2:

S850. The SMF network element sends a third message to the AMF network element. The third message includes a correspondence between information indicating that an access technology type is set to 3GPP access and a PDU session modification response message or a PDU session release response message, and a correspondence between information indicating that an access technology type is set to non-3GPP access and an N2 resource release request.

S870. After the AMF network element receives the third message, the AMF network element sends the PDU session modification response message or the PDU session release response message to the NG-RAN based on the correspondence between the information indicating that an access technology type is set to 3GPP access and the PDU session modification response message or the PDU session release response message.

S880. After the AMF network element receives the third message, the AMF network element sends the N2 resource release request to the N3IWF based on the correspondence between the information indicating that an access technology type is set to non-3GPP access and the N2 resource release request, to instruct the N3IWF to delete the session connection on the non-3GPP side. The N2 resource release request includes a PDU session ID. The N3IWF determines a to-be-deleted PDU session resource based on the PDU session ID.

S890. The NG-RAN sends the PDU session modification response message or the PDU session release response message to the terminal device, to notify the terminal device that non-3GPP is deleted.

Alternatively, the PDU session modification response message or the PDU session release response message indicates that the service flow transmitted using non-3GPP is to be transmitted using 3GPP.

S891. The NG-RAN sends an N2 session reply message to the AMF, to identify that the NG-RAN receives an N2 session request message sent from the AMF.

S892. The terminal device sends an answer message of the PDU session modification response message or the PDU session release response message to the SMF network element.

S893. The SMF network element sends session modification information to a UPF network element, to determine that a multi-access PDU session is modified.

Figure 13:
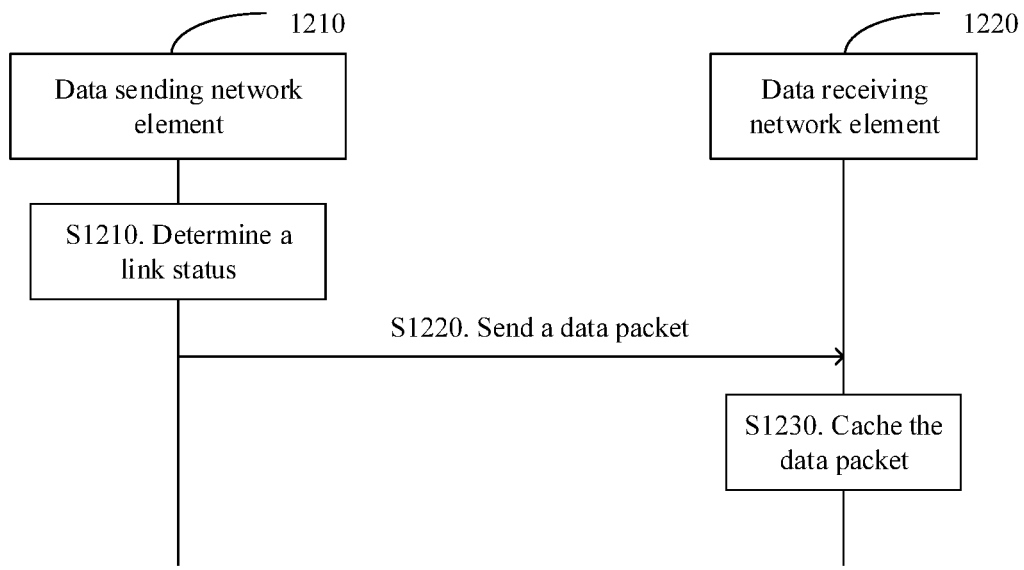
FIG. 13 is a schematic flowchart of a communication method according to a sixth specific embodiment of this application.

Based on the foregoing method embodiments, an embodiment of this application provides a service flow splitting method with reference to FIG. 13. The service flow herein is the service flow in the PDU session, the service flow in the flow, or a newly added service flow.

To be specific, service flow splitting in this embodiment may be packet granularity flow splitting at the service flow granularity, packet granularity flow splitting at the QoS flow granularity, or packet granularity flow splitting at the PDU session granularity.

FIG. 13 is a schematic flowchart of a communication method according to a sixth specific embodiment of this application. A data sending network element 1210, a data receiving network element 1220, and steps S1210 to S1230 are included.

The data sending network element 1210 may be a terminal device, and the data receiving network element 1220 may be a UPF. Alternatively, the data sending network element 1210 may be a UPF, and the data receiving network element 1220 may be a terminal device.

S1210. The data sending network element determines a link status.

The data sending network element determines a link status of a first link and/or a link status of a second link. It should be understood that before sending a data packet through flow splitting, the data sending network element first determines whether a plurality of links on which the data packet needs to be sent meet a state in which sending is performed through flow splitting.

For example, the data sending network element determines that a first RTT of the first link and a second RTT of the second link meet a first preset condition. The first preset condition may be that a difference between the first RTT and the second RTT is less than or equal to a first preset threshold. The first preset threshold is a value greater than or equal to 0.

For another example, the data sending network element determines that a first link delay of the first link and a second link delay of the second link meet a second preset condition. The second preset condition may be that a difference between the first link delay and the second link delay is less than or equal to a second preset threshold. The second preset threshold is a value greater than or equal to 0.

Further, that the data sending network element determines that the difference between the first RTT and the second RTT is less than or equal to the first preset threshold may be as follows. At an initial moment at which the data sending network element sends the data packet, an equal data amount is in sending performed on the first link and the second link, and then data amounts in sending performed on the first link and the second link are separately increased, until the RTTs of the first link and the second link change, the difference between the RTTs of the first link and the second link is greater than or close to the first preset threshold, or a value of the RTT of the first link or the second link is close to a maximum RTT that is acceptable to a service flow.

If the first preset threshold may be set to 0, when the difference between the first RTT and the second RTT is equal to 0, the first link and the second link can be used to transmit the service flow through flow splitting.

Further, that the data sending network element determines that the difference between the first link delay and the second link delay is less than or equal to the second preset threshold may be as follows. At an initial moment at which the data sending network element sends the data packet, an equal data amount is in sending performed on the first link and the second link, and then data amounts in sending performed on the first link and the second link are separately increased, until the difference between the link delays of the first link and the second link is greater than or close to the second preset threshold, or a value of the link delay of the first link or the second link is close to a maximum link delay that is acceptable to a service flow.

If the second preset threshold may be set to 0, when the difference between the first link delay and the second link delay is equal to 0, the first link and the second link can be used to transmit the service flow through flow splitting.

S1220. The data sending network element sends the data packet.

Based on the link status of the first link and/or the link status of the second link, the data sending network element transmits a first data packet on the first link, and transmits a second data packet on the second link, where the first data packet and the second data packet belong to a same service flow, the first data packet includes a first TFCP header, the first TFCP header includes a sequence number of the first data packet, the second data packet includes a second TFCP header, and the second TFCP header includes a sequence number of the second data packet.

It should be understood that when different data packets in the same service flow are transmitted on different links, the data packet needs to carry identification information that can indicate a rank of the data packet in the service flow such that the data receiving network element 1220 can correctly receive the service flow.

Further, the first data packet and the second data packet may be a same data packet. In this case, it may be understood that the data sending network element sends the service flow on both the links. The method for sending the service flow may be applied to a case in which the service flow is a service flow with a high reliability requirement.

Alternatively, in FIG. 3, a state in which the service flow is transmitted on a first side link needs to be changed to a state in which the service flow is transmitted on a second side link. In a process in which the service flow is transferred from the first side link to the second side link, the data sending network element needs to send the data packets in the service flow on both the side links. Optionally, when the service flow is transmitted on the first side link, the data sending network element sends an end marker data packet used as a last data packet transmitted on the first side link. Alternatively, optionally, when transmission of the service flow on both the first side link and the second side link starts or/and ends, the data sending network element sends an end marker data packet on the first link side or/and the second link side, where the end marker data packet is used as an indication of starting or/and ending transmission. How the data sending network element determines that transmission is completed on the first side link is not limited in this embodiment. The end marker data packet may be sent, or duration for which data is transmitted on the first side link reaches first preset duration.

Alternatively, if both flow splitting percentages that are of the first link and the second link and that are in the flow splitting policy in FIG. 3 are 100%, the terminal device determines that the first data packet and the second data packet are the same data packet.

S1230. The data receiving network element caches the data packet.

The data receiving network element receives, on the first link, the first data packet sent from the data sending network element, where the first data packet includes the first TFCP header, and the first TFCP header includes the sequence number of the first data packet. The data receiving network element receives, on the second link, the second data packet sent from the data sending network element, where the second data packet includes the second TFCP header, the second TFCP header includes the sequence number of the second data packet, and the first data packet and the second data packet belong to the same service flow. The data receiving network element caches the first data packet and/or the second data packet based on the sequence number of the first data packet and the sequence number of the second data packet.

It should be understood that when the data sending network element sends data packets on a plurality of links, the data receiving network element needs to correctly cache the received data packets based on ranks of the data packets in the service flow and identification information that is in the received data packet and that indicates a sequence of the data packets, to correctly receive the service flow including the data packets.

That the data receiving network element caches the first data packet and/or the second data packet based on the sequence number of the first data packet and the sequence number of the second data packet includes the following.

The data receiving network element stores the first data packet and the second data packet in a buffer based on a sequence number and the sequence number of the first data packet and the sequence number of the second data packet.

For example, if the data sending network element sends data packets with sequence numbers 1 and 3 on the first link, and sends data packets with sequence numbers 2 and 4 on the second link, the data receiving network element caches the data packets with the sequence numbers 1, 2, 3, and 4 in sequence based on the sequence numbers of the data packets sent on the first link and the second link.

Optionally, in some embodiments, that the data receiving network element caches the first data packet and/or the second data packet based on the sequence number of the first data packet and the sequence number of the second data packet includes the following.

If the buffer includes the first data packet and/or the second data packet, the data receiving network element discards the first data packet and/or the second data packet.

For example, a data packet with a sequence number 1 is cached in the buffer. If the data receiving network element receives a first data packet and/or a second data packet with the sequence number 1, the data receiving network element discards the first data packet and/or the second data packet.

Further, the data receiving network element sets a length of the buffer to L, and stores a minimum sequence number X of a data packet cached in the buffer, where X is a positive integer.

Optionally, in some embodiments, that the data receiving network element caches the first data packet and/or the second data packet based on the sequence number of the first data packet and the sequence number of the second data packet includes the following.

If a sequence number of the first data packet and/or a sequence number of the second data packet are/is less than a minimum sequence number of a data packet in the buffer, the data receiving network element discards the first data packet and/or the second data packet.

For example, the minimum sequence number of the data packet cached in the buffer is X. If the data receiving network element receives a first data packet and/or a second data packet with a sequence number M, where M is less than X, the data receiving network element discards the first data packet and/or the second data packet.

It should be understood that the first data packet and second data packet may be a plurality of data packets, and the names with "first" and "second" are merely used to determine whether transmission is performed on the first link or the second link.

Further, the data receiving network element determines a status of the data packet in the buffer. The status of the data packet includes a lost state and a cache state.

Further, if the data receiving network element does not receive the data packet beyond preset duration, the data receiving network element determines that the status of the data packet is the lost state. The data receiving network element determines the preset duration based on a link delay of the first link and/or a link delay of the second link, or the data receiving network element determines the preset duration based on an RTT of the first link and/or an RTT of the second link. For example, the preset duration may be set to half duration of the first RRT. Alternatively, the preset duration may be set to half duration of the second RRT. Alternatively, the preset duration may be set to a maximum value of half duration of the first RRT and half duration of the second RRT.

Assuming that the preset duration is L1, the first RRT is an RRT 1, and the second RRT is an RRT 2, L1=max (RTT 1/2, RTT 2/2).

For another example, the preset duration may be set to a link delay D1 of the first link. Alternatively, the preset duration may be set to a delay D2 of the second link. Alternatively, the preset duration may be set to a maximum value of delays of the two links.

It is assumed that the preset duration is L1, and L1=max (D1, D2), where D1 and D2 may be obtained through calculation based on the first RRT and the second RRT, may be obtained based on an empirical value, or may be specified by a system.

Further, a time period beyond the preset duration is survival duration, the survival duration is a difference between a current time and an estimated receiving time of the data packet, and the estimated receiving time of the data packet is obtained based on a receiving time of a previous data packet of the data packet or/and a receiving time of a next data packet of the data packet.

For example, the data receiving network element records a receiving moment T1 of the previous data packet of the data packet, and/or the data receiving network element records a receiving moment T2 of the next data packet of the data packet.

The data receiving network element obtains a receiving moment T3 of the data packet through calculation based on T1 and/or T2. For example, T3=T1+1, where 1 is a preset time consumed in each data packet transmission, or T3=T2−1, or T3=T1+(T2−T1)/2 or T3=T2−(T2−T1)/2 when T1 and T2 are known.

The data receiving network element obtains survival duration L2 of the data packet through calculation based on T3 and a current moment T4, for example, L2=T4−T3.

When the survival duration L2 is greater than or equal to the preset duration L1, the data receiving network element determines that the data packet is in the lost state.

For another example, the data receiving network element starts a preset duration timer based on a receiving moment of the previous data packet of the data packet or/and a receiving moment of the next data packet of the data packet. After the preset duration timer expires, the data packet is in the lost state. Further, if the receiving moment of the previous data packet of the data packet is T1, the preset duration timer of the data packet is started at T1. Alternatively, if the receiving moment of the next data packet of the data packet is T2, the preset duration timer of the data packet is started at T2. Alternatively, the preset duration timer of the data packet is started at any moment between T1 and T2.

For another example, when a data packet with a sequence number N is cached by the data receiving network element in the buffer, and the data packet with the sequence number N and the first N−1 data packets of the data packet with the sequence number N need to be output in sequence, if there is a missing third data packet in the N data packets, the third data packet is considered to be in the lost state, where N is a positive integer.

It may be understood that in this case, the survival duration L2 of the third data packet is less than or equal to the preset duration L1, and the data receiving network element no longer waits to receive the third data packet.

Further, that the data receiving network element outputs the data packets in the buffer includes the following.

When the data receiving network element receives a data packet with a sequence number Y, and caches the data packet with the sequence number Y, and all data packets whose sequence numbers are less than Y are in the buffer, the data receiving network element outputs, from the buffer, the data packet with the sequence number Y and all the data packets whose sequence numbers are less than Y that are in the buffer, where Y is greater than or equal to X. Alternatively, when some of all data packets whose sequence numbers are less than Y are in the lost state, and data packets that are not in the lost state and that are in all the data packets whose sequence numbers are less than Y are in the buffer, the data receiving network element outputs, from the buffer, the data packet with the sequence number Y and the data packets that are not in the lost state and that are in all the data packets whose sequence numbers are less than Y that are in the buffer.

Further, the data receiving network element updates X to Y+1.

When the data receiving network element receives a data packet with a sequence number Y, and all data packets whose sequence numbers are less than Y are in the buffer, the data receiving network element outputs, from the buffer, all the data packets whose sequence numbers are less than Y and that are in the buffer, where Y is greater than or equal to X. Alternatively, when some of all data packets whose sequence numbers are less than Y are in the lost state, and data packets that are not in the lost state and that are in all the data packets whose sequence numbers are less than Y are in the buffer, the data receiving network element outputs, from the buffer, the data packets that are not in the lost state and that are in all the data packets whose sequence numbers are less than Y that are in the buffer.

Further, the data receiving network element updates X to Y.

Figure 14:
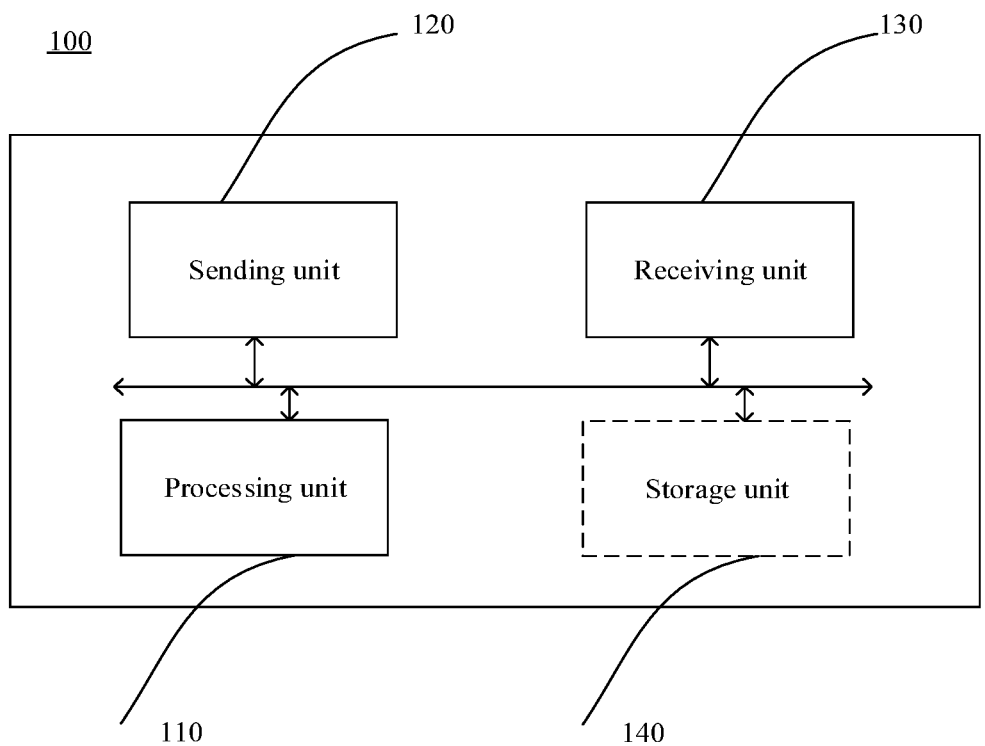
FIG. 14 is a schematic block diagram of a communications apparatus.
Figure 15:
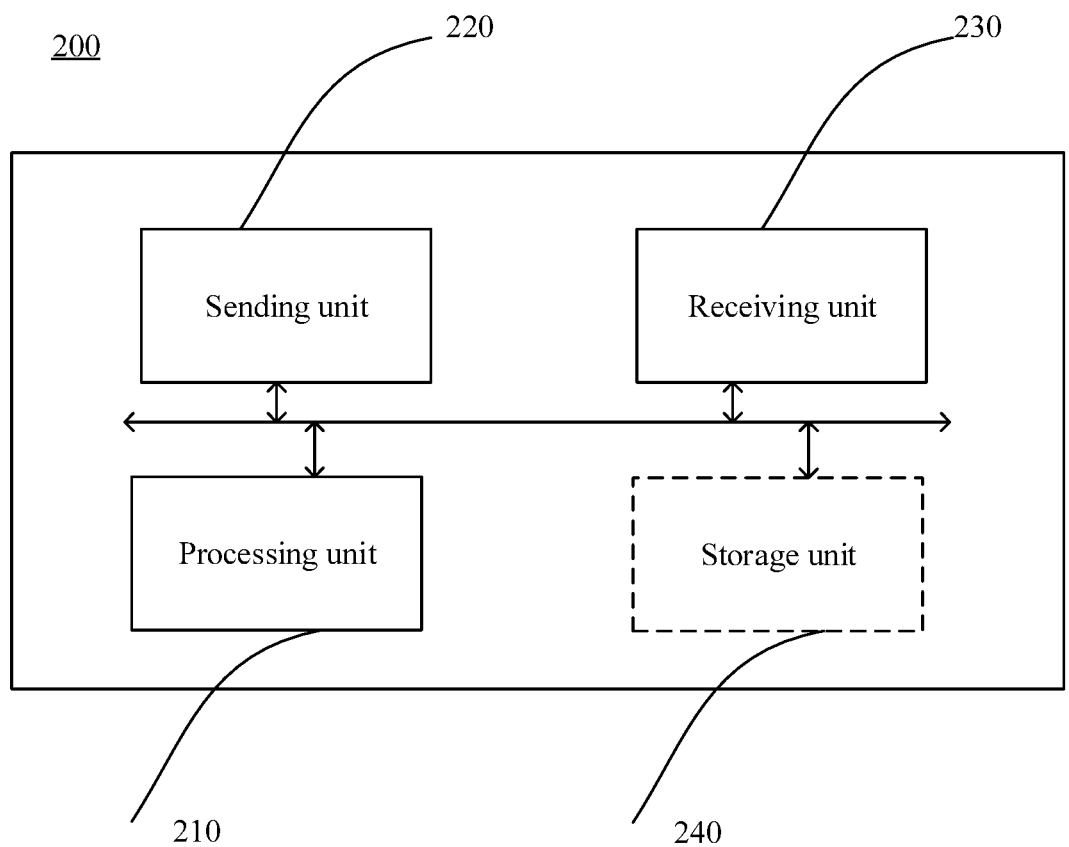
FIG. 15 is a schematic block diagram of another communications apparatus.
Figure 16:
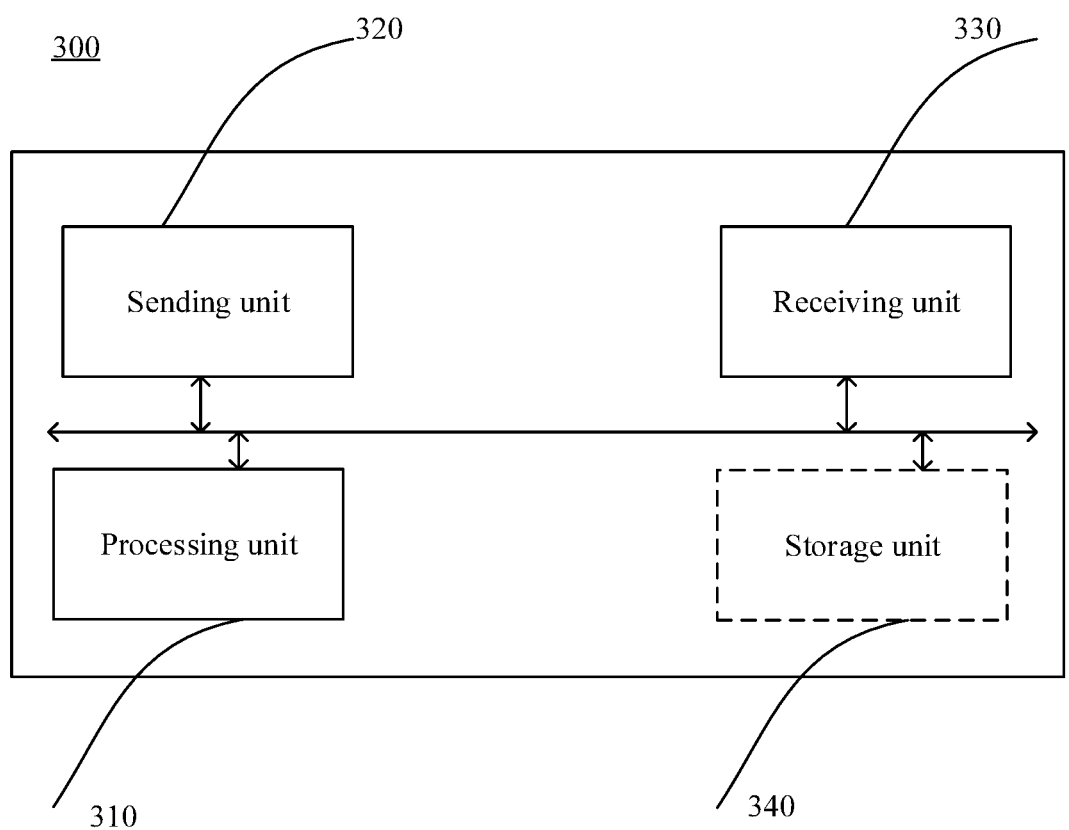
FIG. 16 is a schematic block diagram of another communications apparatus.

With reference to FIG. 3 to FIG. 13, the foregoing separately describes, from an execution action of a single device and behavior of interaction between the devices, the communication method provided in the embodiments of this application. With reference to FIG. 14 to FIG. 16, the following describes a communications apparatus provided in embodiments of this application.

FIG. 14 is a schematic structural diagram of a communications apparatus 100. The apparatus 100 may be configured to implement the method described in the foregoing method embodiments. For details, refer to the descriptions in the foregoing method embodiments. The communications apparatus 100 may be a chip, a terminal device, or the like.

The communications apparatus 100 includes one or more processing units 110. The processing unit 110 may be a general purpose processor, a dedicated processor, or the like, for example, may be a baseband processor or a CPU. The baseband processor may be configured to process a communication protocol and communication data, and the CPU may be configured to control the communications apparatus (such as a base station, a terminal, or a chip), execute a software program, and process data of the software program.

The communications apparatus may include a sending unit 120 configured to output (send) a signal. For example, the communications apparatus may be the chip, and the sending unit 120 may be an output circuit or a communications interface of the chip. The chip may be applied to the terminal device. For another example, the communications apparatus may be the terminal device, and the sending unit 120 may be a transceiver, a radio frequency chip, or the like.

The communications apparatus may include a receiving unit 130 configured to input (receive) a signal. For example, the communications apparatus may be the chip, and the receiving unit 130 may be an input circuit or a communications interface of the chip. The chip may be applied to the terminal device. For another example, the communications apparatus may be the terminal device, and the receiving unit 130 may be a transceiver, a radio frequency chip, or the like.

The communications apparatus 100 includes one or more processing units 110. The one or more processing units 110 may implement the communication method of the terminal device in the embodiments shown in FIG. 3 to FIG. 13. The communications apparatus 100 includes a sending unit configured to send a request message to a first core network element using a first access technology, where the request message requests to newly add or update a service flow, and a receiving unit configured to receive, using the first access technology and/or a second access technology, a response message of the request message from the first core network element.

The sending unit is further configured to transmit the service flow based on the response message using the second access technology or the first access technology and the second access technology.

In a possible design, the request message includes first identification information and indication information of the second access technology, and the first identification information is usable for determining the service flow.

The response message includes the first identification information and the indication information of the second access technology.

Alternatively, the response message includes the first identification information, indication information of the first access technology, and the indication information of the second access technology.

In another possible design, the request message includes first identification information, indication information of the first access technology, and indication information of the second access technology, and the first identification information is usable for determining the service flow.

The response message includes the first identification information and the indication information of the second access technology.

Alternatively, the response message includes the first identification information, the indication information of the first access technology, and the indication information of the second access technology.

In another possible design, the request message includes first identification information and indication information of the first access technology, and the first identification information is usable for determining the service flow.

The response message includes the first identification information and indication information of the second access technology.

Alternatively, the response message includes the first identification information, the indication information of the first access technology, and indication information of the second access technology.

In another possible design, the request message further includes first indication information, where the first indication information is usable for indicating that the first core network element is allowed to modify an access technology corresponding to the service flow.

In a possible design, the first identification information includes at least one of description information of the service flow, a QFI, or a PDU session identifier.

In a possible design, the indication information of the first access technology is a first access type, and the indication information of the second access technology is a second access type.

Alternatively, the indication information of the first access technology is a QoS rule corresponding to a first access type, and the indication information of the second access technology is a QoS rule corresponding to a second access type.

Alternatively, the indication information of the first access technology and the indication information of the second access technology are QoS rules corresponding to a first access type and a second access type.

In a possible design, the response message includes a flow splitting rule, and the processing unit is configured to determine, according to the flow splitting rule, data amounts of the service flow that are in transmission to be performed using the first access technology and the second access technology, and that the sending unit transmits the service flow based on the response message using the first access technology and the second access technology includes the following.

The sending unit transmits the service flow based on the data amounts using the first access technology and the second access technology.

In a possible design, the flow splitting rule includes a bandwidth value that is of the service flow and that is in transmission to be performed using the first access technology and/or a bandwidth value that is of the service flow and that is in transmission to be performed using the second access technology.

Alternatively, the flow splitting rule includes a ratio of the data amount that is of the service flow and that is in transmission to be performed using the first access technology to the data amount that is of the service flow and that is in transmission to be performed using the second access technology or a ratio of a bandwidth value that is of the service flow and that is in transmission to be performed using the first access technology to a bandwidth value that is of the service flow and that is in transmission to be performed using the second access technology.

The communications apparatus 100 shown in FIG. 14 implements the communication method of the terminal device in the embodiments shown in FIG. 3 to FIG. 13. In specific implementation, the communications apparatus 100 further includes a sending unit configured to send a request message to a first core network element using a first access technology, where the request message requests to delete a second access technology in a multi-access PDU session, and a receiving unit configured to receive a response message of the request message from the first core network element using the first access technology, where the response message is usable for indicating that the second access technology in the multi-access PDU session is successfully deleted.

In a possible design, the request message further includes at least one of a deletion instruction and indication information of the second access technology, the deletion instruction indicates to delete the second access technology in the multi-access PDU session, and the indication information of the second access technology is usable for indicating the second access technology.

In a possible design, the response message includes a first identifier and indication information of the first access technology, the first identifier is usable for indicating that a service flow is to be transmitted using the first access technology, and when the second access technology is not deleted, the service flow is a service flow transmitted using the second access technology.

The communications apparatus 100 shown in FIG. 14 implements the communication method of the terminal device in the embodiments shown in FIG. 3 to FIG. 13. In specific implementation, the communications apparatus 100 further includes a sending unit configured to send a request message to a first core network element using a first access technology, where the request message requests to newly add or update a third service flow or requests to establish a PDU session, and a receiving unit configured to receive, using the first access technology and/or a second access technology, a response message sent from the first core network element.

The sending unit is further configured to transmit the third service flow or the PDU session based on the response message using a plurality of access technologies.

In a possible design, the third identifier includes at least one of description information of a service flow, a QFI, or a PDU session identifier.

In another possible design, the multi-access transmission indication is a TFCP indication, a TFCP-based encapsulation indication, or a packet granularity flow splitting indication.

In another possible design, the processing unit is configured to determine, based on a QFI, that a data packet includes a TFCP header, or determine, based on a PDU session to which a data packet belongs, that the data packet includes a TFCP header, or determine, based on an end marker data packet, that a data packet received after the end marker data packet includes a TFCP header.

In another possible design, the processing unit is configured to rank the data packet based on a sequence number included in the TFCP packet header.

In a possible design, the communications apparatus 100 may further include a storage unit 140 configured to store a corresponding instruction. The processing unit executes the instruction in the storage unit to implement operations of the terminal device in the foregoing method embodiments.

FIG. 15 is a schematic structural diagram of a communications apparatus 200. The apparatus 200 may be configured to implement the method described in the foregoing method embodiments. For details, refer to the descriptions in the foregoing method embodiments. The communications apparatus 200 may be a chip, an access network device, or the like.

The communications apparatus 200 includes one or more processing units 210. The processing unit 210 may be a general purpose processor, a dedicated processor, or the like, for example, may be a baseband processor or a CPU. The baseband processor may be configured to process a communication protocol and communication data, and the CPU may be configured to control the communications apparatus (such as a base station, a terminal, or a chip), execute a software program, and process data of the software program.

The communications apparatus may include a sending unit 220 configured to output (send) a signal. For example, the communications apparatus may be the chip, and the sending unit 220 may be an output circuit or a communications interface of the chip. The chip may be applied to the access network device. For another example, the communications apparatus may be the access network device, and the sending unit 220 may be a transceiver, a radio frequency chip, or the like.

The communications apparatus may include a receiving unit 230 configured to input (receive) a signal. For example, the communications apparatus may be the chip, and the sending unit 120 may be an input circuit or a communications interface of the chip. The chip may be applied to the access network device. For another example, the communications apparatus may be the access network device, and the receiving unit 230 may be a transceiver, a radio frequency chip, or the like.

The communications apparatus 200 includes one or more processing units 210. The one or more processing units 210 may implement the communication method of the access network device in the embodiments shown in FIG. 3 to FIG. 13. The communications apparatus 200 includes a sending unit configured to send network status information to a first core network element, where the network status information is usable for indicating a data transmission status of the access network device, a receiving unit configured to receive indication information from the first core network element, where the indication information includes a QoS profile that corresponds to the network status information and that is sent to the access network device, and a processing unit configured to update QoS profile based on the indication information.

In a possible design, the network status information includes at least one of a payload, a bandwidth, a delay, a packet loss rate, or signal strength of the first access network device.

In a possible design, the indication information includes a first identifier and indication information of an access technology, and is usable for indicating that a service flow is to be transmitted using the access technology indicated by the indication information of the access technology, and the first identifier is usable for determining the service flow.

The communications apparatus 200 shown in FIG. 15 may implement the communication method of the access network device in the embodiments shown in FIG. 3 to FIG. 13. In specific implementation, the communications apparatus 200 further includes a receiving unit configured to receive a first data packet from a terminal device, where a packet header of the first data packet carries a fifth identifier, and the fifth identifier is usable for indicating that the first data packet supports flow splitting using a plurality of access technologies, and a sending unit configured to send a second data packet to a first core network element, where a packet header of the second data packet includes a sixth identifier, the sixth identifier is usable for indicating that the second data packet supports flow splitting using a plurality of access technologies, and the second data packet includes data content of the second data packet.

In a possible design, that the fifth identifier or the sixth identifier is usable for indicating that the data packet supports flow splitting using a plurality of access technologies includes the following. The fifth identifier or the sixth identifier is usable for indicating that the data packet supports the TFCP, or the data packet includes a TFCP packet header or a sequence number of the data packet.

In another possible design, that the first core network element obtains the data packet based on the sixth identifier includes the following. Based on the sixth identifier, the first core network element parses the TFCP packet header or ranks the data packet.

In a possible design, the communications apparatus 200 may further include a storage unit 240 configured to store a corresponding instruction. The processing unit executes the instruction in the storage unit to implement operations of the access network device in the foregoing method embodiments.

FIG. 16 is a schematic structural diagram of a communications apparatus 300. The apparatus 300 may be configured to implement the method described in the foregoing method embodiments. For details, refer to the descriptions in the foregoing method embodiments. The communications apparatus 300 may be a chip, a core network device, or the like.

The communications apparatus 300 includes one or more processing units 310. The processing unit 310 may be a general purpose processor, a dedicated processor, or the like. The CPU may be configured to control the communications apparatus (such as a base station, a terminal, or a chip), execute a software program, and process data of the software program.

The communications apparatus may include a sending unit 320 configured to output (send) a signal. For example, the communications apparatus may be the chip, and the sending unit 320 may be an output circuit or a communications interface of the chip. The chip may be applied to the core network device. For another example, the communications apparatus may be the core network device, and the sending unit 320 may be a transceiver, a radio frequency chip, or the like.

The communications apparatus may include a receiving unit 330 configured to input (receive) a signal. For example, the communications apparatus may be the chip, and the receiving unit 330 may be an input circuit or a communications interface of the chip. The chip may be applied to the core network device. For another example, the communications apparatus may be the core network device, and the receiving unit 330 may be a transceiver, a radio frequency chip, or the like.

The communications apparatus 300 includes one or more processing units 310. The one or more processing units 310 may implement the communication method of the first core network element in the core network in the embodiments shown in FIG. 3 to FIG. 13. The communications apparatus 300 includes a receiving unit configured to receive a request message from a terminal device using a first access technology, where the request message requests to newly add or update a service flow, and a sending unit configured to send a response message of the request message to the terminal device using the first access technology and/or a second access technology.

The response message indicates to the terminal device to transmit the service flow using the second access technology or the first access technology and the second access technology.

In a possible design, the request message includes first identification information and indication information of the second access technology, and the first identification information is usable for determining the service flow.

The response message includes the first identification information and the indication information of the second access technology.

Alternatively, the response message includes the first identification information, indication information of the first access technology, and the indication information of the second access technology.

In another possible design, the request message includes first identification information, indication information of the first access technology, and indication information of the second access technology, and the first identification information is usable for determining the service flow.

The response message includes the first identification information and the indication information of the second access technology.

Alternatively, the response message includes the first identification information, the indication information of the first access technology, and the indication information of the second access technology.

In another possible design, the request message includes first identification information and indication information of the first access technology, and the first identification information is usable for determining the service flow.

The response message includes the first identification information and indication information of the second access technology.

Alternatively, the response message includes the first identification information, the indication information of the first access technology, and indication information of the second access technology.

In another possible design, the request message further includes first indication information, where the first indication information is usable for indicating that the first core network element is allowed to modify an access technology corresponding to the service flow.

In a possible design, the first identification information includes at least one of description information of the service flow, a QFI, or a PDU session identifier.

In a possible design, the indication information of the first access technology is a first access type, and the indication information of the second access technology is a second access type.

Alternatively, the indication information of the first access technology is a QoS rule corresponding to a first access type, and the indication information of the second access technology is a QoS rule corresponding to a second access type.

Alternatively, the indication information of the first access technology and the indication information of the second access technology are QoS rules corresponding to a first access type and a second access type.

In a possible design, the response message includes a flow splitting rule, and the terminal device determines, according to the flow splitting rule, data amounts of the service flow that are in transmission to be performed using the first access technology and the second access technology.

That the terminal device transmits the service flow based on the response message using the first access technology and the second access technology includes the following.

The terminal device transmits the service flow based on the data amounts using the first access technology and the second access technology.

In a possible design, the flow splitting rule includes the data amount that is of the service flow and that is in transmission to be performed using the first access technology and/or the data amount that is of the service flow and that is in transmission to be performed using the second access technology.

Alternatively, the flow splitting rule includes a bandwidth value that is of the service flow and that is in transmission to be performed using the first access technology and/or a bandwidth value that is of the service flow and that is in transmission to be performed using the second access technology.

Alternatively, the flow splitting rule includes a ratio of the data amount that is of the service flow and that is in transmission to be performed using the first access technology to the data amount that is of the service flow and that is in transmission to be performed using the second access technology or a ratio of a bandwidth value that is of the service flow and that is in transmission to be performed using the first access technology to a bandwidth value that is of the service flow and that is in transmission to be performed using the second access technology.

The processing unit 310 is further configured to obtain policy information of the service flow.

The sending unit is configured to send a response message of the request message to the terminal device using the first access technology and/or a second access technology.

The sending unit sends the response message of the request message to the terminal device based on the policy information using the first access technology and/or the second access technology.

In a possible design, the policy information includes a data amount that is of the service flow and that is in transmission to be performed using the first access technology and/or a data amount that is of the service flow and that is in transmission to be performed using the second access technology, or a bandwidth value that is of the service flow and that is in transmission to be performed using the first access technology and/or a bandwidth value that is of the service flow and that is in transmission to be performed using the second access technology, or a ratio of a data amount that is of the service flow and that is in transmission to be performed using the first access technology to a data amount that is of the service flow and that is in transmission to be performed using the second access technology or a ratio of a bandwidth value that is of the service flow and that is in transmission to be performed using the first access technology to a bandwidth value that is of the service flow and that is in transmission to be performed using the second access technology.

In a possible design, that the service flow is transmitted using the second access technology includes the following.

The sending unit is configured to send second indication information to a second access network device corresponding to the second access technology, where the second indication information includes a QoS profile, and the QoS profile includes a QoS parameter related to the service flow.

In another possible design, that the service flow is transmitted using the first access technology and the second access technology includes the following.

The sending unit is configured to send third indication information to a first access network device corresponding to the first access technology, where the third indication information includes a QoS profile, and the QoS profile includes a QoS parameter related to the service flow, and the sending unit is configured to send second indication information to a second access network device corresponding to the second access technology, where the second indication information includes a QoS profile, and the QoS profile includes a QoS parameter related to the service flow.

In a possible design, that the sending unit sends second indication information to a second access network device corresponding to the second access technology includes the following.

The sending unit is configured to send a second message to a second core network element, where the second message includes indication information of the second access technology and the second indication information, and the indication information of the second access technology indicates sending the second indication information to the second access network device corresponding to the second access technology.

In a possible design, that the sending unit sends second indication information to a second access network device corresponding to the second access technology includes the following.

The sending unit is configured to send a third message to a second core network element, where the third message includes the third indication information, indication information of the first access technology, the second indication information, and indication information of the second access technology, and the second indication information and the indication information of the second access technology that are in the third message indicate sending the second indication information to the second access network device corresponding to the second access technology.

In a possible design, that the sending unit sends third indication information to a first access network device corresponding to the first access technology includes the following.

The sending unit is configured to send a first message to a second core network element, where the first message includes indication information of the first access technology and the third indication information, and the indication information of the first access technology indicates sending the third indication information to the first access network device corresponding to the first access technology.

In a possible design, that the sending unit sends third indication information to a first access network device corresponding to the first access technology includes the following.

The sending unit is configured to send a third message to a second core network element, where the third message includes the third indication information, indication information of the first access technology, the second indication information, and indication information of the second access technology, and the third indication information and the indication information of the first access technology that are in the third message indicate sending the third indication information to the first access network device corresponding to the first access technology.

In a possible design, at least one of the first message, the second message, and the third message includes the response message.

The communications apparatus 300 shown in FIG. 16 may implement the communication method of the first core network element in the core network in the embodiments shown in FIG. 3 to FIG. 13. In specific implementation, the communications apparatus 300 further includes a receiving unit configured to receive a request message from a terminal device using a first access technology, where the request message requests to delete a second access technology in a multi-access PDU session, and a sending unit configured to send a response message to the terminal device using the first access technology, where the response message is usable for indicating that the second access technology in the multi-access PDU session is successfully deleted.

In a possible design, the request message further includes at least one of a deletion instruction and indication information of the second access technology, the deletion instruction indicates to delete the second access technology in the multi-access PDU session, and the indication information of the second access technology is usable for indicating the second access technology.

In a possible design, the response message includes a first identifier and indication information of the first access technology, the first identifier is usable for indicating that a service flow is to be transmitted using the first access technology, and when the second access technology is not deleted, the service flow is a service flow transmitted using the second access technology.

The communications apparatus 300 shown in FIG. 16 may implement the communication method of the first core network element in the core network in the embodiments shown in FIG. 3 to FIG. 13. In specific implementation, the communications apparatus 300 further includes a receiving unit configured to receive network status information from a first access network device using a first access technology, a processing unit configured to configure, based on the network status information, a QoS profile corresponding to the first access technology, and a sending unit configured to send fourth indication information to the first access network device using the first access technology, where the fourth indication information indicates to the first access network device to update the QoS profile corresponding to the first access technology.

In a possible design, the network status information includes at least one of a payload, a bandwidth, a delay, a packet loss rate, or signal strength of the first access network device.

The communications apparatus 300 shown in FIG. 16 may implement the communication method of the first core network element in the core network in the embodiments shown in FIG. 3 to FIG. 13. In specific implementation, the communications apparatus 300 further includes a receiving unit configured to receive a request message from a terminal device using a first access technology, where the request message requests to newly add or update a third service flow or requests to establish a PDU session, and a sending unit configured to send a response message to the terminal device using the first access technology and/or a second access technology, where the response message is usable for indicating that the third service flow or the PDU session allows transmission using a plurality of access technologies.

In a possible design, the request message or the response message further includes a third identifier and a multi-access technology-based transmission indication, and the multi-access technology-based transmission indication is usable for indicating that the terminal device requests to perform multi-access technology-based transmission or TFCP-based encapsulation on the third service flow or the PDU session determined based on the third identifier.

In a possible design, the third identifier includes at least one of description information of a service flow, a QFI, or a PDU session identifier.

In a possible design, the multi-access transmission indication is a TFCP indication, a TFCP-based encapsulation indication, or a packet granularity flow splitting indication.

In a possible design, the sending unit is configured to send a fourth identifier and a multi-access technology-based transmission indication to a user plane network element.

In a possible design, the fourth identifier is at least one of description information of a service flow, a QFI, a PDU session identifier, or an N4 session identifier.

In a possible design, the QFI is used by the terminal device to determine that a data packet includes a TFCP header, or the tunnel identifier is used by the terminal device to determine that a data packet in the PDU session includes a TFCP header, or an end marker data packet is used by the terminal device to determine that a data packet received after the end marker data packet includes a TFCP header.

In a possible design, a sequence number included in the TFCP packet header is used to rank the data packet.

In a possible design, the communications apparatus 300 may further include a storage unit 340 configured to store a corresponding instruction. The processing unit executes the instruction in the storage unit to implement operations of the first core network element in the foregoing method embodiments.

Figure 17:
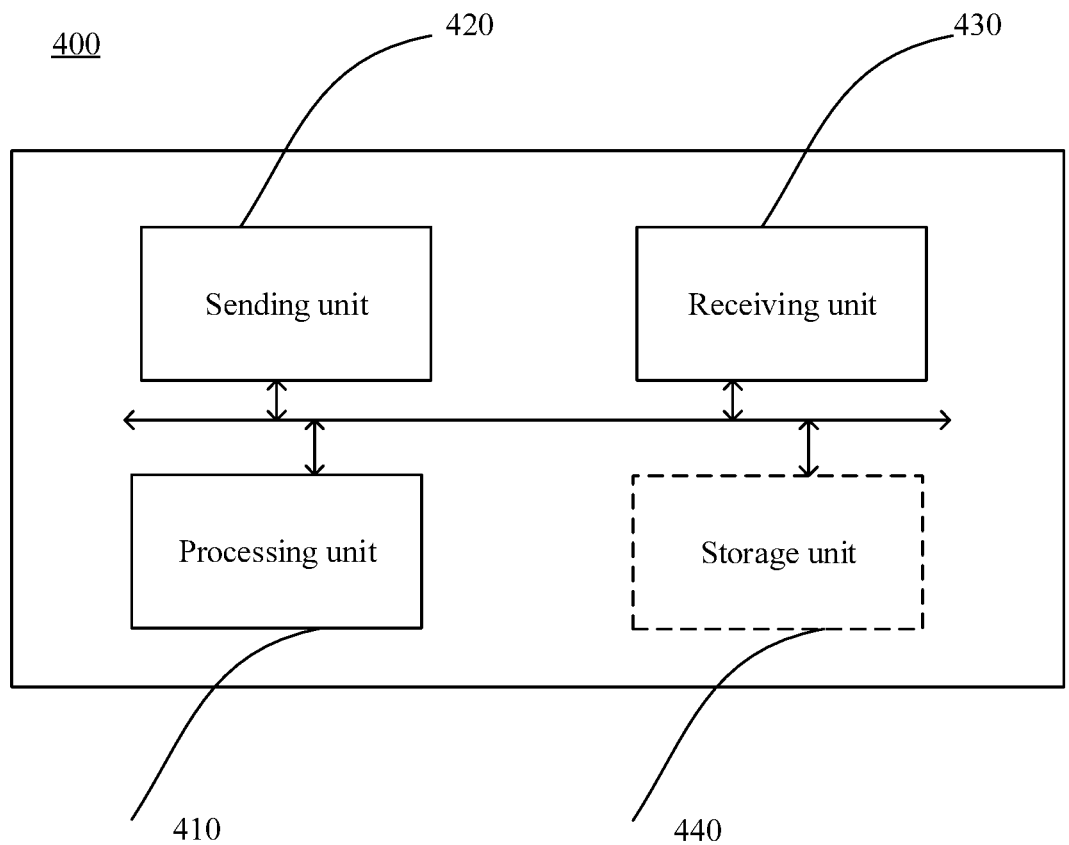
FIG. 17 is a schematic block diagram of another communications apparatus.

FIG. 17 is a schematic structural diagram of a communications apparatus 400. The apparatus 400 may be configured to implement the method described in the foregoing method embodiments. For details, refer to the descriptions in the foregoing method embodiments. The communications apparatus 400 may be a chip, a data sending network element, or the like.

The communications apparatus 400 includes one or more processing units 410. The processing unit 410 may be a general purpose processor, a dedicated processor, or the like. The CPU may be configured to control a communications apparatus (such as a terminal device, a UPF, or an SMF), execute a software program, and process data of the software program.

The communications apparatus may include a sending unit 420 configured to output (send) a signal. For example, the communications apparatus may be the chip, and the sending unit 420 may be an output circuit or a communications interface of the chip. The chip may be applied to a core network device. For another example, the communications apparatus may be the terminal device, the UPF, or the SMF, and the sending unit 420 may be a transceiver, a radio frequency chip, or the like.

The communications apparatus may include a receiving unit 430 configured to input (receive) a signal. For example, the communications apparatus may be the chip, and the receiving unit 430 may be an input circuit or a communications interface of the chip. The chip may be applied to a core network device. For another example, the communications apparatus may be the terminal device, the UPF, or the SMF, and the receiving unit 430 may be a transceiver, a radio frequency chip, or the like.

The communications apparatus 400 includes one or more processing units 410. The one or more processing units 410 may implement the communication method of the data sending network element in the embodiments shown in FIG. 4 and FIG. 13. The communications apparatus 400 includes a sending unit configured to send, to a data receiving network element, a parameter indicating that data is to be transmitted on a plurality of links, and a receiving unit configured to receive acknowledgment information that indicates that data is to be transmitted on a plurality of links and that is sent from the data receiving network element.

That a sending unit is configured to send, to a data receiving network element, a parameter indicating that data is to be transmitted on a plurality of links further includes The sending unit sends, to the data receiving network element using a control plane, the parameter indicating that data is to be transmitted on a plurality of links, or the sending unit sends, to the data receiving network element using a user plane, the parameter indicating that data is to be transmitted on a plurality of links.

In a possible design, the parameter indicating that data is to be transmitted on a plurality of links includes identification information of the data and indication information indicating that the data is to be transmitted on the plurality of links.

In a possible design, the parameter indicating that data is to be transmitted on a plurality of links further includes a first window length, and the first window length is usable for indicating a transmit window length of the data sending network element. The data sending network element is the terminal device, and the data receiving network element is a user plane network element, or the data sending network element is the user plane network element, and the data receiving network element is the terminal device, or the data sending network element is a session management function network element, and the data receiving network element is the terminal device and the user plane network element.

In a possible design, the identification information of the data is at least one of description information of the data, a QFI, a PDU session identifier, or an N4 session identifier.

In a possible design, the indication information includes at least one of a TFCP indication, a TFCP-based encapsulation indication, a packet granularity flow splitting indication, a converged tunnel indication, a converged tunnel identifier, or a network element IP address, the converged tunnel indication is usable for indicating that a converged tunnel is established for the service flow, and the network element IP address is an IP address of the data sending network element or/and an IP address of the data receiving network element.

In a possible design, the acknowledgment information indicating that data is to be transmitted on a plurality of links includes the parameter indicating that data is to be transmitted on a plurality of links, or the acknowledgment information indicating that data is to be transmitted on a plurality of links includes an acknowledgment message.

In a possible design, the data sending network element is the terminal device, and the data receiving network element is a user plane network element, or the data sending network element is the user plane network element, and the data receiving network element is the terminal device, or the data sending network element is a session management function network element, and the data receiving network element is the terminal device and the user plane network element.

In a possible design, the plurality of links include a 3GPP link and a non-3GPP link, or the plurality of links further include links on which different access technologies are used and that are connected to different access network devices, or the plurality of links further include links on which a same access technology is used and that are connected to different access network devices.

The communications apparatus 300 shown in FIG. 17 may implement the communication method of the data sending network element in the embodiments shown in FIG. 4 and FIG. 13. In specific implementation, details are as follows.

The processing unit is further configured to determine a link status of a first link and/or a link status of a second link.

The sending unit is further configured to, based on the link status of the first link and/or the link status of the second link, transmit a first data packet on the first link, and transmit a second data packet on the second link, where the first data packet and the second data packet belong to a same service flow, the first data packet includes a first TFCP header, the first TFCP header includes a sequence number of the first data packet, the second data packet includes a second TFCP header, and the second TFCP header includes a sequence number of the second data packet.

The processing unit is further configured to determine that a first RTT of the first link and a second RTT of the second link meet a first preset condition, or determine, that a delay of the first link and a delay of the second link meet a second preset condition.

In a possible design, the first preset condition includes that a difference between the first RTT and the second RTT is less than or equal to a first preset threshold, or the second preset condition includes that a difference between the delay of the first link and the delay of the second link is less than or equal to a second preset threshold.

In a possible design, the first data packet and the second data packet are a same data packet.

In a possible design, if both flow splitting percentages that are of the first link and the second link and that are in a flow splitting policy are 100%, the processing unit determines that the first data packet and the second data packet are the same data packet.

Figure 18:
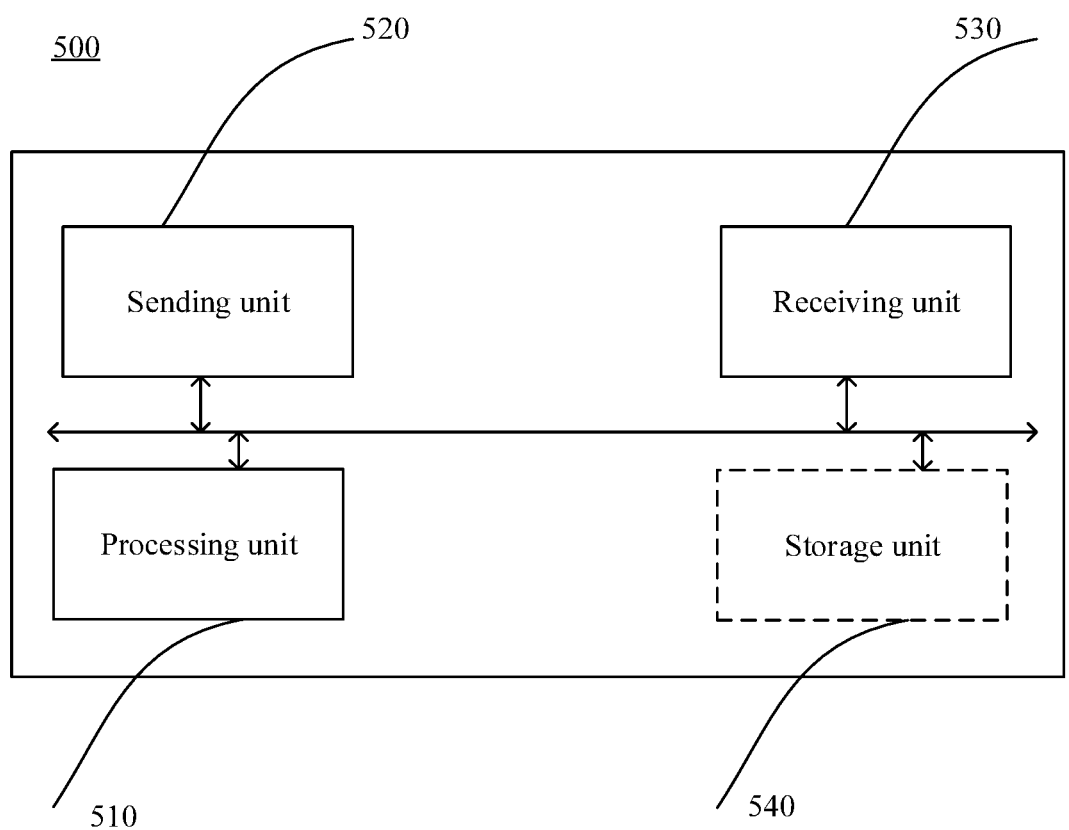
FIG. 18 is a schematic block diagram of another communications apparatus.

FIG. 18 is a schematic structural diagram of a communications apparatus 500. The apparatus 500 may be configured to implement the method described in the foregoing method embodiments. For details, refer to the descriptions in the foregoing method embodiments. The communications apparatus 500 may be a chip, a data receiving network element, or the like.

The communications apparatus 500 includes one or more processing units 510. The processing unit 510 may be a general purpose processor, a dedicated processor, or the like. The CPU may be configured to control a communications apparatus (such as a terminal device, a UPF, or an SMF), execute a software program, and process data of the software program.

The communications apparatus may include a sending unit 520 configured to output (send) a signal. For example, the communications apparatus may be the chip, and the sending unit 520 may be an output circuit or a communications interface of the chip. The chip may be applied to a core network device. For another example, the communications apparatus may be the terminal device, the UPF, or the SMF, and the sending unit 520 may be a transceiver, a radio frequency chip, or the like.

The communications apparatus may include a receiving unit 530 configured to input (receive) a signal. For example, the communications apparatus may be the chip, and the receiving unit 530 may be an input circuit or a communications interface of the chip. The chip may be applied to a core network device. For another example, the communications apparatus may be the terminal device, the UPF, or the SMF, and the receiving unit 530 may be a transceiver, a radio frequency chip, or the like.

The communications apparatus 500 includes one or more processing units 510. The one or more processing units 510 may implement the communication method of the data receiving network element in the embodiments shown in FIG. 4 and FIG. 13. The communications apparatus 500 includes a receiving unit configured to receive on a first link, a first data packet sent from a data sending network element, where the first data packet includes a first TFCP header, and the first TFCP header includes a sequence number of the first data packet, and the receiving unit is further configured to receive, on a second link, a second data packet sent from the data sending network element, where the second data packet includes a second TFCP header, the second TFCP header includes a sequence number of the second data packet, and the first data packet and the second data packet belong to a same service flow, and a processing unit configured to cache the first data packet and/or the second data packet based on the sequence number of the first data packet and the sequence number of the second data packet.

In a possible design, that a processing unit is configured to cache the first data packet and/or the second data packet based on the sequence number of the first data packet and the sequence number of the second data packet includes the following.

The processing unit is configured to store the first data packet and the second data packet in a buffer based on a sequence number and the sequence number of the first data packet and the sequence number of the second data packet.

The processing unit is further configured to determine a status of a data packet in the buffer. In a possible design, the status of the data packet includes a lost state, and if the receiving unit does not receive the data packet beyond preset duration, the processing unit determines that the status of the data packet is the lost state.

The processing unit is further configured to determine the preset duration based on a link delay of the first link and/or a link delay of the second link, or determine, by the data receiving network element, the preset duration based on an RTT of the first link and/or an RTT of the second link.

In a possible design, a time period beyond the preset duration is survival duration, the survival duration is a difference between a current time and an estimated receiving time of the data packet, and the estimated receiving time of the data packet is obtained based on a receiving time of a previous data packet of the data packet or/and a receiving time of a next data packet of the data packet.

That a processing unit is configured to cache the first data packet and/or the second data packet based on the sequence number of the first data packet and the sequence number of the second data packet includes the following.

If the buffer includes the first data packet and/or the second data packet, the receiving unit discards the first data packet and/or the second data packet, or if the sequence number of the first data packet and/or the sequence number of the second data packet are/is less than a smallest sequence number of a data packet in the buffer, the receiving unit discards the first data packet and/or the second data packet.

It should be understood that in the embodiments of this application, the processing unit may be a CPU. Alternatively, the processing unit may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor or the like.

It should be further understood that in the embodiments of this application, the storage unit may be a volatile memory or a nonvolatile memory, or may include both a volatile memory and a nonvolatile memory. The nonvolatile memory may be a read-only memory (ROM), a programmable ROM (PROM), an EPROM, an electrically EPROM (EEPROM), or a flash memory. The volatile memory may be a random-access memory (RAM) used as an external cache. In an example instead of limitation, many forms of RAMs may be used, for example, a static RAM (SRAM), a dynamic RAM (DRAM), a synchronous dynamic RAM (SDRAM), a double data rate (DDR) SDRAM, an enhanced SDRAM (ESDRAM), a synchlink DRAM (SLDRAM), and a direct rambus (DR) RAM.

All or some of the foregoing embodiments may be implemented using software, hardware, firmware, or any combination thereof. When software is used to implement the embodiments, the foregoing embodiments may be implemented completely or partially in a form of a computer program product. The computer program product includes one or more computer instructions or computer programs. When the computer instructions or the computer programs are loaded or executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center to another website, computer, server, or data center in a wired (for example, infrared, radio, or microwave) manner. The computer readable storage medium may be any usable medium accessible by the computer, or a data storage device, such as a server or a data center, integrating one or more usable media. The usable medium may be a magnetic medium (for example, a FLOPPY DISK, a hard disk, or a magnetic tape), an optical medium (for example, a DVD), or a semiconductor medium. The semiconductor medium may be a solid state drive.

It should be understood that the term "and/or" in this specification describes only an association relationship for describing associated objects and represents that three relationships may exist. For example, A and/or B may represent the following three cases only A exists, both A and B exist, and only B exists. In addition, the character "/" in this specification usually indicates an "or" relationship between the associated objects.

It should be understood that sequence numbers of the processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that for the purpose of convenient and brief description, for a detailed working process of the foregoing system, apparatus, and network element, refer to a corresponding process in the foregoing method embodiments. Details are not described herein again. In the several embodiments provided in this application, it should be understood that the disclosed system, apparatus, and method may be implemented in another manner. For example, the described apparatus embodiment is merely an example. For example, division into the network elements is merely logical function division and may be other division in an actual implementation. For example, a plurality of network elements or components may be combined or integrated into another system, or some features may be ignored or not performed. In addition, the displayed or discussed mutual couplings or direct couplings or communication connections may be implemented using some interfaces. The indirect couplings or communication connections between the apparatuses or network elements may be implemented in electronic, mechanical, or another form.

The network elements described as separate parts may or may not be physically separate, and parts displayed as network elements may or may not be physical network elements, and may be located in one position, or may be distributed on a plurality of network elements. Some or all of the network elements may be selected based on an actual requirement to achieve the objectives of the solutions of the embodiments. In addition, function network elements in the embodiments of this application may be integrated into one processing network element, or each of the network elements may exist alone physically, or two or more network elements may be integrated into one network element. When the functions are implemented in a form of a software function network element and sold or used as an independent product, the functions may be stored in a computer readable storage medium. Based on such an understanding, the technical solutions of this application essentially, or the part contributing to the other approaches, or some of the technical solutions may be implemented in a form of a computer software product. The computer software product is stored in a storage medium, and includes several instructions for instructing a computer device (which may be a personal computer, a server, or a first core network element) to perform all or some of the steps of the methods in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method implemented by a terminal device, wherein the communication method comprises:
   sending a request message to a core network element using a first access technology, wherein the request message requests to newly add or update a service flow, and wherein the request message comprises indication information indicating that the core network element is allowed to modify an access technology corresponding to the service flow;
   receiving, from the core network element using the first access technology, a response message, comprising a flow splitting rule indicating to transmit the service flow using the first access technology and a second access technology; and
   transmitting the service flow based on the response message using the first access technology and the second access technology.

2. The communication method of claim 1, wherein the request message further comprises identification information for determining the service flow.

3. The communication method of claim 2, wherein the identification information comprises a protocol data unit (PDU) session identifier.

4. The communication method of claim 2, wherein the response message further comprises the identification information.

5. The communication method of claim 1, wherein the request message further comprises a first quality of service (QoS) parameter corresponding to the first access technology, and wherein the response message further comprises a second QoS parameter corresponding to the first access technology and the second access technology.

6. The communication method of claim 1, further comprising determining, according to the flow splitting rule, data amounts of the service flow to be transmitted using the first access technology and the second access technology, and wherein transmitting the service flow using the first access technology and the second access technology further comprises transmitting the service flow based on the data amounts.

7. The communication method of claim 6, wherein the flow splitting rule comprises either:
   one or more of a first data amount of the service flow to be transmitted using the first access technology or a second data amount of the service flow to be transmitted using the second access technology; or a ratio of the first data amount to the second data amount.

8. The communication method of claim 1, wherein the first access technology is a 3rd Generation Partnership Project (3GPP) access technology and the second access technology is a non-3GPP access technology, or wherein the first access technology is the non-3GPP access technology and the second access technology is the 3GPP access technology.

9. The communication method of claim 1, wherein the request message further comprises a protocol data unit (PDU) session modification request, and wherein the response message further comprises a PDU session modification command.

10. The communication method of claim 1, wherein transmitting the service flow using the first access technology and the second access technology further comprises transmitting, based on the response message, the service flow in a multi-access protocol data unit (PDU) session using the first access technology and the second access technology.

11. A communications apparatus comprising:
a memory configured to store instructions; and
a processor coupled to the memory, wherein the instructions cause the processor to be configured to:
send a request message to a core network element using a first access technology, wherein the request message requests to newly add or update a service flow, and wherein the request message comprises indication information indicating that the core network element is allowed to modify an access technology corresponding to the service flow;
receive, from the core network element using the first access technology, a response message comprising a flow splitting rule indicating to transmit the service flow using the first access technology and a second access technology; and
transmit the service flow based on the response message using the first access technology and the second access technology.

12. The communication apparatus of claim 11, wherein the request message further comprises identification information for determining the service flow.

13. The communication apparatus of claim 12, wherein the identification information comprises a protocol data unit (PDU) session identifier.

14. The communication apparatus of claim 12, wherein the response message further comprises the identification information.

15. The communication apparatus of claim 11, wherein the request message further comprises a first quality of service (QoS) parameter corresponding to the first access technology, and wherein the response message further comprises a second QoS parameter corresponding to the first access technology and the second access technology.

16. The communication apparatus of claim 11, wherein the instructions further cause the processor to be configured to:
determine, according to the flow splitting rule, data amounts of the service flow to be transmitted using the first access technology and the second access technology; and
transmit the service flow based on the data amounts.

17. The communication apparatus of claim 16, wherein the flow splitting rule comprises either:
one or more of a first data amount of the service flow to be transmitted using the first access technology or a second data amount of the service flow to be transmitted using the second access technology; or
a ratio of the first data amount to the second data amount.

18. The communication apparatus of claim 11, wherein the first access technology is a 3rd Generation Partnership Project (3GPP) access technology and the second access technology is a non-3GPP access technology, or wherein the first access technology is the non-3GPP access technology and the second access technology is the 3GPP access technology.

19. A computer program product comprising computer-executable instructions for storage on a non-transitory computer-readable storage medium that, when executed by a processor, cause an apparatus to:
send a request message to a core network element using a first access technology, wherein the request message requests to newly add or update a service flow, and wherein the request message comprises indication information indicating that the core network element is allowed to modify an access technology corresponding to the service flow;
receive, using the first access technology, a response message from the core network element, wherein the response message comprises a flow splitting rule indicating transmitting the service flow using the first access technology and a second access technology; and
transmit the service flow based on the response message using the first access technology and the second access technology.

20. The computer program product of claim 19, wherein the computer-executable instructions further cause the apparatus to:
determine, according to the flow splitting rule, data amounts of the service flow that are in transmission to be performed using the first access technology and the second access technology; and
transmit the service flow based on the data amounts using the first access technology and the second access technology.

* * * * *